US009930987B2

(12) United States Patent
Hulett et al.

(10) Patent No.: US 9,930,987 B2
(45) Date of Patent: Apr. 3, 2018

(54) APPARATUSES, SYSTEMS, AND METHODS FOR BREWING A BEVERAGE

(71) Applicant: Starbucks Corporation, Seattle, WA (US)

(72) Inventors: Randy Hulett, Seattle, WA (US); David Doucette, Seattle, WA (US); Dan Apone, Seattle, WA (US); Izaak Koller, Seattle, WA (US); Amanda L. Juris, Seattle, WA (US); Jeff Allison, Lake Oswego, OR (US); Brian Shay, Seattle, WA (US); John Andrew Johnson, Seattle, WA (US); Roland Horth, Seattle, WA (US); Steve Frankovich, Seattle, WA (US); Glenn Klecker, Seattle, WA (US); Stephen Hoyt Hancock, Wake Forest, NC (US); Marc Singer, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 221 days.

(21) Appl. No.: 14/548,174

(22) Filed: Nov. 19, 2014

(65) Prior Publication Data
US 2015/0135966 A1 May 21, 2015

Related U.S. Application Data

(60) Provisional application No. 61/906,871, filed on Nov. 20, 2013, provisional application No. 61/906,872, filed on Nov. 20, 2013.

(51) Int. Cl.
A47J 31/40 (2006.01)
A47J 27/62 (2006.01)
(Continued)

(52) U.S. Cl.
CPC ............. A47J 27/62 (2013.01); A47J 31/404 (2013.01); A47J 31/42 (2013.01); A47J 31/60 (2013.01);
(Continued)

(58) Field of Classification Search
CPC .. A47J 31/404; A47J 2031/0694; A47J 31/08; A47J 31/085; A47J 27/00
(Continued)

(56) References Cited

U.S. PATENT DOCUMENTS 1,896,230 A   1/1931   Farago
D144,555 S    4/1946   Smith
(Continued)

FOREIGN PATENT DOCUMENTS

CN   1229955 A    9/1999
DE   29810370     11/1998
(Continued)

OTHER PUBLICATIONS

International Search Report and Written Opinion for Application No. PCT/US2012/066428, dated Apr. 26, 2013 in 27 pages.
(Continued)

Primary Examiner — David Angwin
Assistant Examiner — Jimmy Chou
(74) Attorney, Agent, or Firm — Knobbe Martens Olson & Bear LLP

(57) ABSTRACT

Apparatuses, systems, and methods for brewing a desired portion of a beverage, such as a single-cup portion of coffee, are provided. The system can include one or more hopper assemblies configured to provide a controlled dose of beverage material to a brew chamber. The system can also include a water input system configured to wet the ground beverage material as the grinds enter the brew chamber and substantially prevent steam from reaching grinder compo-
(Continued)

nents of the system. Further, the system can include an automatic cleaning mechanism such that a user does not need to manually clean components of a brewing machine between brew cycles.

8 Claims, 70 Drawing Sheets

(51) Int. Cl.
| | |
|---|---|
| *G05D 23/19* | (2006.01) |
| *H02J 3/14* | (2006.01) |
| *G05B 15/02* | (2006.01) |
| *G05F 1/66* | (2006.01) |
| *A47J 31/42* | (2006.01) |
| *A47J 31/60* | (2006.01) |
| *A47J 42/50* | (2006.01) |

(52) U.S. Cl.
CPC .............. *A47J 42/50* (2013.01); *G05B 15/02* (2013.01); *G05D 23/1951* (2013.01); *G05F 1/66* (2013.01); *H02J 3/14* (2013.01)

(58) Field of Classification Search
USPC ................. 99/287, 289 D, 286, 294, 300
See application file for complete search history.

(56) References Cited

U.S. PATENT DOCUMENTS

| | | | | |
|---|---|---|---|---|
| 3,007,392 | A | * | 11/1961 | Pecoraro ............ A47J 31/0657 210/314 |
| 3,087,415 | A | | 4/1963 | Kaplan et al. |
| 3,450,024 | A | * | 6/1969 | Martin ................ A47J 31/057 99/295 |
| 3,561,349 | A | * | 2/1971 | Endo ................... A47J 31/0642 99/295 |
| 3,580,425 | A | | 5/1971 | DeMan |
| 4,143,795 | A | | 3/1979 | Casebier |
| 4,253,385 | A | * | 3/1981 | Illy ..................... A47J 31/3685 99/281 |
| 4,421,014 | A | * | 12/1983 | Vicker .................. A47J 31/38 99/289 P |
| 4,470,999 | A | * | 9/1984 | Carpiac ................ A23F 5/243 141/1 |
| 4,852,472 | A | | 8/1989 | In-Albon et al. |
| D304,407 | S | | 11/1989 | Fossella |
| 4,973,828 | A | | 11/1990 | Naruse et al. |
| 5,000,508 | A | | 3/1991 | Woods |
| 5,025,138 | A | | 6/1991 | Cuervo |
| 5,032,136 | A | | 7/1991 | Fitzgerald et al. |
| 5,134,925 | A | * | 8/1992 | Bunn .................... A47J 31/60 210/499 |
| 5,207,148 | A | | 5/1993 | Anderson et al. |
| 5,223,699 | A | | 6/1993 | Flynn et al. |
| D337,019 | S | | 7/1993 | Newnan |
| 5,276,311 | A | | 1/1994 | Hennige |
| 5,349,897 | A | | 9/1994 | King et al. |
| D353,740 | S | | 12/1994 | Gilstrap |
| 5,372,832 | A | * | 12/1994 | Bunn .................... A47J 31/002 426/231 |
| 5,392,694 | A | * | 2/1995 | Muller .................. A47J 31/36 99/295 |
| 5,397,391 | A | | 3/1995 | Stramel |
| 5,406,882 | A | | 4/1995 | Shaanan |
| 5,408,917 | A | | 4/1995 | Lussi |
| 5,409,092 | A | | 4/1995 | Itako et al. |
| 5,440,108 | A | | 8/1995 | Tran et al. |
| 5,506,393 | A | | 4/1996 | Ziarno |
| 5,521,966 | A | | 5/1996 | Friedes et al. |
| 5,577,109 | A | | 11/1996 | Stimson et al. |
| 5,578,808 | A | | 11/1996 | Taylor |
| 5,584,229 | A | | 12/1996 | Anson |
| 5,638,739 | A | | 6/1997 | Shaanan et al. |
| 5,671,657 | A | | 9/1997 | Ford et al. |
| 5,684,291 | A | | 11/1997 | Taskett |
| 5,689,100 | A | | 11/1997 | Carrithers et al. |
| 5,696,908 | A | | 12/1997 | Muehlberger et al. |
| 5,704,046 | A | | 12/1997 | Hogan |
| 5,744,787 | A | | 4/1998 | Teicher |
| 5,788,840 | A | | 8/1998 | Lee et al. |
| 5,819,234 | A | | 10/1998 | Slavin et al. |
| 5,858,437 | A | | 1/1999 | Anson |
| 5,923,016 | A | | 7/1999 | Fredregill et al. |
| 5,937,391 | A | | 8/1999 | Ikeda et al. |
| 5,953,710 | A | | 9/1999 | Fleming |
| 5,956,695 | A | | 9/1999 | Carrithers et al. |
| 5,991,413 | A | | 11/1999 | Arditti et al. |
| 5,991,748 | A | | 11/1999 | Taskett |
| 5,992,298 | A | | 11/1999 | Illy et al. |
| 6,000,508 | A | | 12/1999 | Forster |
| 6,000,608 | A | | 12/1999 | Dorf |
| 6,032,859 | A | | 3/2000 | Muehlberger et al. |
| 6,044,362 | A | | 3/2000 | Neely |
| 6,105,009 | A | | 8/2000 | Cuervo |
| 6,138,911 | A | | 10/2000 | Fredregill et al. |
| 6,152,365 | A | | 11/2000 | Kolls |
| 6,167,387 | A | | 12/2000 | Lee-Wai-Yin |
| 6,167,389 | A | | 12/2000 | Davis et al. |
| 6,176,172 | B1 | | 1/2001 | Stettes et al. |
| 6,189,787 | B1 | | 2/2001 | Dorf |
| 6,193,155 | B1 | | 2/2001 | Walker et al. |
| 6,202,101 | B1 | | 3/2001 | Chin et al. |
| 6,244,162 | B1 | | 6/2001 | Dahmen |
| 6,282,566 | B1 | | 8/2001 | Lee, Jr. et al. |
| 6,330,978 | B1 | | 12/2001 | Molano et al. |
| 6,349,889 | B1 | * | 2/2002 | Sandolo ................ A47F 1/035 241/100 |
| 6,375,073 | B1 | | 4/2002 | Aebi et al. |
| D465,915 | S | | 11/2002 | Earnshaw |
| 6,502,745 | B1 | | 1/2003 | Stimson et al. |
| 6,615,189 | B1 | | 9/2003 | Phillips et al. |
| 6,626,085 | B1 | | 9/2003 | Lassota |
| 6,634,279 | B2 | | 10/2003 | D'Antonio et al. |
| 6,658,989 | B2 | * | 12/2003 | Sweeney ............. A47J 31/0642 99/306 |
| 6,705,208 | B2 | | 3/2004 | Lassota |
| 6,739,240 | B2 | | 5/2004 | De Koning et al. |
| 6,832,542 | B2 | * | 12/2004 | Hu ...................... A47J 31/0668 99/295 |
| 6,835,915 | B2 | | 12/2004 | Timm |
| D502,043 | S | | 2/2005 | Lin |
| 6,915,732 | B2 | | 7/2005 | Jones et al. |
| 6,968,775 | B2 | | 11/2005 | Burrows et al. |
| 6,988,444 | B1 | * | 1/2006 | Pfeifer ................. A47J 31/42 99/286 |
| 7,024,985 | B2 | | 4/2006 | Park |
| 7,240,611 | B2 | | 7/2007 | Burrows et al. |
| 7,279,660 | B2 | | 10/2007 | Long et al. |
| 7,350,455 | B2 | * | 4/2008 | Vetterli ................ A47J 31/42 99/280 |
| 7,398,725 | B2 | | 7/2008 | Rebordosa et al. |
| 7,430,521 | B2 | | 9/2008 | Walker et al. |
| 7,455,011 | B2 | * | 11/2008 | Brouwer ............. A47J 31/0678 426/433 |
| 7,571,674 | B2 | | 8/2009 | Wang |
| 7,581,489 | B2 | | 9/2009 | Van Hattem et al. |
| 7,669,519 | B2 | | 3/2010 | Pope et al. |
| 7,685,932 | B2 | * | 3/2010 | Rahn ................... A47J 31/0631 426/433 |
| 7,814,824 | B2 | | 10/2010 | Beretta |
| 7,849,784 | B2 | | 12/2010 | Adler |
| 7,922,382 | B2 | | 4/2011 | Thakur et al. |
| 8,176,839 | B2 | | 5/2012 | Morgandi |
| 8,247,010 | B2 | | 8/2012 | Nguyen et al. |
| D667,251 | S | | 9/2012 | Cahen |
| D675,677 | S | | 2/2013 | Barili |
| 8,371,211 | B2 | | 2/2013 | Nosler et al. |
| 8,434,401 | B2 | * | 5/2013 | Skalski ............... A47J 31/0668 99/290 |
| 8,586,116 | B2 | * | 11/2013 | Wroblewski ........ A47J 31/3671 426/433 |

(56) References Cited

U.S. PATENT DOCUMENTS

| | | |
|---|---|---|
| 8,616,116 B2 | 12/2013 | McLaughlin |
| 8,623,441 B2 | 1/2014 | McLaughlin et al. |
| 8,627,760 B2 | 1/2014 | Kollep et al. |
| 8,770,094 B2 | 7/2014 | Rithener et al. |
| D738,667 S | 9/2015 | Bristol et al. |
| 9,218,633 B2 | 12/2015 | Hulett et al. |
| 2001/0047342 A1 | 11/2001 | Cuervo |
| 2002/0130137 A1* | 9/2002 | Greenwald ............ A47J 31/50 222/54 |
| 2002/0174016 A1 | 11/2002 | Cuervo |
| 2003/0049356 A1* | 3/2003 | Nielsen ................. A23C 3/033 426/522 |
| 2003/0126993 A1* | 7/2003 | Lassota ............... A47J 31/402 99/279 |
| 2003/0167928 A1 | 9/2003 | Mulle et al. |
| 2004/0236696 A1 | 11/2004 | Aoki et al. |
| 2005/0120885 A1 | 6/2005 | Wang |
| 2005/0121978 A1 | 6/2005 | McAvoy |
| 2007/0012196 A1 | 1/2007 | Sato |
| 2007/0068393 A1* | 3/2007 | Nosler ................. A47J 31/007 99/279 |
| 2007/0137495 A1 | 6/2007 | Talbert |
| 2007/0169640 A1 | 7/2007 | Sato et al. |
| 2007/0185776 A1 | 8/2007 | Nguyen et al. |
| 2007/0261563 A1 | 11/2007 | Morin et al. |
| 2007/0261566 A1* | 11/2007 | Varney ................. A47J 31/404 99/300 |
| 2008/0028944 A1 | 2/2008 | Webster et al. |
| 2008/0029595 A1 | 2/2008 | Waller |
| 2008/0038423 A1 | 2/2008 | Klant et al. |
| 2008/0041233 A1 | 2/2008 | Bunn |
| 2008/0168905 A1* | 7/2008 | Hart ..................... A47J 31/46 99/280 |
| 2008/0173182 A1 | 7/2008 | Boerner et al. |
| 2008/0277512 A1 | 11/2008 | Vuijk |
| 2009/0031900 A1 | 2/2009 | Barraclough et al. |
| 2009/0095165 A1 | 4/2009 | Nosler et al. |
| 2009/0158937 A1* | 6/2009 | Stearns ................ A47J 31/41 99/280 |
| 2009/0173236 A1 | 7/2009 | Wang |
| 2009/0204504 A1 | 8/2009 | De Araujo |
| 2010/0024657 A9 | 2/2010 | Nosler et al. |
| 2010/0052421 A1 | 3/2010 | Schindler et al. |
| 2010/0065587 A1 | 3/2010 | Erman et al. |
| 2010/0086289 A1 | 4/2010 | Johnson et al. |
| 2010/0107885 A1* | 5/2010 | Kirschner ............ A47J 31/007 99/279 |
| 2010/0263543 A1 | 10/2010 | Krauchi et al. |
| 2010/0280960 A1 | 11/2010 | Ziotopoulos |
| 2011/0086148 A1 | 4/2011 | Ford |
| 2011/0107919 A1 | 5/2011 | Webster |
| 2011/0154993 A1 | 6/2011 | Bertolina |
| 2011/0167440 A1 | 7/2011 | Greenfield |
| 2011/0185908 A1* | 8/2011 | Berto ..................... G01F 11/24 99/286 |
| 2011/0212231 A1 | 9/2011 | McLaughlin |
| 2011/0212236 A1* | 9/2011 | Nguyen ............... A47J 31/3614 426/433 |
| 2011/0256273 A1 | 10/2011 | de Graaff et al. |
| 2011/0258072 A1 | 10/2011 | Kerker et al. |
| 2012/0095805 A1 | 4/2012 | Ghosh |
| 2012/0310757 A1 | 12/2012 | Kim et al. |
| 2013/0019754 A1 | 1/2013 | Tien et al. |
| 2013/0019755 A1 | 1/2013 | Tien et al. |
| 2013/0108755 A1 | 5/2013 | Carbonini et al. |
| 2013/0131883 A1 | 5/2013 | Yamada |
| 2013/0132214 A1 | 5/2013 | Hulett et al. |
| 2013/0133520 A1* | 5/2013 | Hulett ................... A47J 31/40 99/285 |
| 2013/0220137 A1* | 8/2013 | Bombeck .............. A47J 31/54 99/287 |
| 2013/0247771 A1 | 9/2013 | Maisch |
| 2013/0275181 A1 | 10/2013 | DiGioacchino et al. |
| 2013/0297089 A1 | 11/2013 | Fu et al. |
| 2015/0148980 A1 | 5/2015 | Singer et al. |
| 2016/0143477 A1 | 5/2016 | Hulett et al. |

FOREIGN PATENT DOCUMENTS

| | | |
|---|---|---|
| DE | 102009045705 | 4/2011 |
| DE | 202011005003 U1 | 8/2011 |
| EP | 0280345 | 8/1988 |
| EP | 0476173 | 3/1992 |
| EP | 0801921 | 10/1997 |
| EP | 0848925 | 6/1998 |
| EP | 2168468 | 3/2010 |
| EP | 2782484 | 10/2014 |
| GB | 910555 | 11/1962 |
| GB | 2345252 | 7/2000 |
| JP | H09-198448 | 7/1997 |
| JP | 2003-07657 | 3/2003 |
| JP | 2006-215647 | 8/2006 |
| JP | 2007-287082 | 11/2007 |
| JP | 2009-151408 | 7/2009 |
| JP | 2010-055248 | 3/2010 |
| JP | 2011-210008 | 10/2011 |
| JP | 5358742 | 12/2013 |
| JP | 5534268 | 6/2014 |
| TW | 200926034 | 6/2009 |
| TW | I343025 | 6/2011 |
| WO | WO 94/01028 | 1/1994 |
| WO | WO 94/07401 | 4/1994 |
| WO | WO 94/24643 | 10/1994 |
| WO | WO 95/26669 | 10/1995 |
| WO | WO 97/24052 | 7/1997 |
| WO | WO 98/11809 | 3/1998 |
| WO | WO 99/03057 | 1/1999 |
| WO | WO 99/012455 | 3/1999 |
| WO | WO 99/60900 | 12/1999 |
| WO | WO 00/045685 | 8/2000 |
| WO | WO 00/65969 | 11/2000 |
| WO | WO 01/21049 | 3/2001 |
| WO | WO 01/54550 | 8/2001 |
| WO | WO 01/63522 | 8/2001 |
| WO | WO 01/74212 | 10/2001 |
| WO | WO 02/09563 | 2/2002 |
| WO | WO 02/074145 | 9/2002 |
| WO | WO 02/091903 | 11/2002 |
| WO | WO 03/084377 | 10/2003 |
| WO | WO 03/092456 | 11/2003 |
| WO | WO 03/093561 | 11/2003 |
| WO | WO 2004/006739 | 1/2004 |
| WO | WO 2004/093619 | 11/2004 |
| WO | WO 2004/103129 | 12/2004 |
| WO | WO 2005/048791 | 6/2005 |
| WO | WO 2005/072578 | 8/2005 |
| WO | WO 2005/077231 | 8/2005 |
| WO | WO 2005/077232 | 8/2005 |
| WO | WO 2005/117669 | 12/2005 |
| WO | WO 2006/124180 | 11/2006 |
| WO | WO 2006/133699 | 12/2006 |
| WO | WO 2007/023265 | 3/2007 |
| WO | WO 2007/027206 | 3/2007 |
| WO | WO 2007/035877 | 3/2007 |
| WO | WO 2007/070874 | 6/2007 |
| WO | WO 2007/133972 | 11/2007 |
| WO | WO 2007/141334 | 12/2007 |
| WO | WO 2008/006682 | 1/2008 |
| WO | WO 2008/049222 | 5/2008 |
| WO | WO 2009/074550 | 6/2009 |
| WO | WO 2009/074555 | 6/2009 |
| WO | WO 2009/000039 | 7/2009 |
| WO | WO 2009/120708 | 10/2009 |
| WO | WO 2009/128110 | 10/2009 |
| WO | WO 2011/006198 | 1/2011 |
| WO | WO 2011/095502 | 8/2011 |
| WO | WO 2011/130439 | 10/2011 |
| WO | WO 2011/151490 | 12/2011 |
| WO | WO 2011/158131 | 12/2011 |
| WO | WO 2012/036635 | 3/2012 |
| WO | WO 2012/072767 | 6/2012 |
| WO | WO 2012/119923 | 9/2012 |

(56) References Cited

FOREIGN PATENT DOCUMENTS

| WO | WO 2012/130662 | 10/2012 |
|---|---|---|
| WO | WO 2013/011078 | 1/2013 |
| WO | WO 2013/034563 | 3/2013 |
| WO | WO 2013/078428 | 5/2013 |
| WO | WO 2013/078437 | 5/2013 |
| WO | WO 2013/119538 | 8/2013 |
| WO | WO 2015/077367 | 5/2015 |
| WO | WO 2015/077237 | 9/2015 |

OTHER PUBLICATIONS

International Search Report and Written Opinion for Application No. PCT/US2014/066455 dated Apr. 17, 2015 in 13 pages.
Office Action for Taiwan Appl. No. 10420523210 dated Apr. 23, 2015 in 7 pages.
Office Action for U.S. Appl. No. 29/473,289 dated Jan. 23, 2015 in 10 pages.
Office Action for European Appl. No. 12 798 995.2 dated Jul. 7, 2015 in 6 pages.
Office Action for U.S. Appl. No. 29/473,291 dated Jan. 21, 2015 in 10 pages.
Office Action for U.S. Appl. No. 13/684,117 dated Mar. 31, 2016 in 13 pages.
Office Action for U.S. Appl. No. 13/684,117 dated Aug. 14, 2015 in 20 pages.
Office Action for Chinese Appl. No. 201280067591.3 dated Nov. 2, 2015 in 8 pages.
Office Action for Chinese Appl. No. 201280067591.3 dated Jun. 29, 2016 in 19 pages.
Office Action for Japanese Appl. No. 2014-543590 dated Aug. 29, 2016 in 4 pages.
Office Action for Mexican Appl. No. MX/a/2014/006297 dated Aug. 16, 2016 in 3 pages.
Office Action for U.S. Appl. No. 13/684,062 dated Dec. 20, 2013 in 9 pages.
Office Action for U.S. Appl. No. 13/684,062 dated Aug. 19, 2014 in 8 pages.
Final Office Action for U.S. Appl. No. 13/684,062 dated Jan. 13, 2015 in 8 pages.
Office Action for U.S. Appl. No. 13/684,062 dated May 19, 2015 in 9 pages.
International Search Report and Written Opinion for Application No. PCT/US2012/66417 dated May 31, 2013 in 14 pages.
Office Action for MX Appl. No. MX/a/2014/006075 dated May 27, 2015 in 4 pages.
Office Action for MX Appl. No. MX/a/2014/006075 dated Dec. 7, 2015 in 6 pages.
Office Action in Taiwan Application No. 104106147 dated Sep. 14, 2015 in 2 pages.
Search Report in Taiwan Application No. 104106147 dated Sep. 18, 2015 in 1 page.
Office Action for Chinese Application No. 201280063764.4 dated Jun. 23, 2016 in 15 pages.
Office Action in Japanese Application No. 2014-543588 dated Aug. 15, 2016 in 8 pages.
International Preliminary Report on Patentability for Application No. PCT/US2014/066455 dated May 24, 2016 in 8 pages.
International Search Report and Written Opinion for Application No. PCT/US2014/066174 dated Jul. 30, 2015 in 17 pages.
International Preliminary Report on Patentability for Application No. PCT/US2014/066174 dated May 24, 2016 in 11 pages.

\* cited by examiner

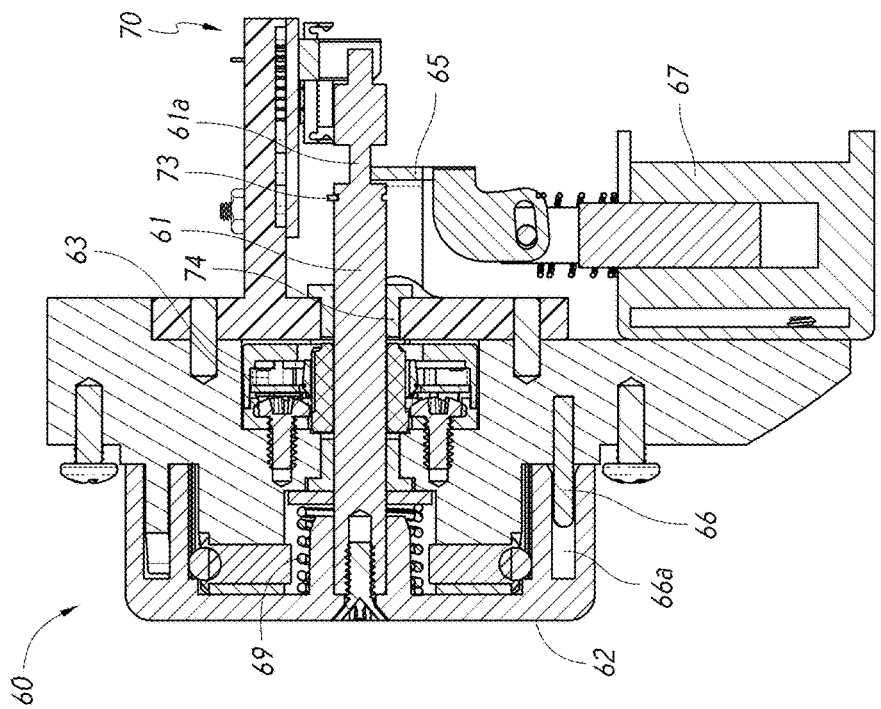
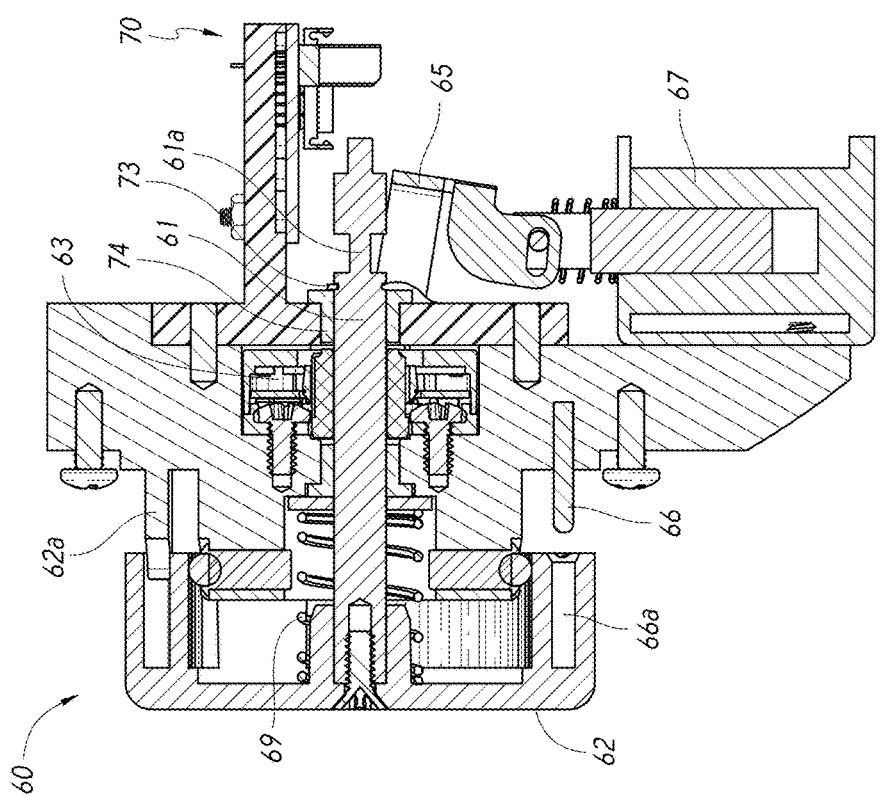

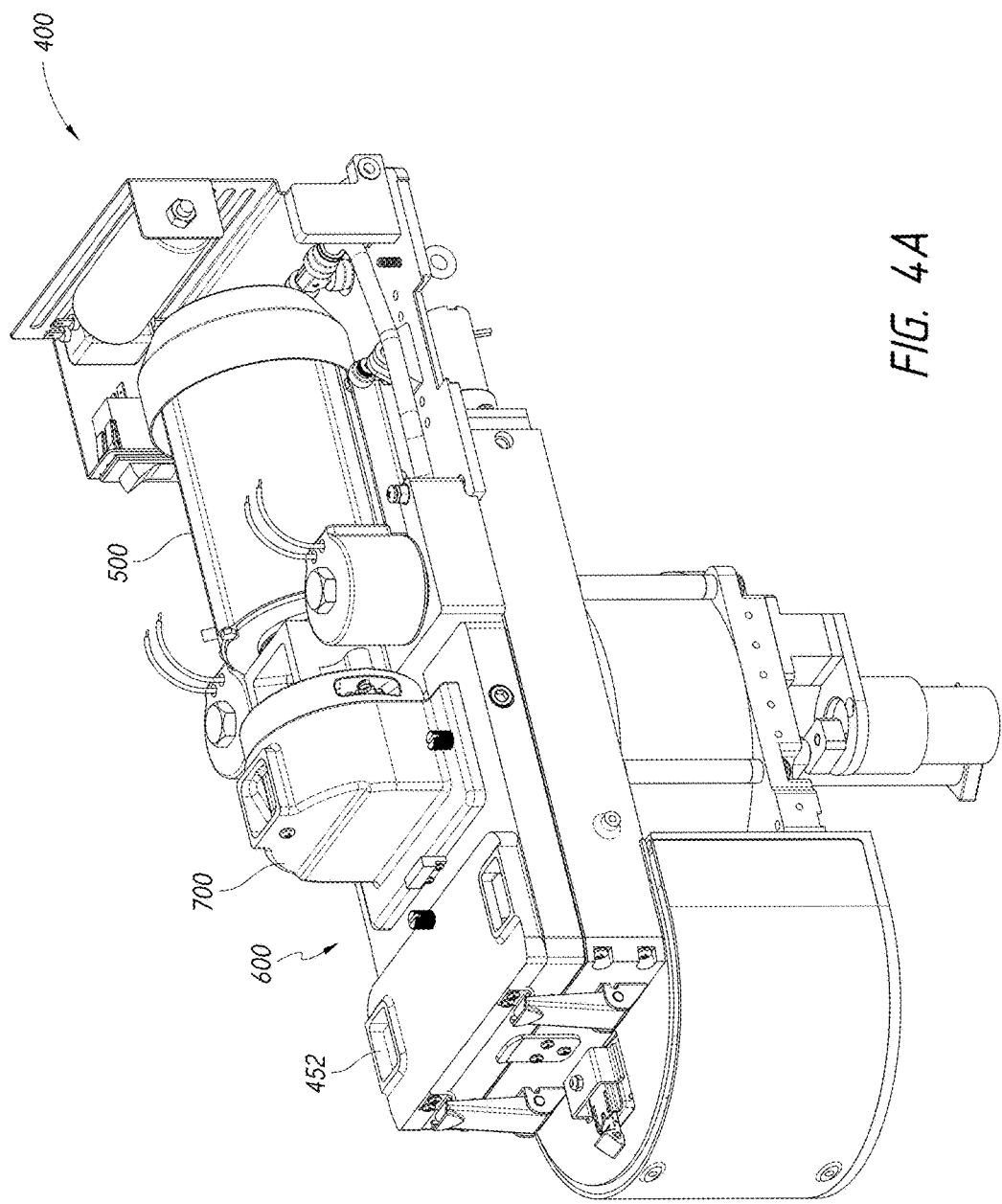

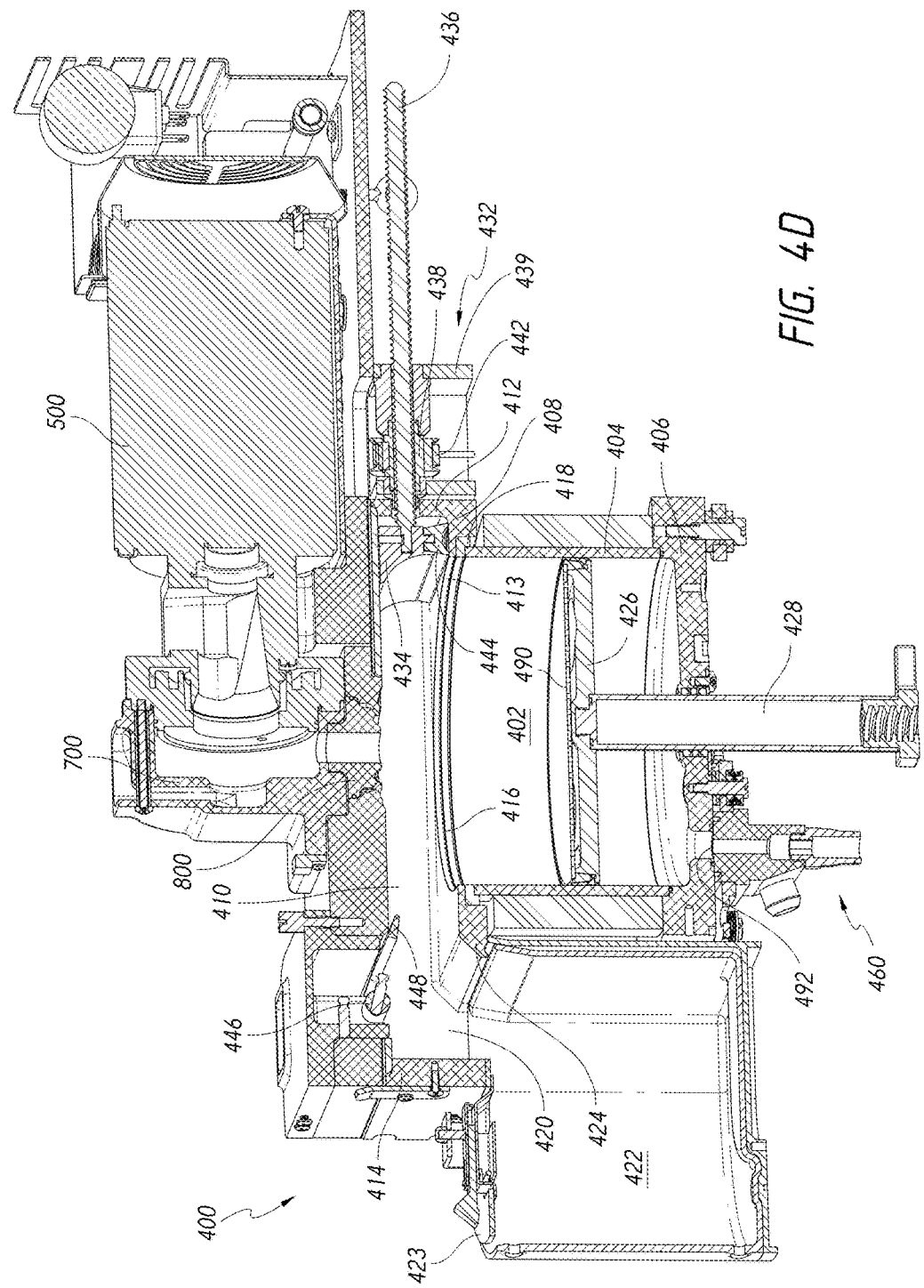

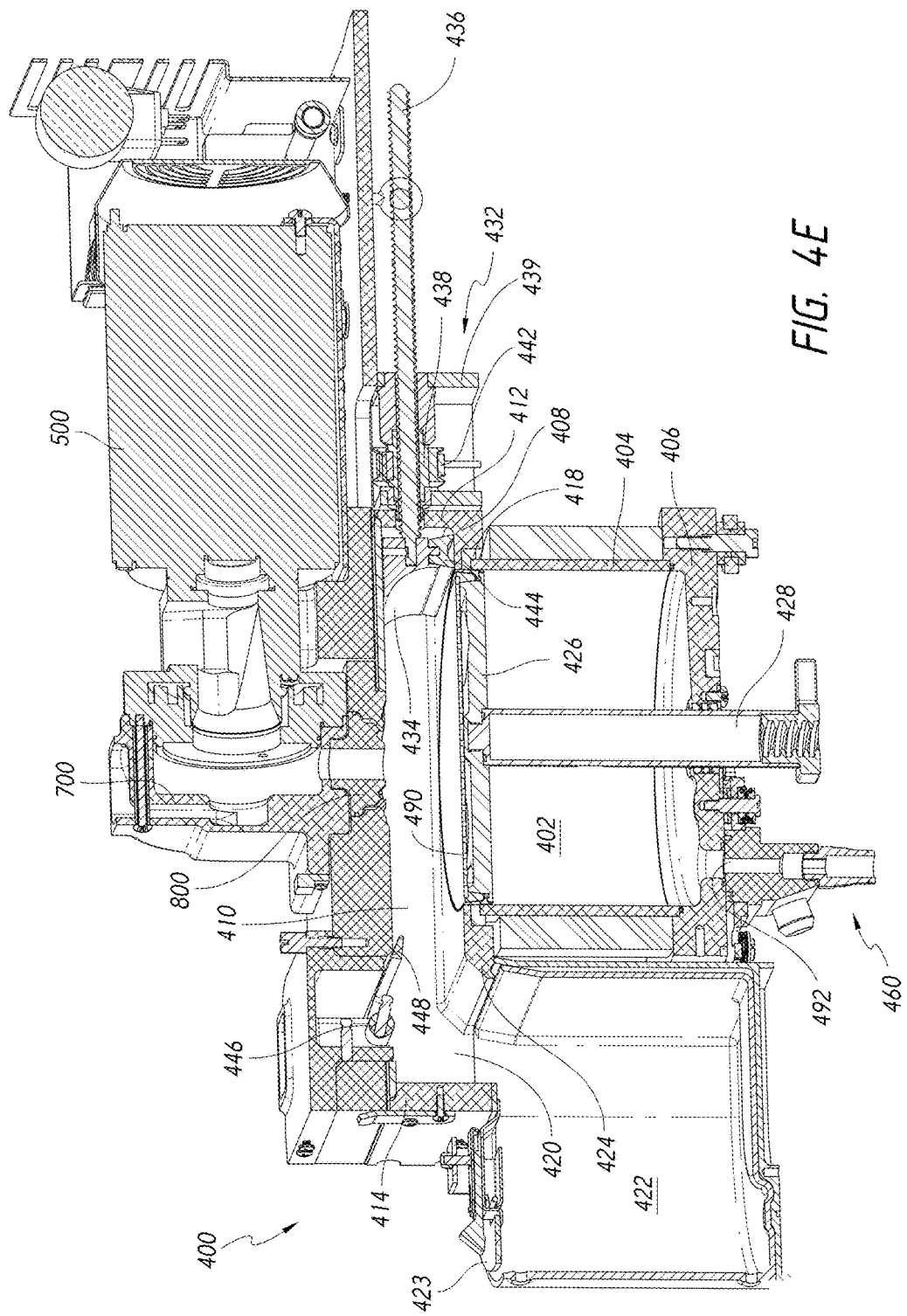

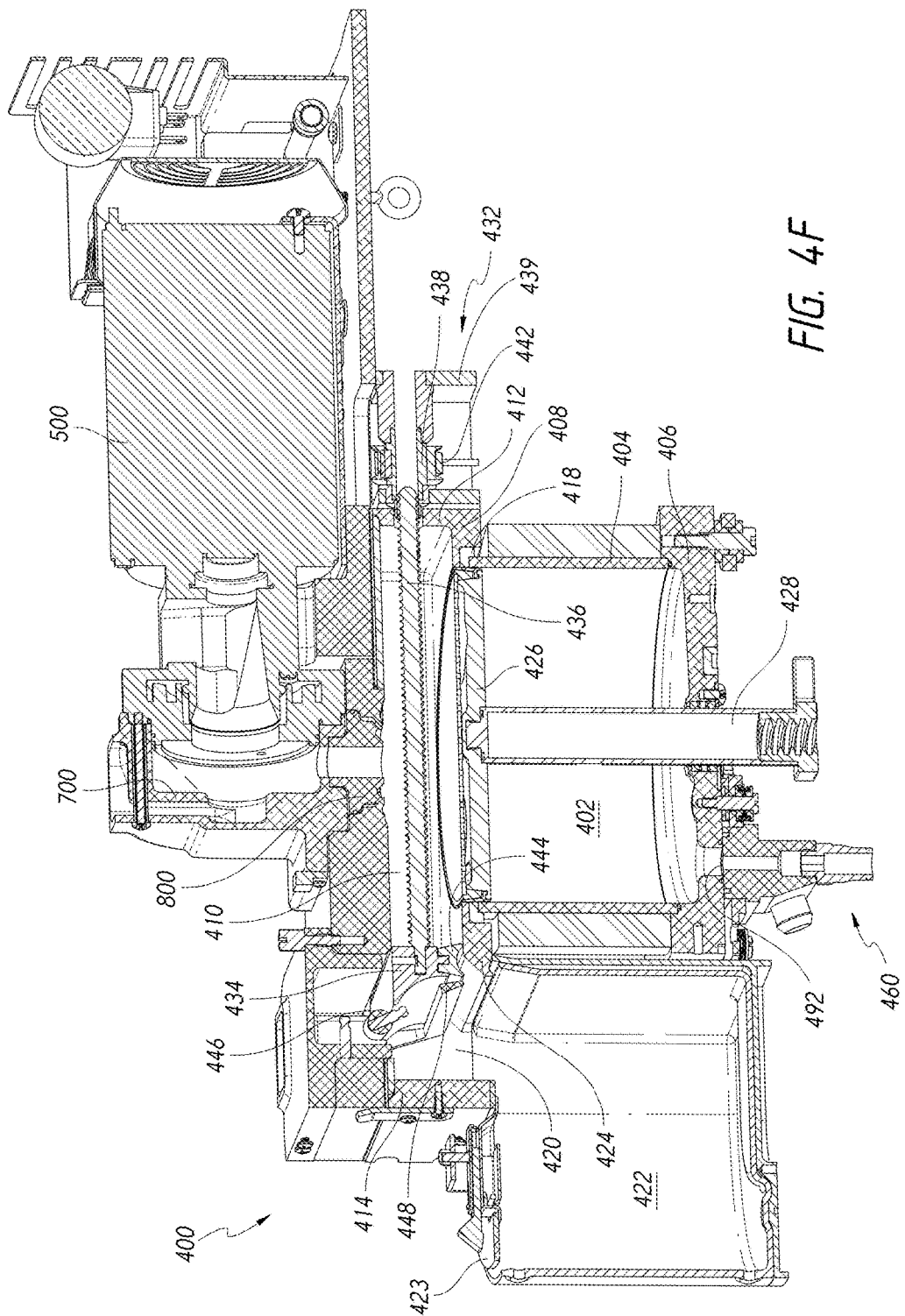

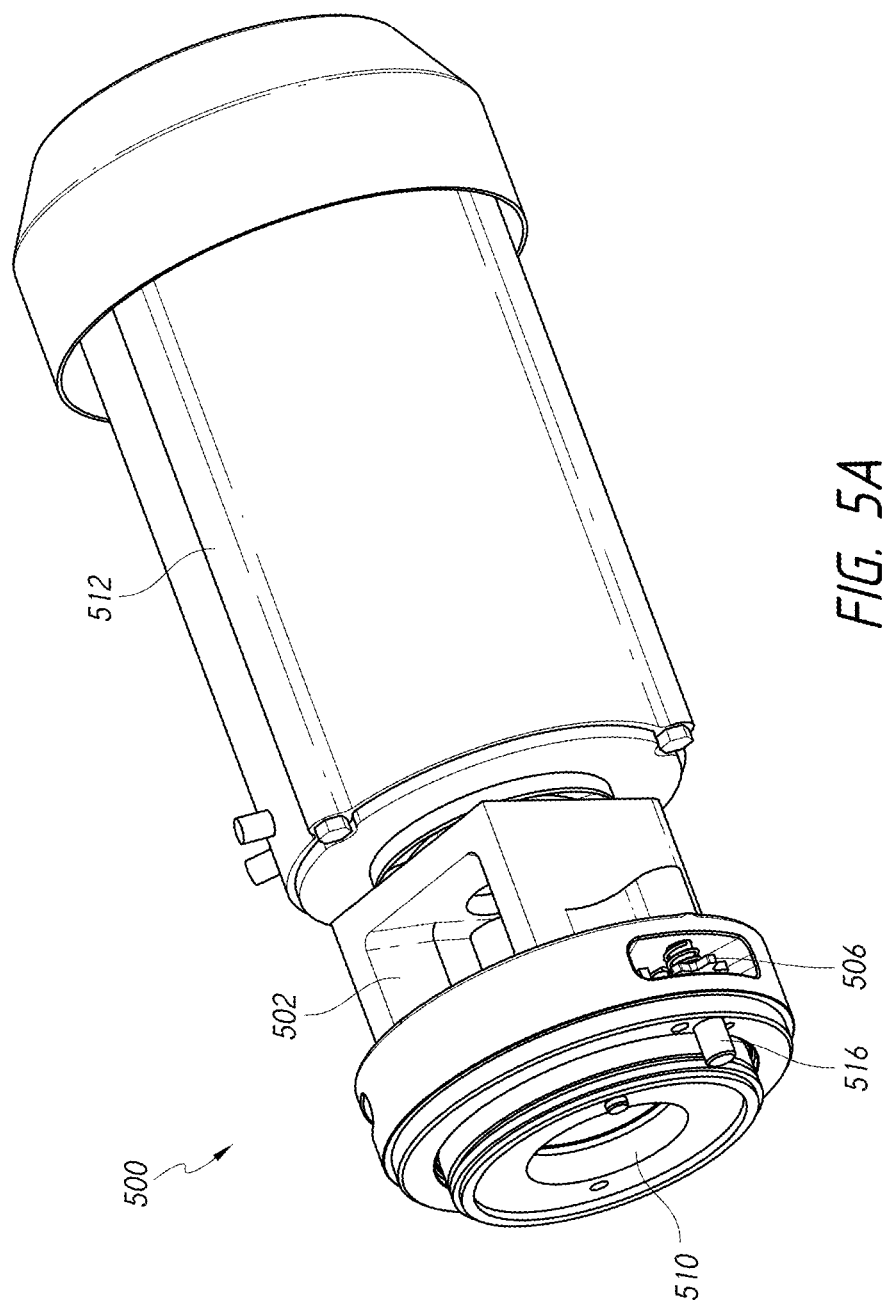

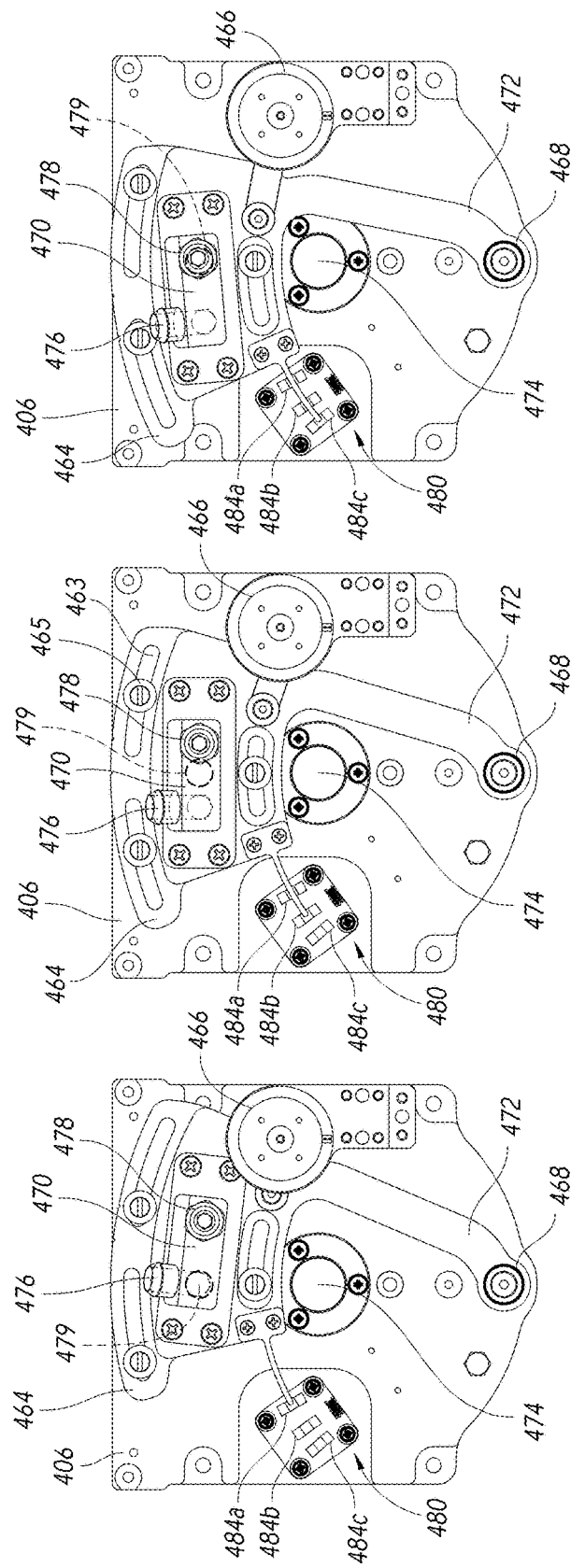

APPARATUSES, SYSTEMS, AND METHODS FOR BREWING A BEVERAGE

CROSS-REFERENCE TO RELATED APPLICATIONS

This application claims a priority benefit under 35 U.S.C. § 119(e) to U.S. Provisional Application No. 61/906,871, filed Nov. 20, 2013, entitled "APPARATUSES, SYSTEMS, AND METHODS FOR BREWING A BEVERAGE," and U.S. Provisional Application No. 61/906,872, filed Nov. 20, 2013, entitled "COOKING SYSTEM POWER MANAGEMENT," which are hereby incorporated by reference in their entirety.

Any and all applications for which a foreign or domestic priority claim is identified in the Application Data Sheet as filed with the present application are hereby incorporated by reference under 37 CFR 1.57.

BACKGROUND

Field

The present disclosure generally relates to automated apparatuses, systems, and methods for brewing a single-cup portion of a beverage, such as coffee.

Description of the Related Art

Many methods and systems for brewing beverages, such as coffee, are known. In conventional coffee brewing systems, a brewing machine typically brews a relatively large batch of coffee. In commercial settings, a barista may pour cup-sized portions of coffee from the batch when a customer places an order. Such beverage brewing systems are inefficient because coffee may be wasted when not all of the coffee in the batch is ordered or consumed. In addition, such systems may produce coffee having an inconsistent flavor and taste because the coffee is not necessarily brewed when a customer places an order and may not be fresh when consumed.

SUMMARY

Automated single-cup coffee brewing systems may be employed to address some of the disadvantages of conventional batch-type coffee brewing systems. Users of automated single-cup coffee brewing systems would benefit from several improvements to those systems, including, but not limited to, reducing the time it takes to brew a single-cup portion or traveler portion of coffee, reducing the labor and time involved in cleaning brewing equipment between brew cycles, reducing steam and condensation from entering the grinder and hopper areas of the system to improve the quality of the coffee and to reduce corrosion on grinder components, improving the accuracy and repeatability of providing a desired dose of a beverage material (e.g., coffee beans) to a grinder portion of the system, improving agitation of coffee grounds during a brew cycle, reducing the labor and time involved in maintaining the hoppers and refilling the hoppers with beverage material, and providing an experiential brewing experience for customers.

Certain aspects of this disclosure are directed toward a hopper assembly for providing a controlled dose of coffee beans to a grinder. The hopper assembly can include a hopper having an upper body portion and a lower body portion. The upper and lower body portions can define an interior volume for receiving the coffee beans. The hopper assembly can also include an auger disposed at least partially within the interior volume of the hopper. The auger can include a tapered inner core and a screw thread at least partially surrounding the inner core. The screw thread can have a substantially uniform outer diameter across a length of the screw thread. The components of the hopper assembly can be disassembled without any tools to facilitate cleaning.

In the above-mentioned hopper assembly aspect, the tapered inner core can include a first portion tapered in a first direction and a second portion tapered in a second direction opposite the first direction. In certain aspects, the first and second portions are both tapered toward a central portion of the auger.

In any of the above-mentioned hopper assembly aspects, the screw thread can include a first threaded portion and a second threaded portion. The first threaded portion can be twisted in a first direction and the second threaded portion can be twisted in a second direction opposite the first direction.

In any of the above-mentioned hopper assembly aspects, the lower body portion can include a number of grooves. Each of the grooves can retain a portion of the screw thread.

In any of the above-mentioned hopper assembly aspects, the hopper assembly can include a hopper motor connected to the auger. The hopper motor can turn the auger in a clockwise direction and a counter-clockwise direction.

In any of the above-mentioned hopper assembly aspects, the auger can provide a precise volume of material to the grinder based on a desired amount of a brewed beverage.

Certain aspects of this disclosure are directed toward an apparatus for brewing a beverage. The apparatus can include a grinder assembly that can provide a controlled grind size. The grinder assembly can have a grinder outlet through which ground material can be transferred from the grinder assembly to a brew chamber. The apparatus can also include a fan in communication with the grinder outlet. The fan can provide positive pressure across the grinder outlet and toward the brew chamber. The grinder outlet can be disposed between the fan and the brew chamber. The fan and baffle can prevent moisture and ground beverage material from re-entering the grinder assembly. If wet beverage material accumulates in the grinder assembly, the grinder assembly can shut down (e.g., seize).

In the above-mentioned apparatus aspect, the fan can be positioned above the grinder outlet, and the brew chamber can be positioned below the grinder outlet.

In any of the above-mentioned apparatus aspects, the apparatus can include a baffle positioned between the fan and the grinder outlet.

In any of the above-mentioned apparatus aspects, the apparatus can include a grinder cap secured to the grinder outlet. The grinder cap can include the baffle and an outlet. The baffle can be positioned along an upper portion of the grinder cap. The grinder cap outlet can be positioned along a lower portion of the grinder cap, such that the grinder outlet is disposed between the baffle and the brew chamber.

In any of the above-mentioned apparatus aspects, the grinder can continue to grind beverage material until there is no beverage material retained in the grinder.

Certain aspects of this disclosure are directed toward a brewing assembly for brewing coffee. The brewing assembly can include a brew chamber for receiving ground coffee and a first fluid channel that can deliver water to the brew chamber. The brewing assembly can also include a mixing valve in fluid communication with the first fluid channel. The mixing valve can include an outlet through which ground coffee can be delivered to the brew chamber. Further, the mixing valve can include a number of passageways circumferentially disposed around the outlet, each passageway can be disposed at an angle greater than 0 degrees and less than 90 degrees relative to a longitudinal axis of the mixing valve such that the water mixes with the ground coffee as the ground coffee enters the brew chamber. In certain aspects, the angle is between 10 degrees and 50 degrees. The mixing valve can wet the ground coffee immediately, consistently, and efficiently. In doing so, the level of extraction from the beverage material can be consistent from cup to cup. Further, the mixing valve can maximize the level of extraction, which can lower the total amount of beverage material necessary.

In the above-mentioned brewing assembly aspect, the brewing assembly can include a second fluid channel that can deliver water to the brew chamber and a fill nozzle in fluid communication with the second fluid channel. In certain aspects, water delivered from the mixing valve can have a first temperature and water delivered from the fill nozzle can have a second temperature greater than the first temperature.

In any of the above-mentioned brewing assembly aspects, the mixing valve can include a recessed portion disposed between at least one of the number of channels and the outlet.

In any of the above-mentioned brewing assembly aspects, the mixing valve can include a wall portion separating an outer recess and an inner recess. The inner recess can include the number of passageways.

Certain aspects of the disclosure are directed toward a beverage brewing system having an interior space including a water intake assembly. The cool water intake assembly can include a water inlet in fluid communication with a water source. The water intake assembly can also include an intake manifold having a first internal fluid channel in fluid communication with the water inlet and a second internal fluid channel in fluid communication with a manifold outlet. In certain aspects, the water intake assembly can include a flow meter having a flow meter fluid channel in fluid communication with the first internal fluid channel and the second internal fluid channel of the intake manifold. In some embodiments, a solid state relay is connected to the intake manifold. The intake manifold can act as a heat sink and can dissipate heat from one or more components (e.g., from the solid state relay) of the beverage brewing system. A boiler can be in fluid communication with the manifold outlet to receive water from the intake manifold. In some embodiments, the intake manifold can preheat (e.g., via heat absorption from the solid state relay and/or other system components) the cool water before the water enters the boiler. Preheating the intake water can reduce power consumption in the boiler and/or in other components of the brewing system.

Certain aspects of the disclosure are directed toward a beverage size control assembly that can permit a user to select a beverage size to be brewed by a beverage brewing system. The beverage size control assembly can include a size control member that can rotate about a rotation axis and transition between a rotatable configuration and a locked configuration. In certain aspects, the size control member can have a control member visual indicator. The beverage size control assembly can also include a size control shaft having a length. The size control shaft can be rotatably connected to the size control member, and the size control shaft can extend along the rotation axis from the size control member through a wall of the beverage brewing system. In certain aspects, the beverage size control assembly can include a biasing structure that can bias the size control member away from the beverage brewing system. In certain aspects, the beverage size control assembly can include a retention structure connected to the size control shaft. The retention structure can limit movement of the size control member during a beverage brewing cycle. For example, the retention structure can inhibit or prevent a user of the brewing system from changing the beverage size selection during a brewing cycle. In some embodiments, the position of the size control member can provide visual confirmation of the size of the beverage being brewed. The retention structure can abut a portion of the wall when the size control member is biased away from the beverage brewing system. In certain aspects, a shaft retainer can be configured selectively engage with the size control shaft to maintain the size control member in the locked configuration. The shaft retainer can release the size control shaft to permit the size control member to transition to the rotatable configuration when the shaft retainer disengages from the size control shaft.

Certain aspects of the disclosure are directed toward a beverage selection assembly having a plurality of user input devices moveable between an engaged position and a released position. Each user input device can be used to select a beverage source when in the engaged position. The beverage selection assembly can also include an input retainer to retain the user input devices in the engaged position, and a release mechanism to release the user input devices to the released position.

Certain aspects of the disclosure are directed toward a rotary valve that can couple with a surface of a fluid chamber. The rotary valve can include a valve plate coupled with the surface of the fluid chamber via a hinge point. The valve plate can rotate about the hinge point between a first position and a second position. The rotary valve can also include an outlet manifold coupled with the valve plate. The outlet manifold can have a first fluid channel having a first channel inlet and a first channel outlet. The outlet manifold can have a second fluid channel having a second channel inlet and a second channel outlet. The first fluid channel can be in communication with a fluid chamber outlet when the valve plate is in the first position, and the second fluid channel can be in fluid communication with the fluid chamber outlet when the valve plate is in the second position. In some embodiments, the valve plate can be moved to a third position (e.g., closed position) wherein neither the first nor the second fluid channels is in fluid communication with the fluid chamber outlet. Positioning the valve plate in the third position can facilitate creation of a vacuum below a piston in the brew chamber when the piston is moved upward in the brew chamber.

Certain aspects of the disclosure are directed toward a brewing assembly including a brew chamber having a brew chamber opening on a top end of the brew chamber. A piston can be positioned within the brew chamber. The piston can transition between a lowered position and a raised position. A plow can move between a proximal position proximal of the brew chamber opening and a distal position distal of the brew chamber opening. A plow wiper can be biased to an upward position and can engage with the plow when the plow transitions from the distal position to the proximal position. The plow wiper can move down a proximal surface of the plow to wipe the proximal surface of the plow.

Certain aspects of the disclosure are directed toward a method of brewing coffee. The method can include delivering ground coffee to a brew chamber through a central passageway of a mixing valve. The method can also include delivering water to the brewing chamber through a number of pathways circumferentially disposed around the central pathway of the mixing valve. The water can be delivered at an angle greater than 0 degrees and less than 90 degrees relative to a longitudinal axis of the mixing valve such that the ground coffee mixes with water as the coffee grounds enter the brew chamber. In certain aspects, the angle can be between about 10 degrees and 50 degrees.

In any of the above mentioned method aspects, the method can include collecting water around a recessed portion disposed between the central passageway and the number of pathways to prevent water from entering the central passageway.

Certain aspects of the disclosure are directed toward a process for brewing a beverage. The process can include selecting a beverage size to be brewed using a beverage size control assembly that can transition from a movable configuration to a locked configuration. After brewing the beverage, the beverage size control assembly can automatically move from the locked configuration to the movable configuration. The process can also include selecting a hopper by moving at least one user input device from a released position to an engaged position. After brewing the beverage, the at least one user input device can automatically move to the released position. In certain aspects, the at least one user input device can be manually moved to the released position to cancel the brewing step.

Certain aspects of the disclosure are directed toward a method of dispensing fluid from a beverage apparatus. The method can include moving a rotary valve to a first position in which a brewed beverage can flow from a brew chamber to a dispensing outlet. After dispensing the brewed beverage, the method can include moving a rotary valve to a closed position in which fluid cannot flow through the rotary valve. After moving the rotary valve to the closed position, the method can include delivering rinse fluid to a brew chamber. After delivering the rinse fluid, the method can include moving the rotary valve to a second position to dispense rinse fluid to a waste bin.

Certain aspects of the disclosure are directed toward a method of moving spent coffee grounds to a waste bin. The method can include moving a piston to a raised position such that a plow can contact an upper surface of the piston. The method can also include moving the plow between a proximal position proximal of the brew chamber opening and a distal position distal of the brew chamber opening. When the plow transitions from the distal position to the proximal position, the method can include moving a plow wiper down a proximal surface of the plow to wipe the proximal surface of the plow.

Certain aspects of the disclosure are directed toward a rotary valve including: a valve manifold having manifold inlet and a plurality of manifold outlets; and a flow director positioned at least partially within the valve manifold and rotatable therein. The flow director can include a director, a first port, and a second port in fluid communication with the first port. In a first position, the flow director facilitates fluid communication between the manifold inlet and a first manifold outlet while blocking fluid communication between the manifold inlet and a second manifold outlet. In a second position, the flow director facilitates fluid communication between the manifold inlet and the second manifold outlet while blocking fluid communication between the manifold inlet and the first manifold outlet.

In the above-mentioned rotary valve aspect, the rotary valve can include a Hall effect sensor to monitor the rotational position of the flow director.

In any of the above-mentioned rotary valve aspects, the first manifold outlet can be in fluid communication with a beverage dispenser.

In any of the above-mentioned rotary valve aspects, the second manifold outlet can be in fluid communication with a drain.

In any of the above-mentioned rotary valve aspects, the manifold inlet can be in fluid communication with an outlet of a brew chamber of a beverage apparatus.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 2BB illustrates a cross-section of the water intake assembly shown in FIG. 2B taken through line 2BB-2BB.

FIG. 2E illustrates a cross-section of the beverage size control assembly of FIG. 2C in a default position.

FIG. 2F illustrates a cross-section of the beverage size control assembly of FIG. 2C in a fully inserted position.

FIG. 2I illustrates a perspective view of a hopper selector assembly of the system of FIG. 1A.

FIG. 2O illustrates an enlarged view of the hopper selector assembly and beverage size control assembly shown in FIG. 2N taken along line 2O.

FIG. 4A illustrates a perspective view of a grinding and brewing assembly of the system of FIG. 1A.

FIG. 4D illustrates a perspective cross-section view of the grinding and brewing assembly of FIG. 4A in a second configuration FIG. 4E illustrates a perspective cross-section view of the grinding and brewing assembly of FIG. 4A in a third configuration FIG. 4F illustrates a perspective cross-section view of the grinding and brewing assembly of FIG. 4A in a fourth configuration

FIG. 5A illustrates a perspective view of an embodiment of a grinder assembly.

FIG. 10D illustrates a bottom plan view of the rotary valve assembly of FIG. 10A in a first position.

FIG. 10E illustrates a bottom plan view of the rotary valve assembly of FIG. 10A in a third position.

FIG. 10F illustrates a bottom plan view of the rotary valve assembly of FIG. 10A in a second position.

DETAILED DESCRIPTION

Figure 1A:
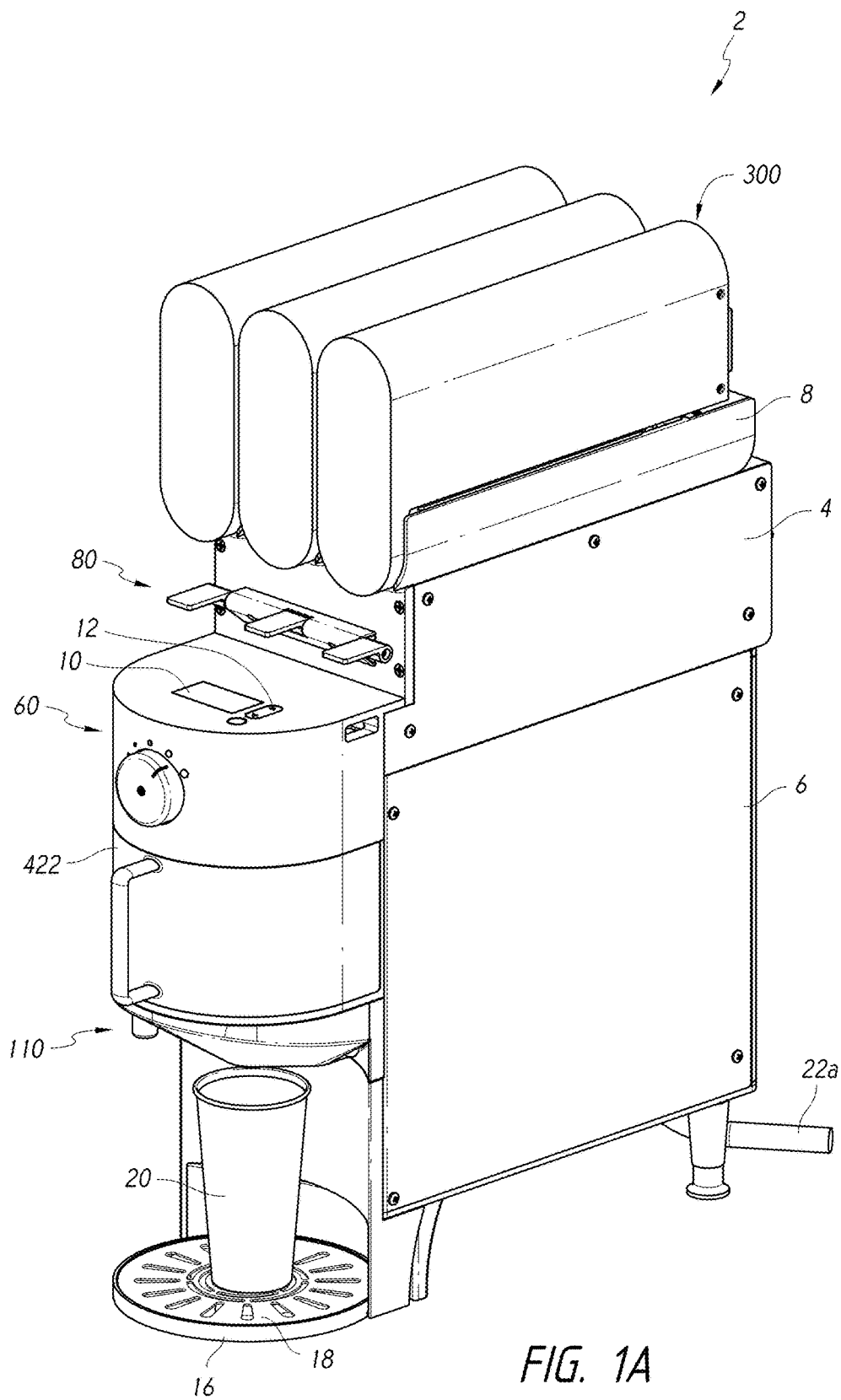
FIG. 1A illustrates a perspective view of an embodiment of a system for brewing a beverage.
Figure 1B:
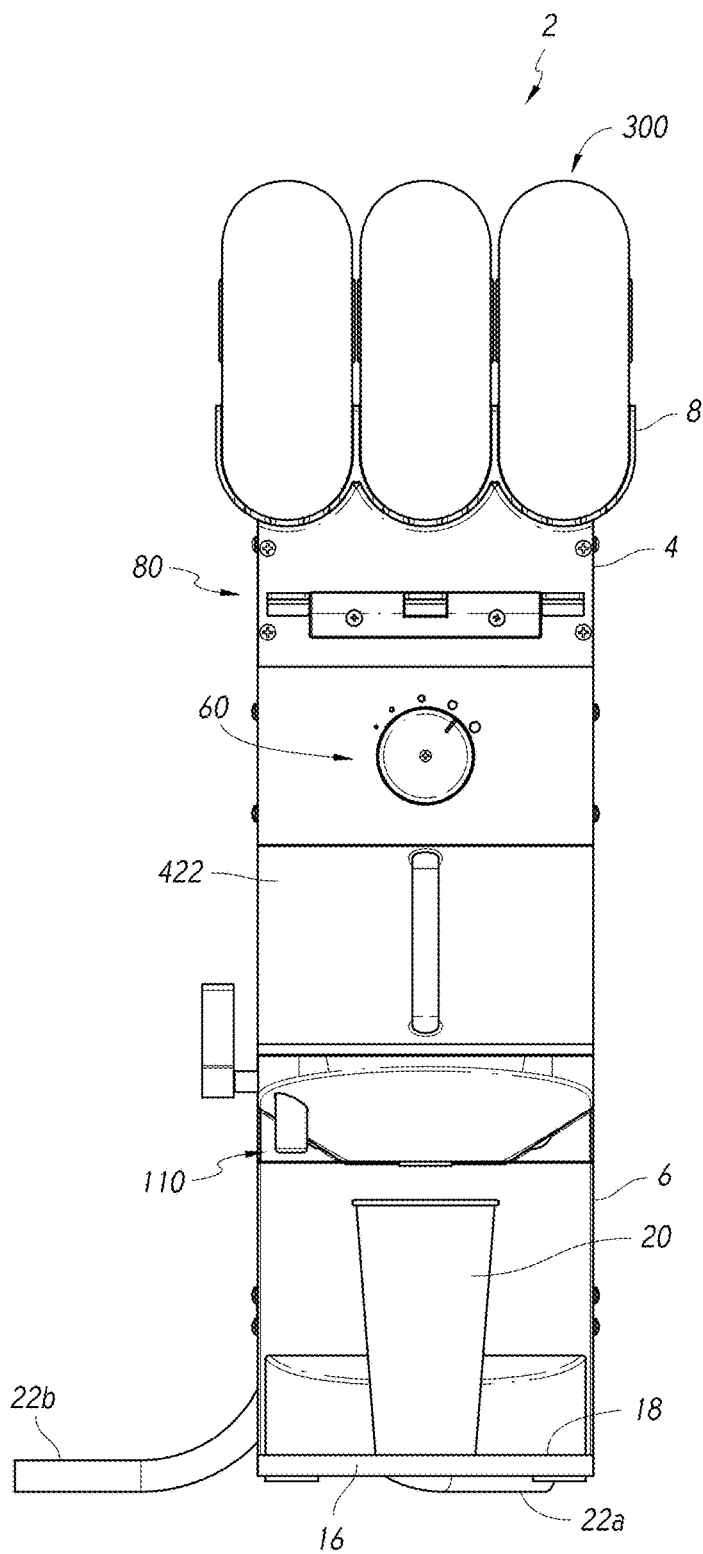
FIG. 1B illustrates a front view of the system shown in FIG. 1A.
Figure 1C:
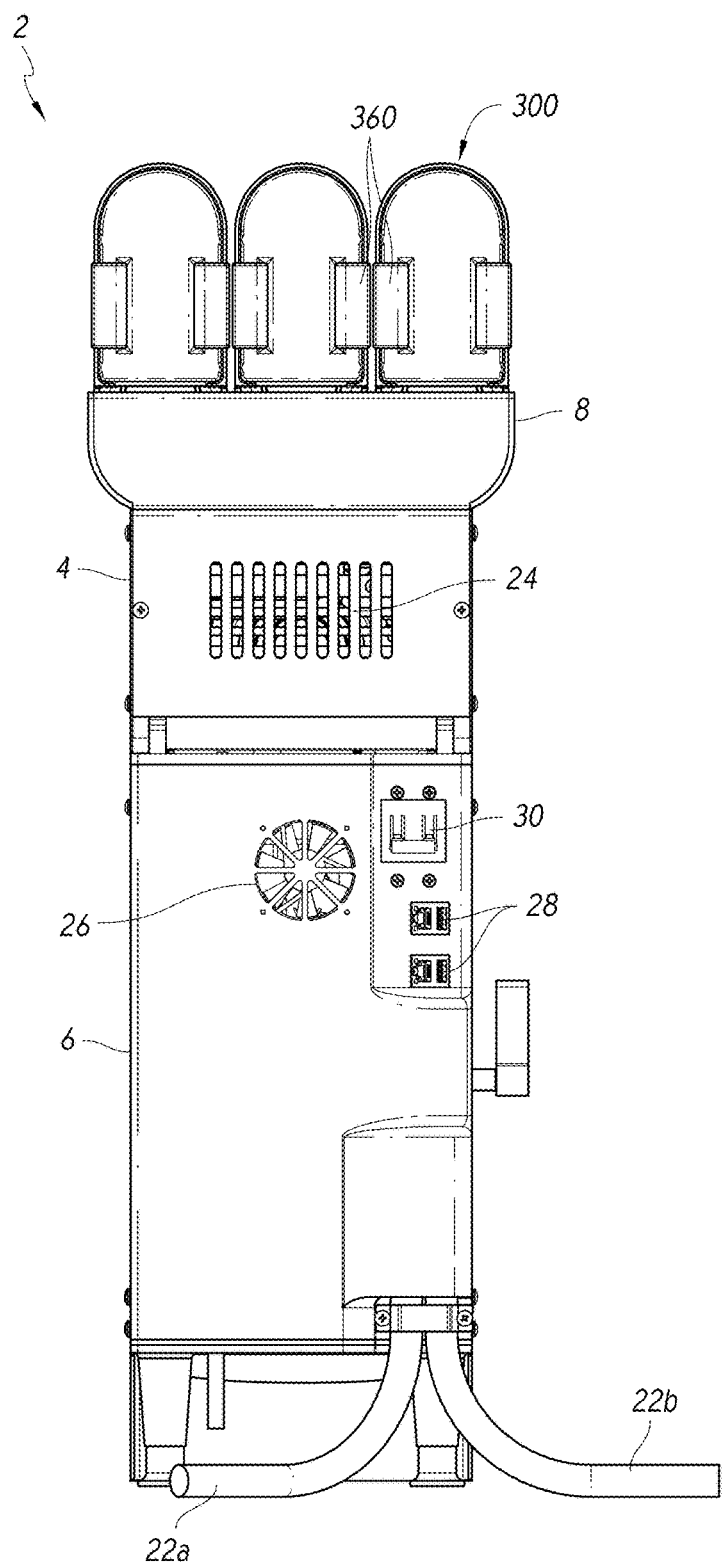
FIG. 1C illustrates a rear view of the system shown in FIG. 1A.
Figure 1D:
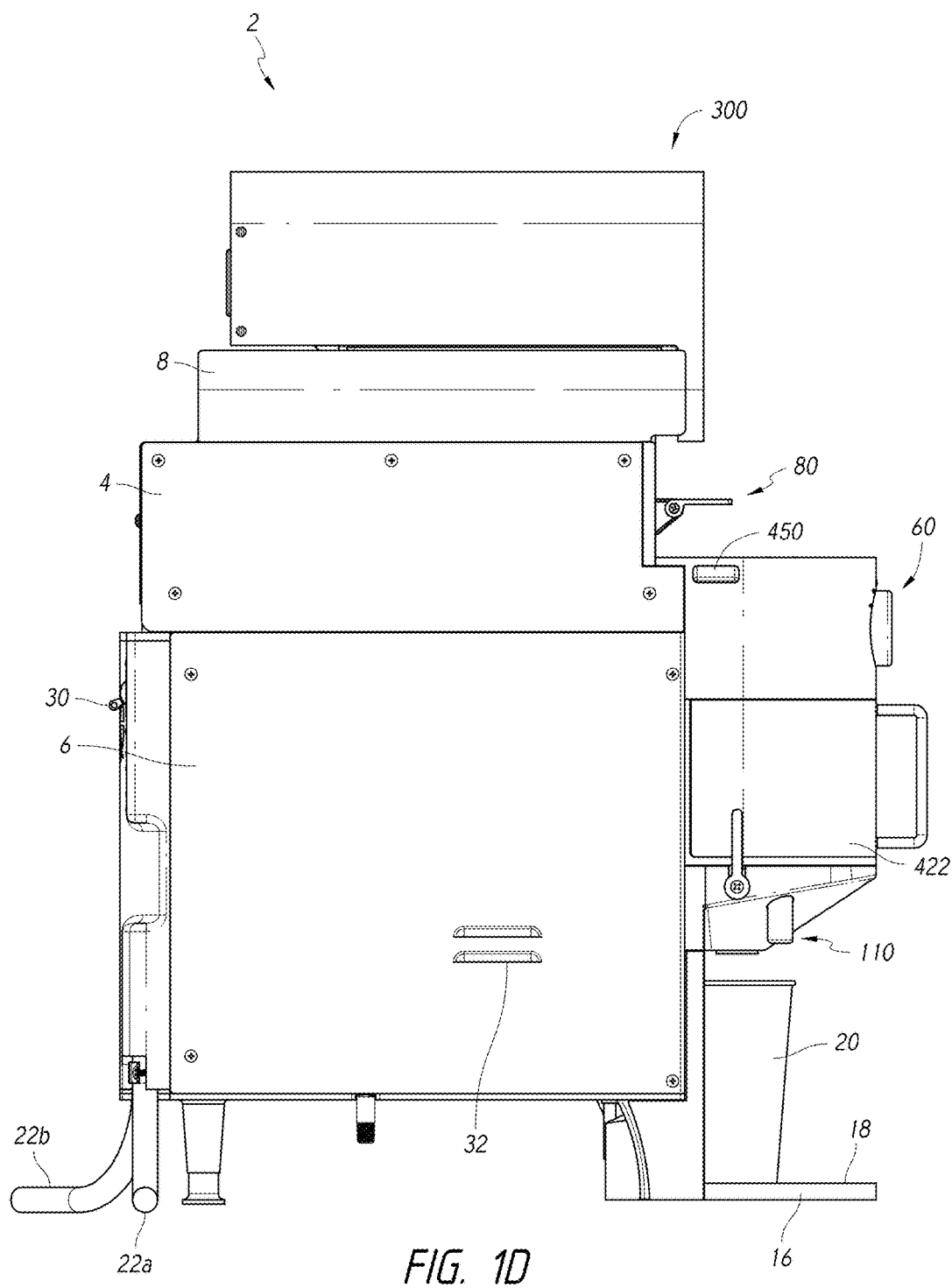
FIG. 1D illustrates a right side view of the system shown in FIG. 1A.
Figure 1E:
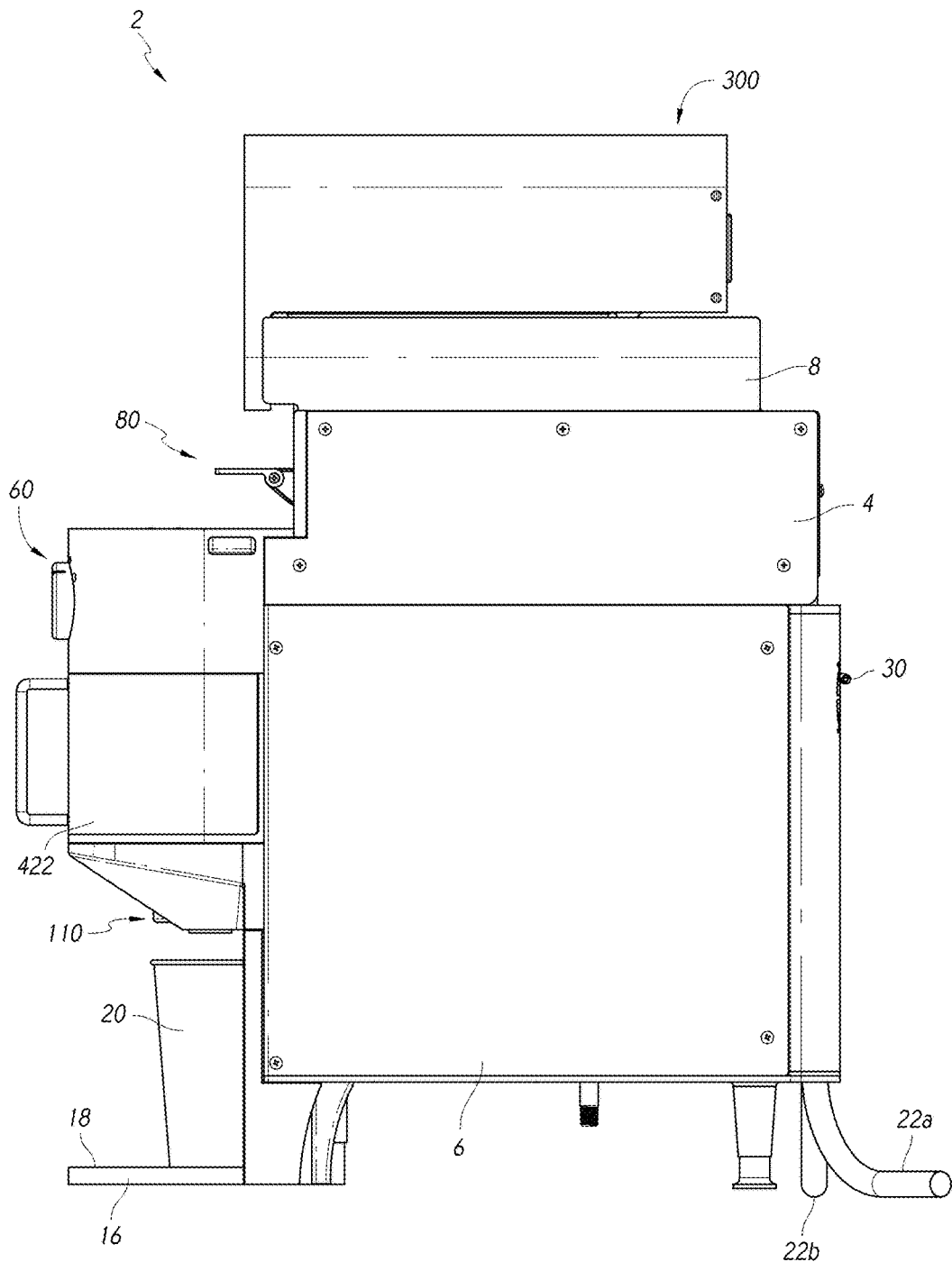
FIG. 1E illustrates a left side view of the system shown in FIG. 1A.
Figure 1F:
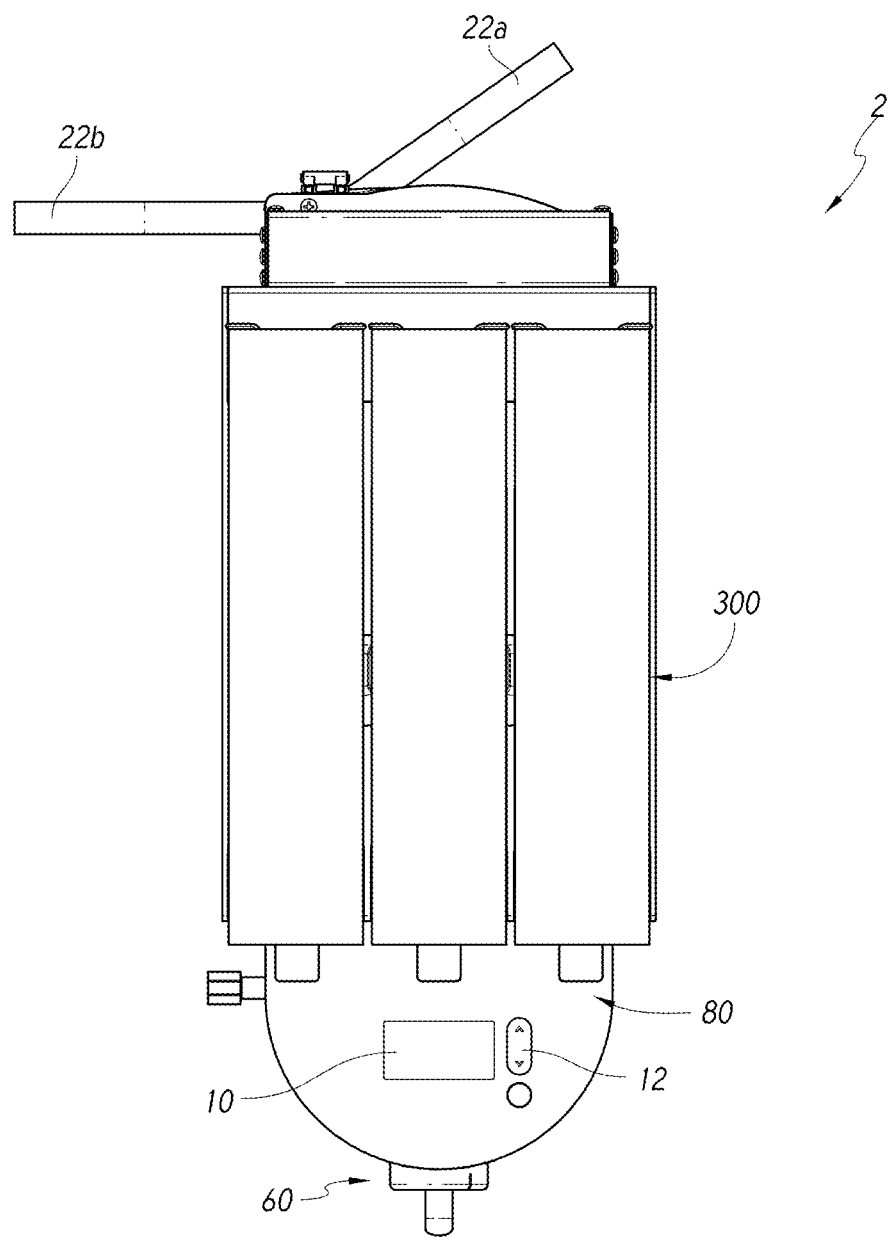
FIG. 1F illustrates a top view of the system shown in FIG. 1A.
Figure 1G:
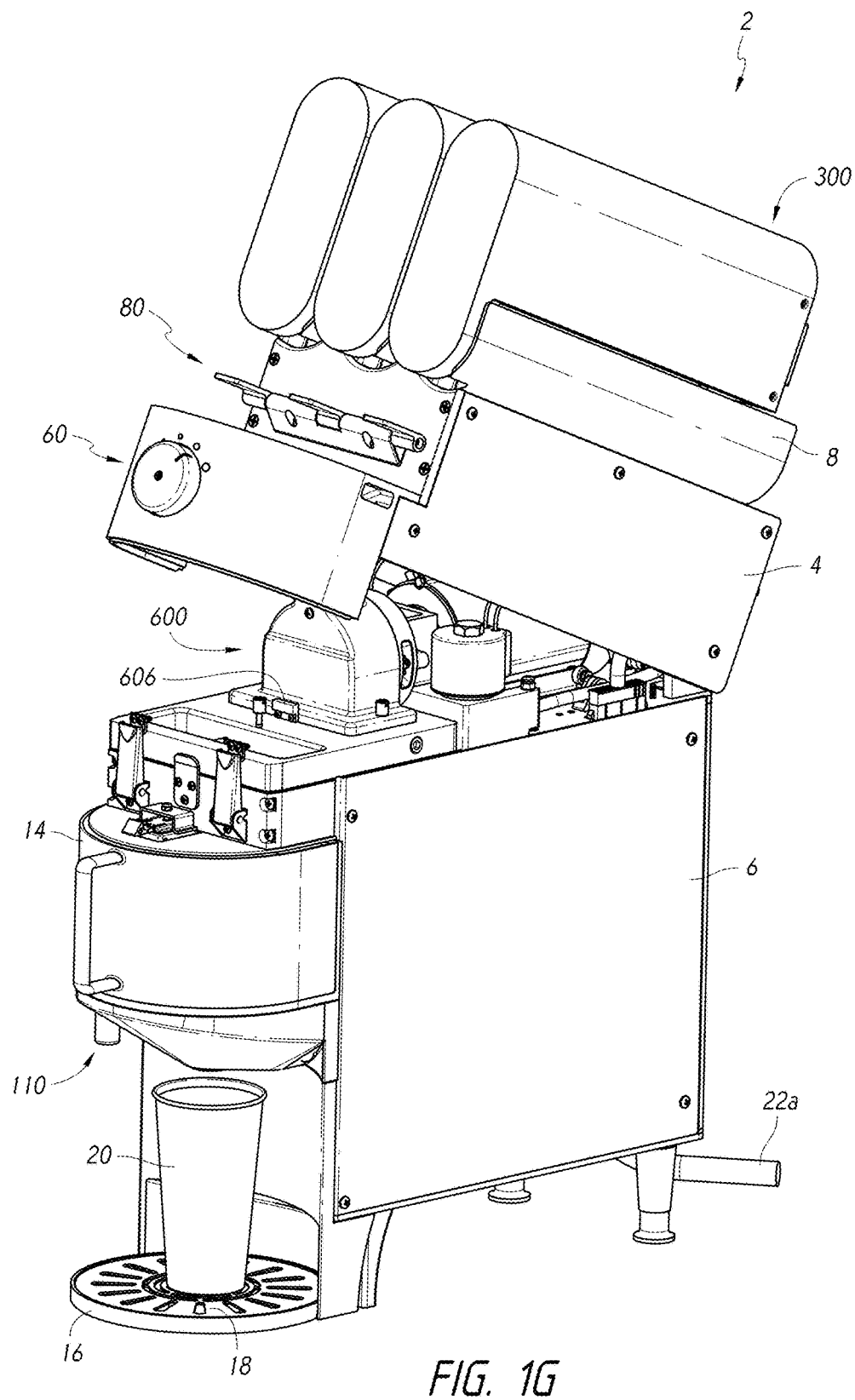
FIG. 1G illustrates a perspective view of the system shown in FIG. 1A with the upper portion in an opened position.

FIGS. 1A-1G illustrate an exemplary embodiment of a beverage apparatus 2 designed to quickly and automatically brew a single-cup portion or a traveler portion (i.e., multiple-cup portion) of a beverage, such as coffee. In general, the beverage apparatus 2 can include an upper portion 4 and a lower portion 6. The upper and lower portions 4, 6 house the interior components described herein. For serviceability, the lower portion 6 can be easily disassembled to provide access to the brewing assembly 400, particularly the piston 426 (see FIG. 2N). Further, as shown in FIG. 1G, the upper portion 4 can move to an opened position relative to the lower portion 6 to access the interior components. As described in further detail below, in some embodiments, for user safety, the beverage apparatus can include power interlocks to shut down the machine when the upper portion 4 is in the opened position or the interior components are not fully assembled.

The beverage apparatus 2 can be designed, in part, to reduce the amount of counter space necessary to store the apparatus. For example, as shown in FIG. 1B, the hopper assemblies 300, the controls 60, 80, the waste bin 422, the dispenser assembly 110, and the base portion 16 can be generally longitudinally aligned to reduce the width of the beverage apparatus 2. Further, each of the hopper assemblies 300 can have a narrow width, such that the beverage apparatus 2 can include a multiple number of hopper assemblies 300 without excessively increasing the width of the beverage apparatus 2. The longitudinally aligned design also facilitates the general downward flow of beverage material and fluid to reduce the length of the brew cycle. Further, to improve the customer experience, the hoppers assemblies 300 can include one or more transparent walls so the user can observe the beverage material and the delivery of the beverage material to the grinder assembly 500.

As shown in FIG. 1C, one or more power cables 22a, 22b can connect to the rear side of the beverage apparatus 2 to deliver electricity to the apparatus 2. The rear side of the beverage apparatus 2 can also include a number of vents 24, 26 for cooling the beverage apparatus 2. The vents 24, 26 can also allow the beverage aroma to escape to help improve the customer experience. As shown in FIG. 1D, a side of the beverage apparatus 2 can include one or more additional vents 32.

The rear side of the beverage apparatus 2 can also include a number of Ethernet or USB ports 28 to transfer information to and from the beverage apparatus 2 (see FIG. 1C), for example, to form a daisy chain. As another example, information related to the usage of the beverage apparatus 2 can be transferred to a central database for mining data. In yet another example, software updates can be transferred to the beverage apparatus 2. The beverage apparatus 2 can also communicate with other beverage apparatuses 2, for example, to coordinate power usage. Further, the beverage apparatus 2 can include a circuit breaker 30 disposed on the rear side of the apparatus 2. Additional information related to data communication can be found in the U.S. Provisional Application No. 61/906,872, titled "COOKING SYSTEM POWER MANAGEMENT," filed Nov. 20, 2013, and U.S. application Ser. No. 14/548,226, titled "COOKING SYSTEM POWER MANAGEMENT," which is filed on the same day as the present, both of which are hereby incorporated by reference in their entirety.

Referring back to FIG. 1A, the beverage apparatus 2 can include a base portion 16 for receiving or supporting a container 20. The base portion 16 can include a drip plate 18 to capture any spilled beverage. In some embodiments, the base portion 16 can be in the fluid communication with a drain.

As described above, the beverage apparatus 2 allows a user to quickly and easily brew a variety of types of single-cup portions of a beverage. To select the type and size of beverage, the beverage apparatus can include a number of controls 60, 80. As shown in FIG. 1A, all of the controls 60, 80 can be on a proximal side of the beverage machine 2 so that the features are hidden from customers.

In some embodiments, the beverage apparatus can include a hopper selector assembly 80 having a number of paddles 82a, 82b, 82c that can be used to select one or more beverage materials (e.g., types of coffee beans). The beverage material selection can be automatically or manually cancelable. Further, the paddles 82a, 82b, 82c can mechanically reset to indicate completion of a brew cycle. In some embodiments, each paddle 82a, 82b, 82c corresponds to a separate hopper. The paddles 82a, 82b, 82c can be aligned with the hoppers. Alignment of the paddles 82a, 82b, 82c with the hoppers can provide visual confirmation of the correspondence between each paddle 82a, 82b, 82c and a selected hopper.

In some embodiments, the beverage apparatus 2 can include a beverage size control assembly 60 that can be used to select the desired size of the beverage. The beverage size control assembly 60 can include a locking mechanism to prevent the size control assembly 60 from turning when pushed in. This locking mechanism ensures that the size control assembly 60 correctly indicates the size of the beverage being brewed.

In some embodiments, the beverage apparatus 2 can include a display screen 10 that can display data or information relating to the beverage apparatus 2, such as beverage parameters, settings, or maintenance reminders. The beverage apparatus 2 can also include a display control 12 to control the type of information being displayed or input specific parameters or settings.

To accommodate different types of beverages, the beverage apparatus 2 can include three hopper assemblies 300, each of which can hold a different type of beverage material (e.g., dark roast coffee, medium roast coffee, light roast coffee, and/or decaffeinated coffee). In other systems, the system may include more or less than three hopper assemblies 300. As shown in FIG. 1A, the hopper assemblies 300 are in a side-by-side configuration. The side-by-side configuration makes it easier to refill and maintain the hopper assemblies 300. Further, the hopper assemblies 300 can be positioned such that a transverse axis of each hopper assembly 300 is substantially parallel with a base of the beverage apparatus 2. The hopper assemblies 300 can deliver a controlled dose of beverage material without requiring an incline. However, in other embodiments, the hopper assemblies 300 can be positioned at an incline.

The hopper assemblies 300 can be positioned above the upper portion 4 of the beverage apparatus 2. For example, the beverage apparatus 2 can include a hopper retainer 8 for retaining the hopper assemblies 300. Further, as shown in FIG. 1C, each of the hopper assemblies 300 can include one or more hopper engagement features 360 disposed along a distal portion of the hopper assembly 300. Each hopper engagement feature 360 can engage an adjacent hopper assembly 300.

As described in further detail below and shown in FIGS. 3A-3J, each hopper assembly 300 can include a tapered auger 308 that can improve dose accuracy and increase the effective volume of the hopper. The hopper assemblies 300 can also retain the auger 308 in a manner for easy disassembly and easy cleaning. Further, each hopper assembly 300 can be directly or indirectly connected to a hopper motor 34 (see FIG. 2N). The hopper motor 34 can turn the auger 308 in a clockwise or counter-clockwise direction. As described in further detail below, the ability to reverse the auger 308 rotation can help reduce spillage and improve dose accuracy by providing a repeatable and known initial position.

The beverage apparatus 2 may include at least one grinder assembly 500 for providing a controlled grind size (see FIGS. 2N and 5A-5E). Each of the hopper assemblies 300 or a subset of the hopper assemblies 300 may be in communication with a single grinder assembly 500. Use of a single grinder assembly 500 can reduce the cost of goods, reduce points of failure, and reduce the size of the beverage apparatus 2.

As described in further detail below, the grinder assembly 500 can include a grinder adjustment mechanism to automatically adjust the grind size based on the selected beverage. Further, the grinder assembly 500 can also include various safety features to undo jams or prevent operation when the grinder assembly 500 is not correctly positioned in the beverage apparatus 2.

Figure 7A:
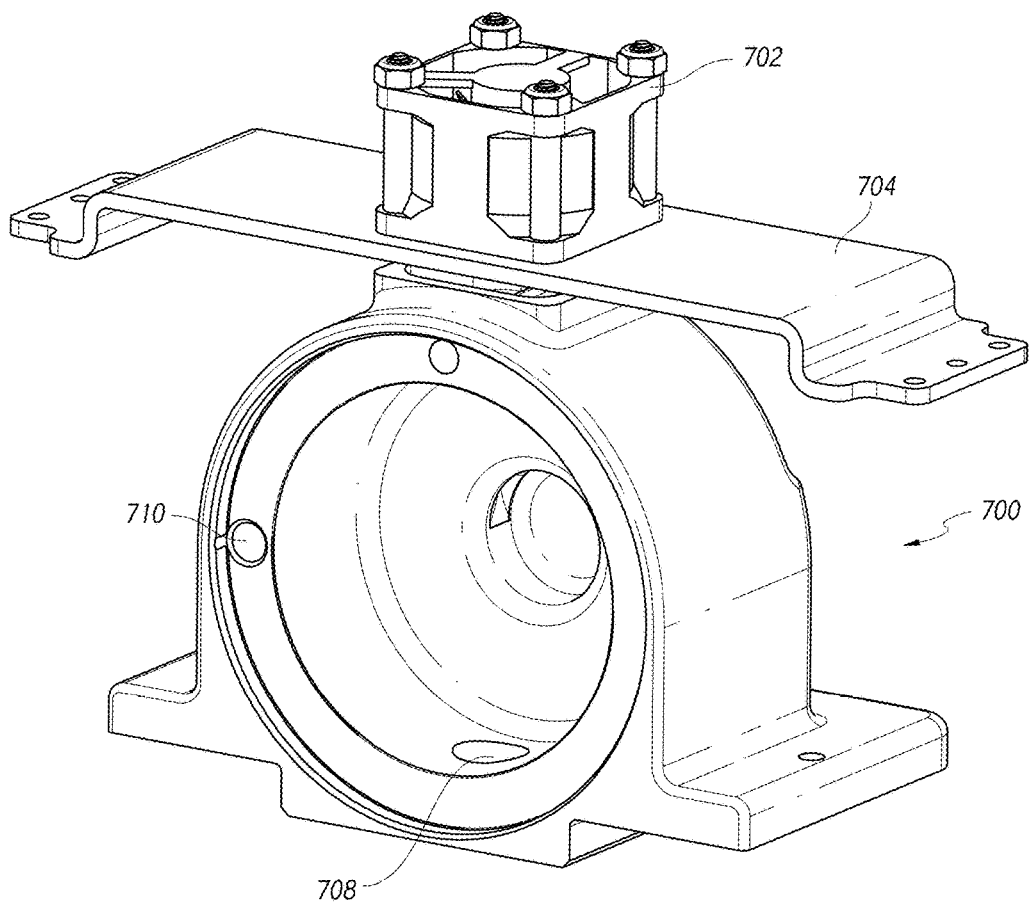
FIG. 7A illustrates an embodiment of a grinder outlet subassembly.

In some embodiments, as shown in FIG. 7A, the beverage apparatus 2 can include a grinder outlet subassembly that can create positive pressure to displace steam and moisture from the grinder assembly 500. The grinder outlet subassembly can include a baffle 712 positioned above the grinder assembly outlet 510 and a fan 702 that can provide airflow about the baffle device 712. The baffle device 712 is positioned such that the grinder assembly outlet 510 is disposed between the fan 702/baffle device 712 and the brew chamber 402. In some embodiments, the baffle 712 can be disposed on an upper portion of a grinder cap 700.

As shown in FIGS. 6A-6F, the beverage apparatus 2 can include an upper brewing assembly 600 with one or more fluid channels for delivering water to the brew chamber 402. For example, a first fluid channel 604 can include a mixing valve 800 disposed at the outlet. As described in further detail below, the mixing valve 800 can produce a number of angled water jets. The angled water jets can immediately wet the ground material as the ground material enters the brew chamber 402.

Ground coffee can have a lot of static causing the coffee grinds to adhere to different components. If the ground coffee enters the grinder assembly 500, the grinder assembly 500 can clog and shut down. Thus, immediately wetting the ground material can mitigate the amount of dry grounds that can adhere throughout the brew chamber 402. Further, immediate wetting ensures that the ground material forms an evenly packed bed of grounds with a substantially uniform depth.

The mixing valve 800 can also consistently and efficiently wet the ground material to advantageously maximize flavor extraction, and provide agitation. In doing so, the level of extraction from the beverage material can be consistent from cup to cup. Further, the mixing valve can maximize the level of extraction, which can lower the total amount of beverage material necessary.

In some embodiments, the upper brewing assembly 600 can also include a second fluid channel 602 having a fill nozzle 806 through which water is delivered to the brew chamber. The temperature (e.g., net or at any time) of the water delivered from the fill nozzle 806 and the mixing valve 800 can be different. The difference in temperature can be actively controlled (e.g., using a heater) or passively controlled based on the geometry of the fill nozzle 806 and the mixing valve 800 (e.g., outlet diameter or surface area). Advantageously, the timing and amount of water delivered from the fill nozzle 806 and the mixing valve 800 can be controlled to produce different beverages.

In certain aspects, the temperature difference can be actively controlled, for example, using a second heater and/or a separate water reservoir. In other aspects, the temperature difference is attributable to the difference between the diameter of the fill nozzle outlet and the diameter of the mixing valve outlet.

In some embodiments, the upper brew assembly 600 is removable from the beverage apparatus 2 by opening the upper portion 4. The upper brew assembly 600 can be easily disconnected for cleaning.

Figure 4B:
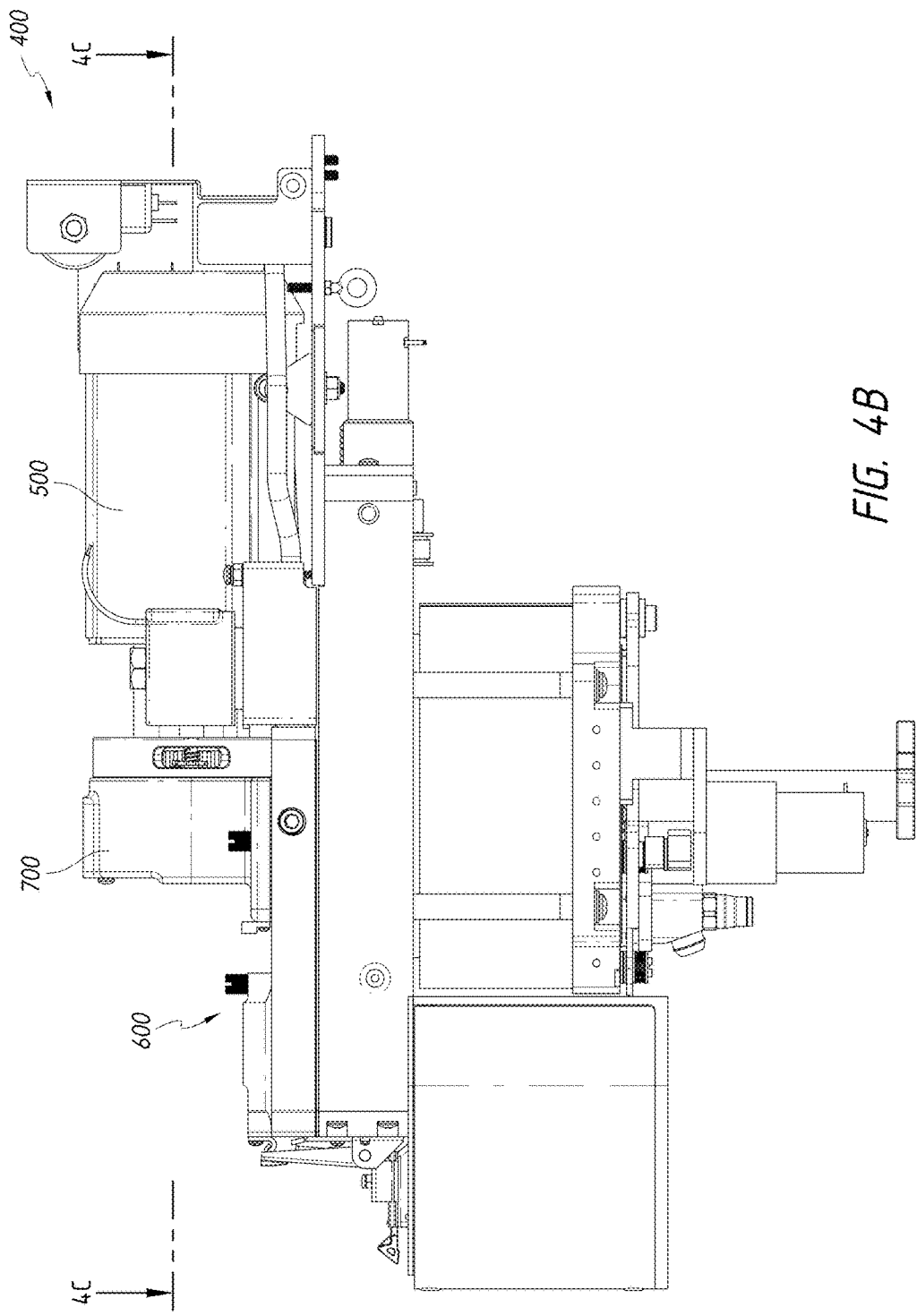
FIG. 4B illustrates a side plan view of the grinding and brewing assembly of FIG. 4A.
Figure 4C:
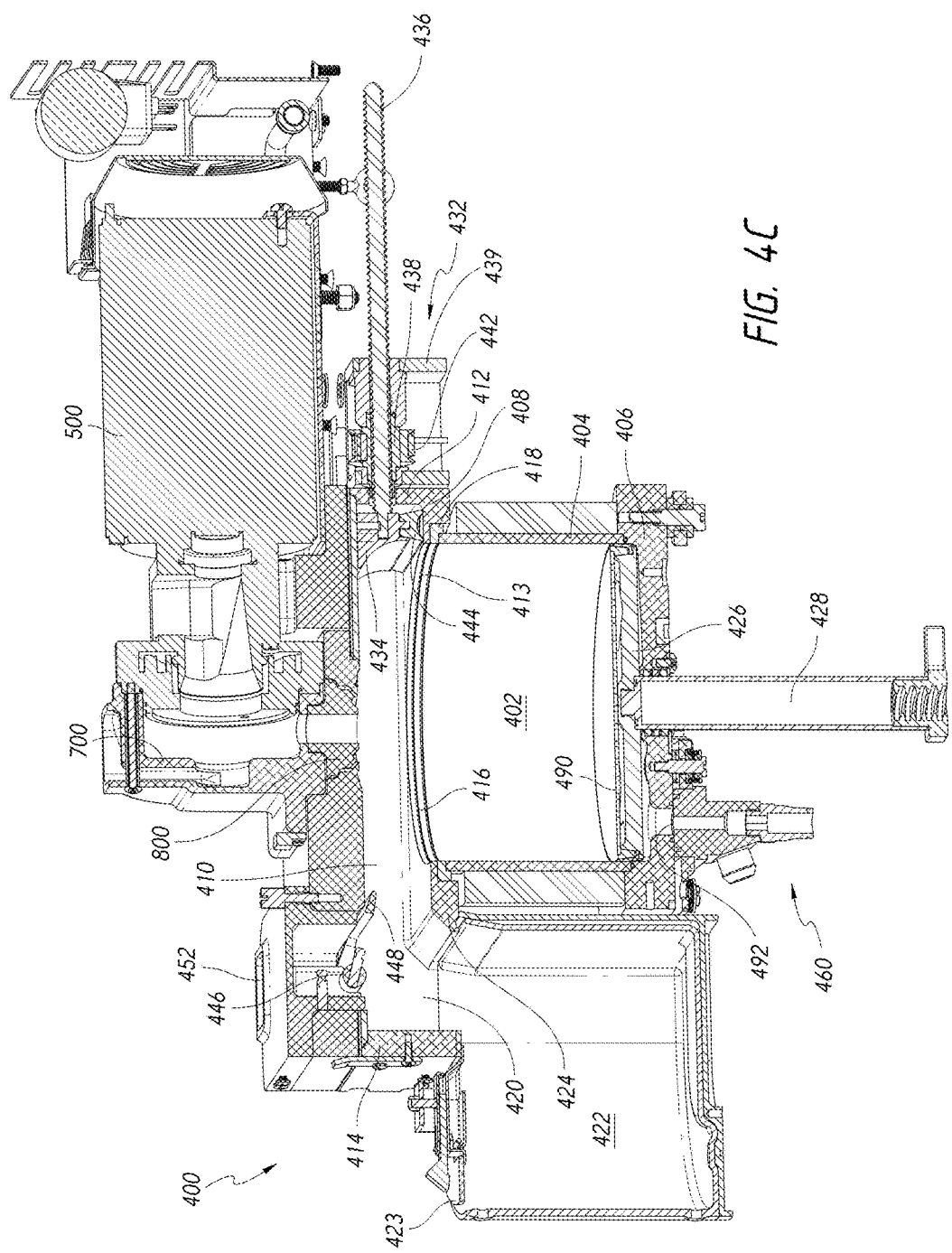
FIG. 4C illustrates a perspective cross-section view of the grinding and brewing assembly of FIG. 4A in a first configuration.

In some embodiments, as shown in FIGS. 4C-4E, a piston 426 can move through the brew chamber 402. The brewing assembly 400 can include a relatively fine filter so that the dispensed beverage has an appropriate texture (e.g., clarity and/or level of particulates) and is not too murky. The filter can compensate for finer grinds and produce a cup of beverage with appropriate clarity. A relatively large piston 426 can also be advantageous because a large piston 426 allows the machine to provide a more aggressive and faster filtering process. The large piston 426 also allows the puck of ground material to be relatively thin to provide more efficient filtration. In some embodiments, the piston 426 has a diameter between about 3.0 inches and about 7.0 inches, such as about 5 inches, about 5.5 inches, or about 6.0 inches.

In some embodiments, as shown in FIGS. 10A-10F, the beverage apparatus 2 can include a rotary valve assembly 460 that includes a brew outlet valve 462. The brew outlet valve 462 can transition between two or more valve positions. For example, the brew outlet valve 462 can transition between a first position wherein fluid communication is provided between the interior of the brew chamber 402 and the dispenser assembly 110, and a second position wherein fluid communication is provided between the interior of the brew chamber 402 and a drain of the beverage apparatus 2. The drain can comprise a fluid line (e.g. a flexible fluid line) between the rotary valve assembly 460 and a disposal system external to the brewing apparatus 2. In some embodiments, the brew outlet valve 462 can transition to a third, closed position.

Figure 2A:
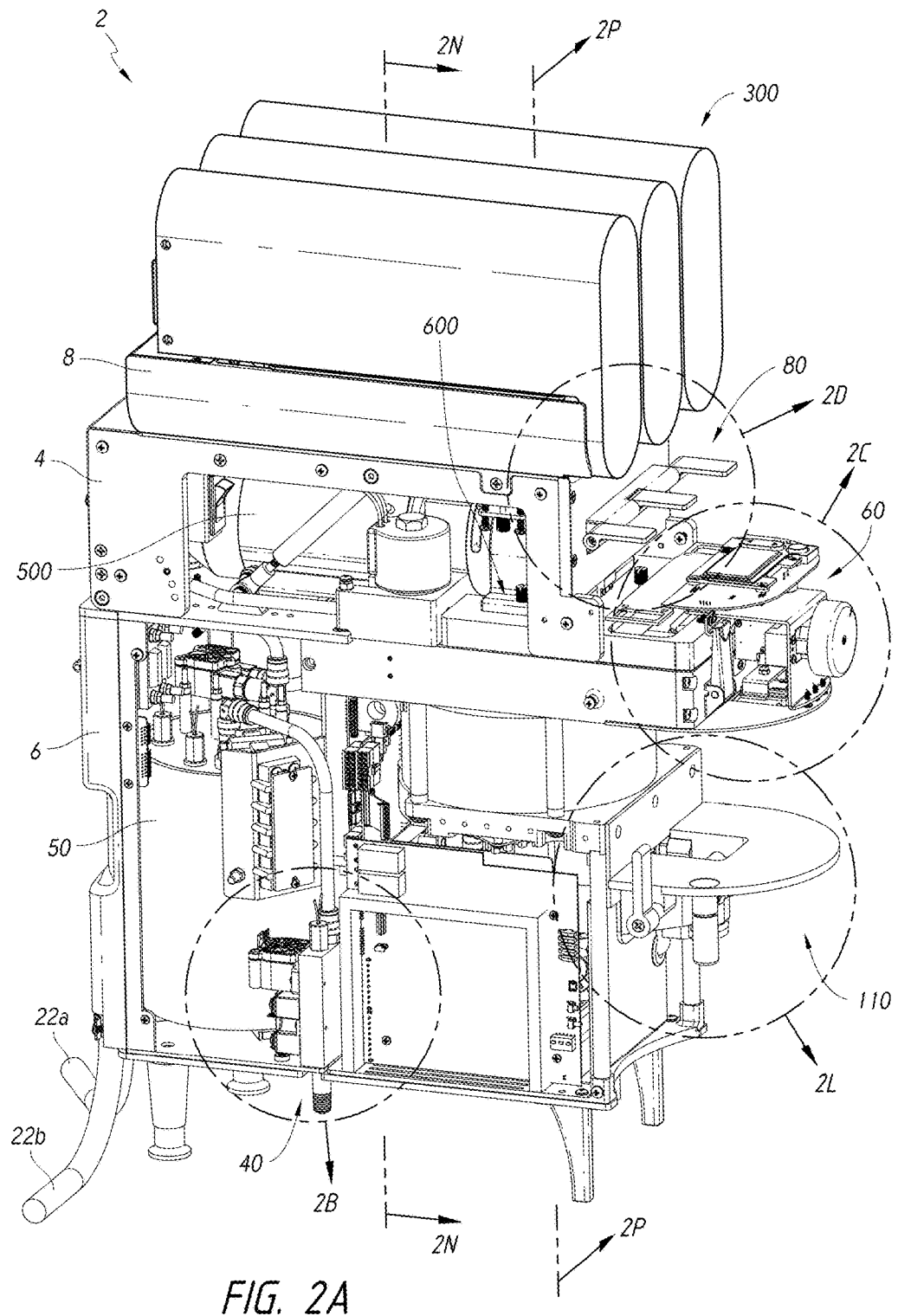
FIG. 2A illustrates a perspective view of the system shown in FIG. 1A with the outer housing removed.
Figure 2B:
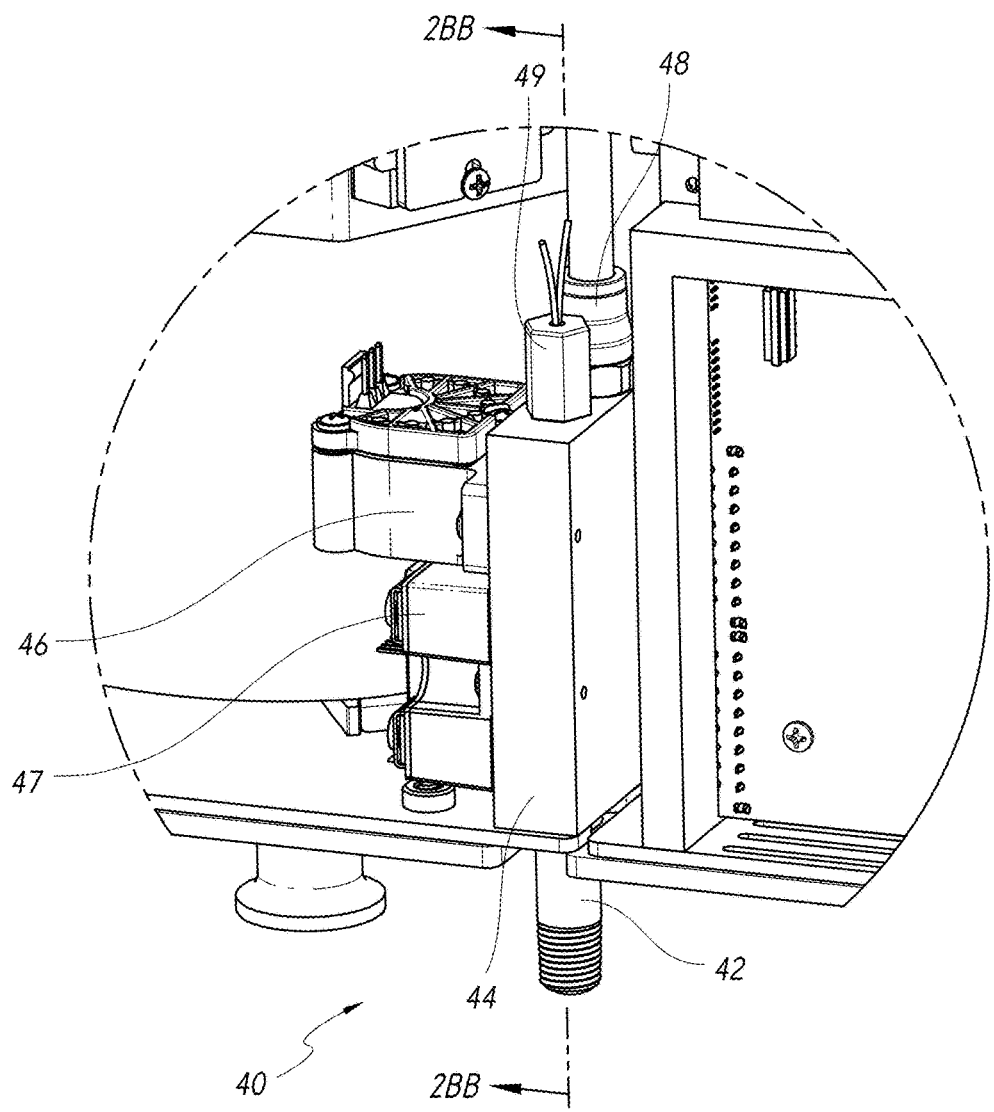
FIG. 2B illustrates a perspective view of a water intake assembly of the system of FIG. 1A.
Figure 2B:
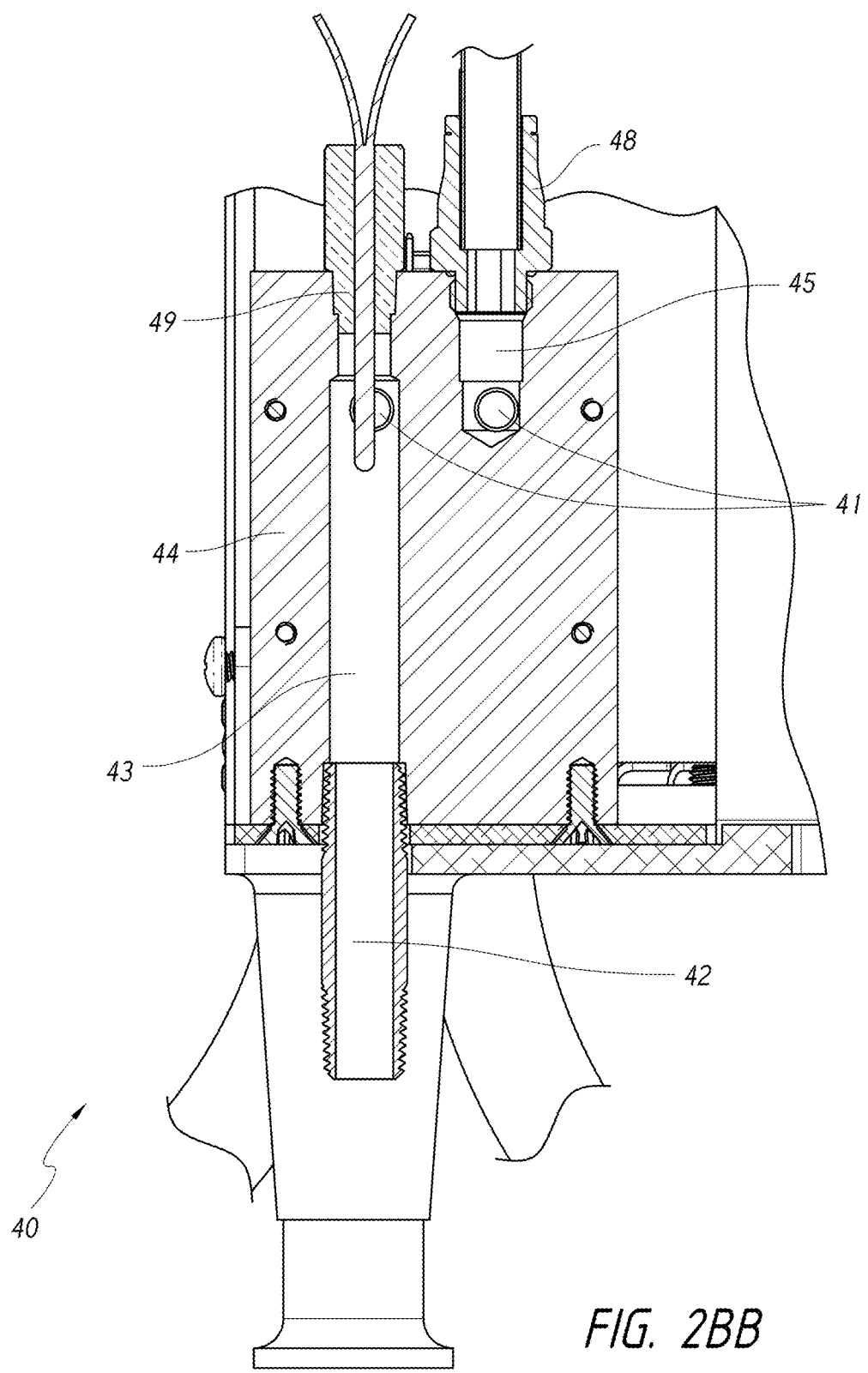
Figure 2C:
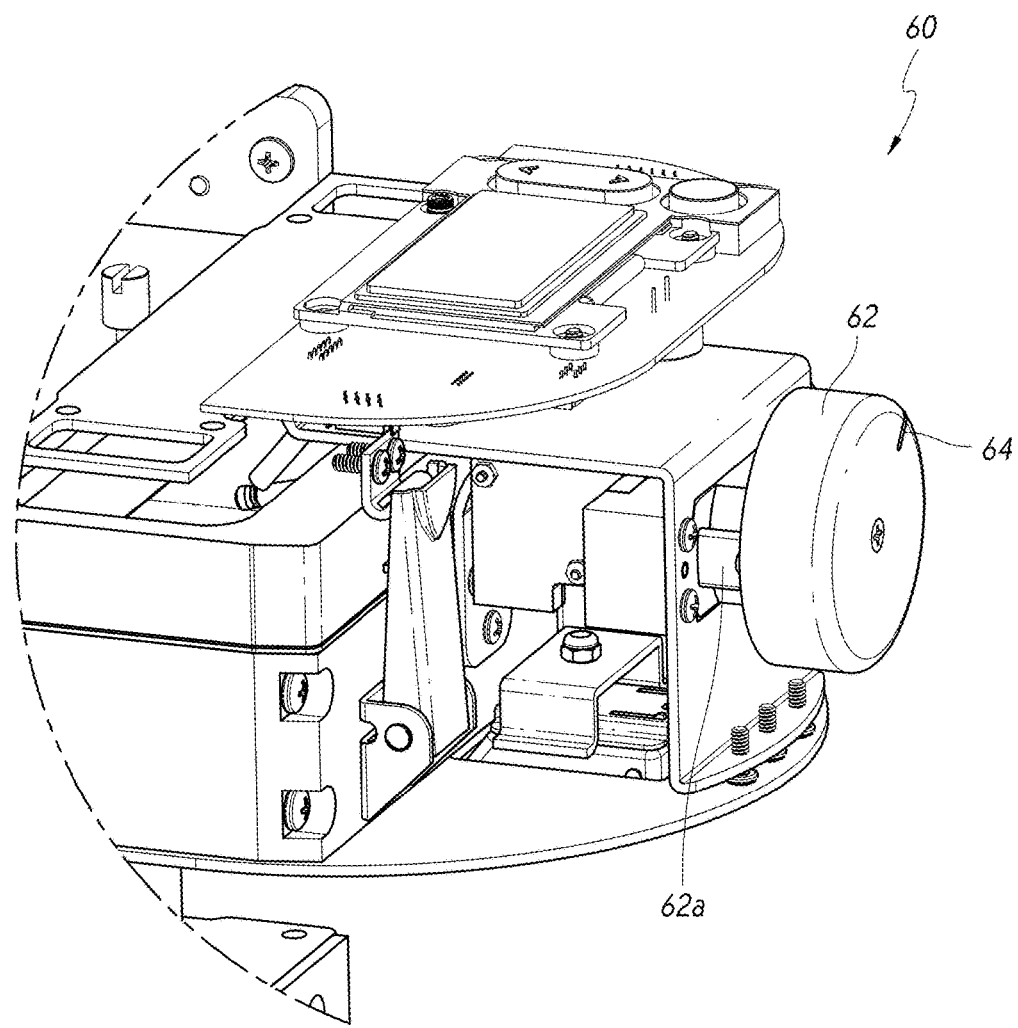
FIG. 2C illustrates a perspective view of a beverage size control assembly of the system of FIG. 1A.
Figure 2D:
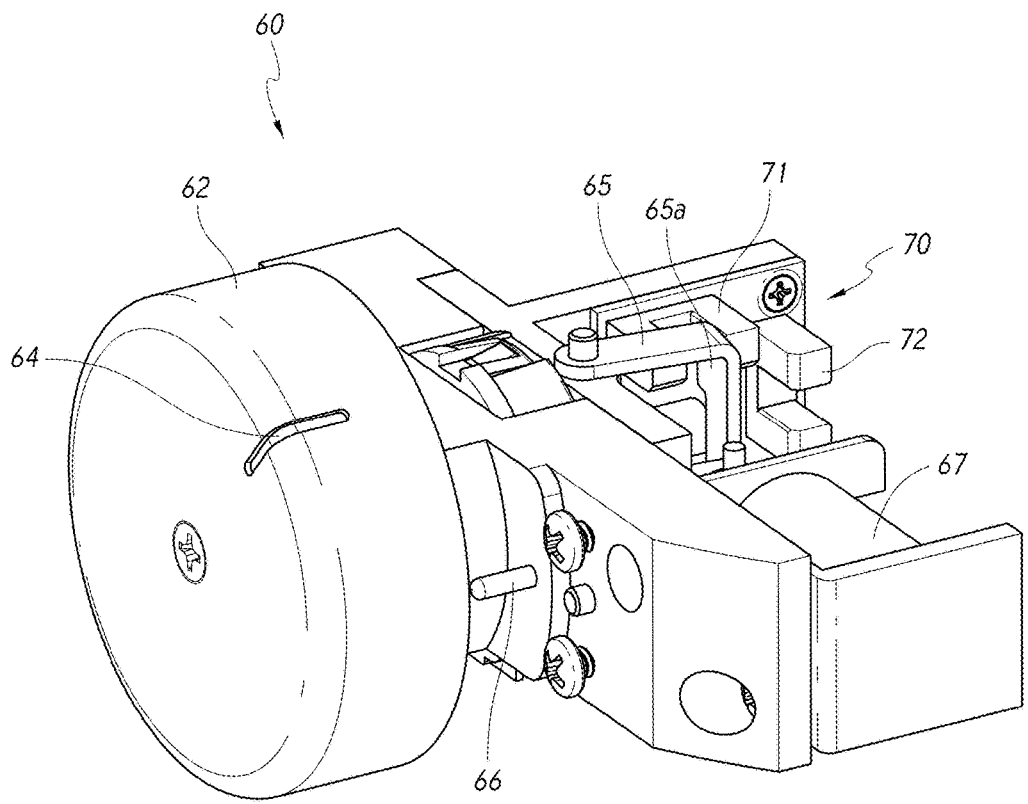
FIG. 2D illustrates a rear perspective view of the beverage size control assembly of FIG. 2C.
Figure 2H:
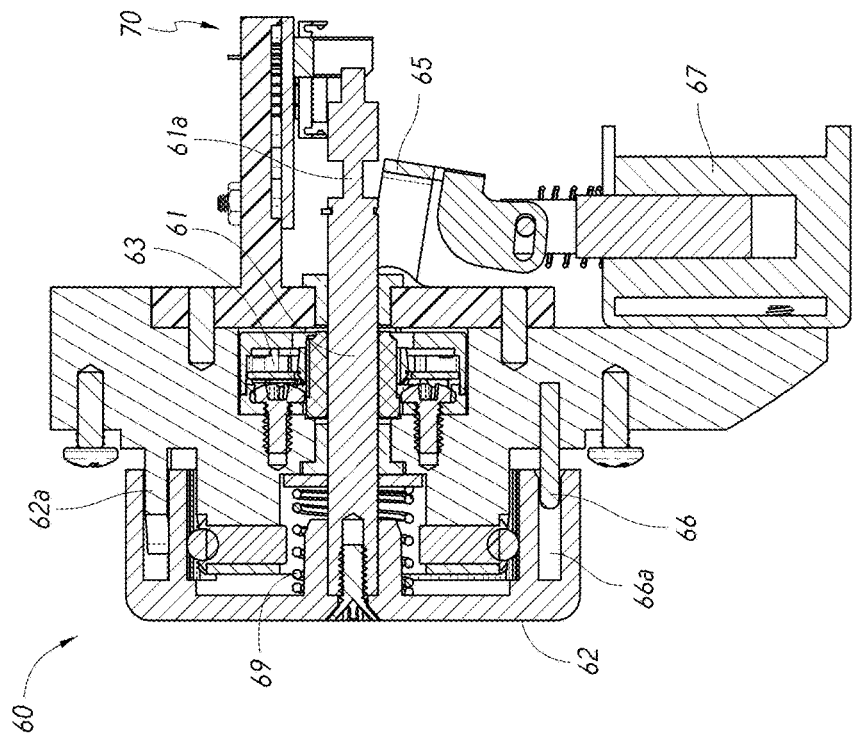
FIG. 2H illustrates a cross-section of the beverage size control assembly of FIG. 2C in a released configuration.
Figure 2G:
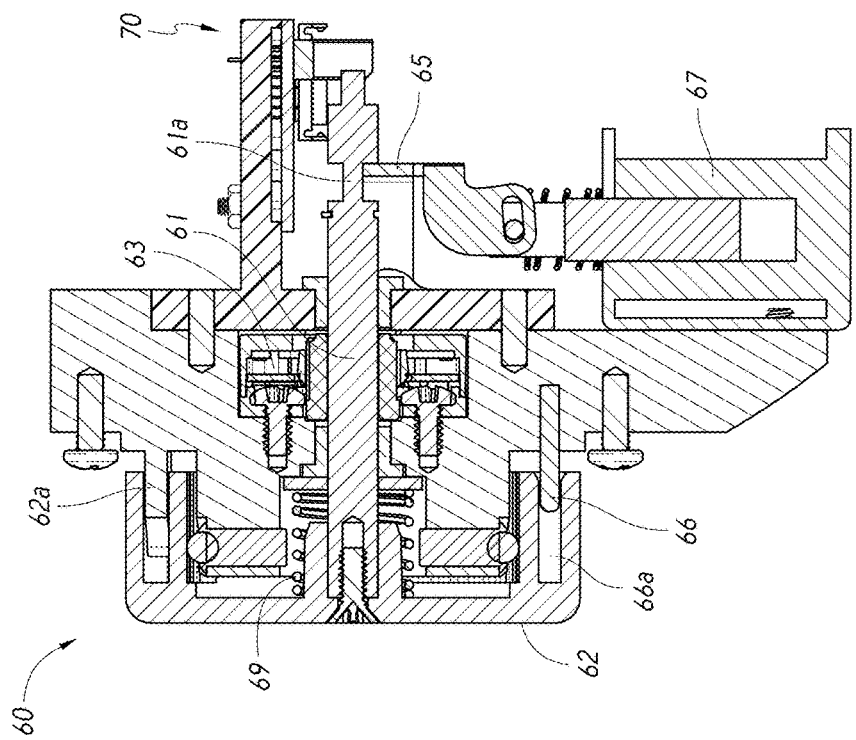
FIG. 2G illustrates a cross-section of the beverage size control assembly of FIG. 2C in an operative position.
Figure 21:
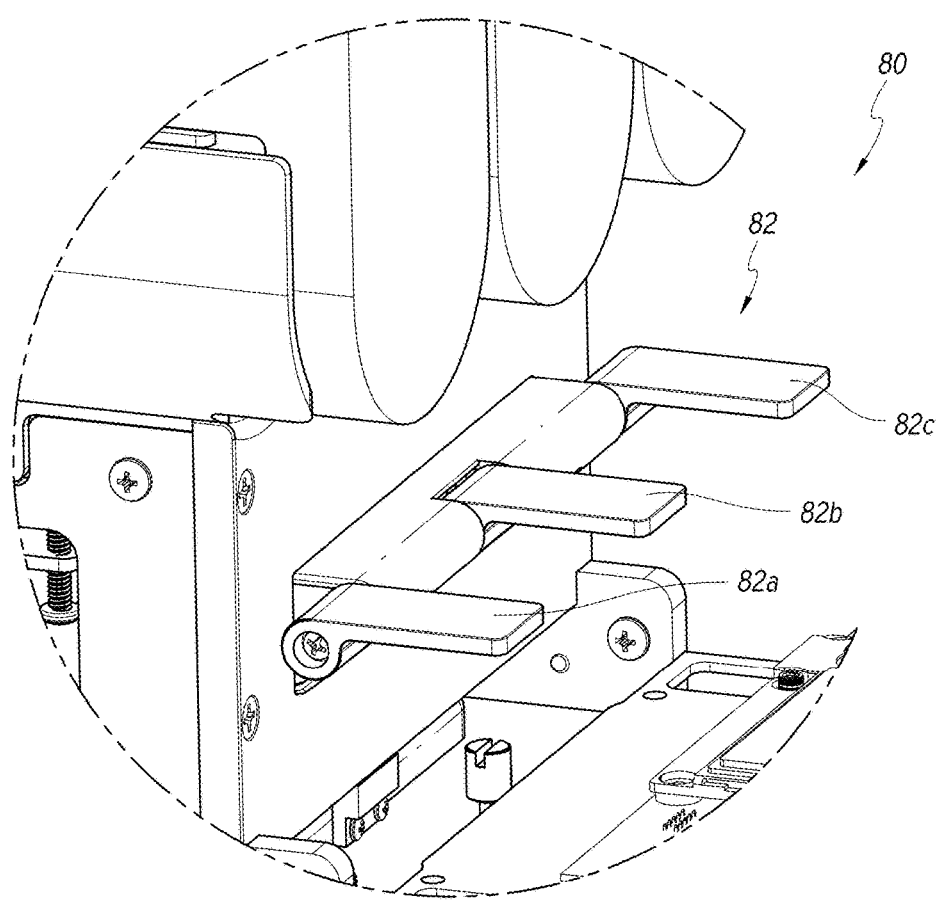
Figure 2J:
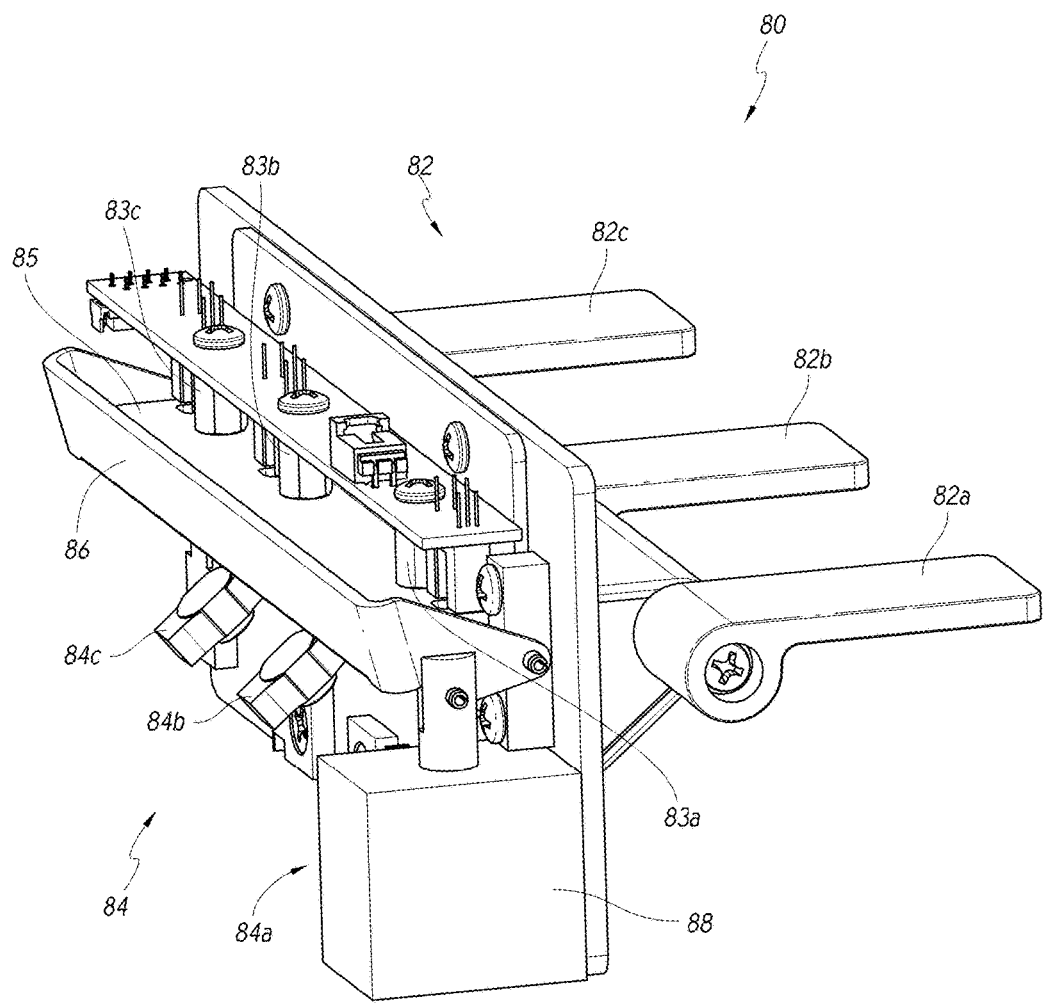
FIG. 2J illustrates a rear perspective view the hopper selector assembly of FIG. 2I.
Figure 2K:
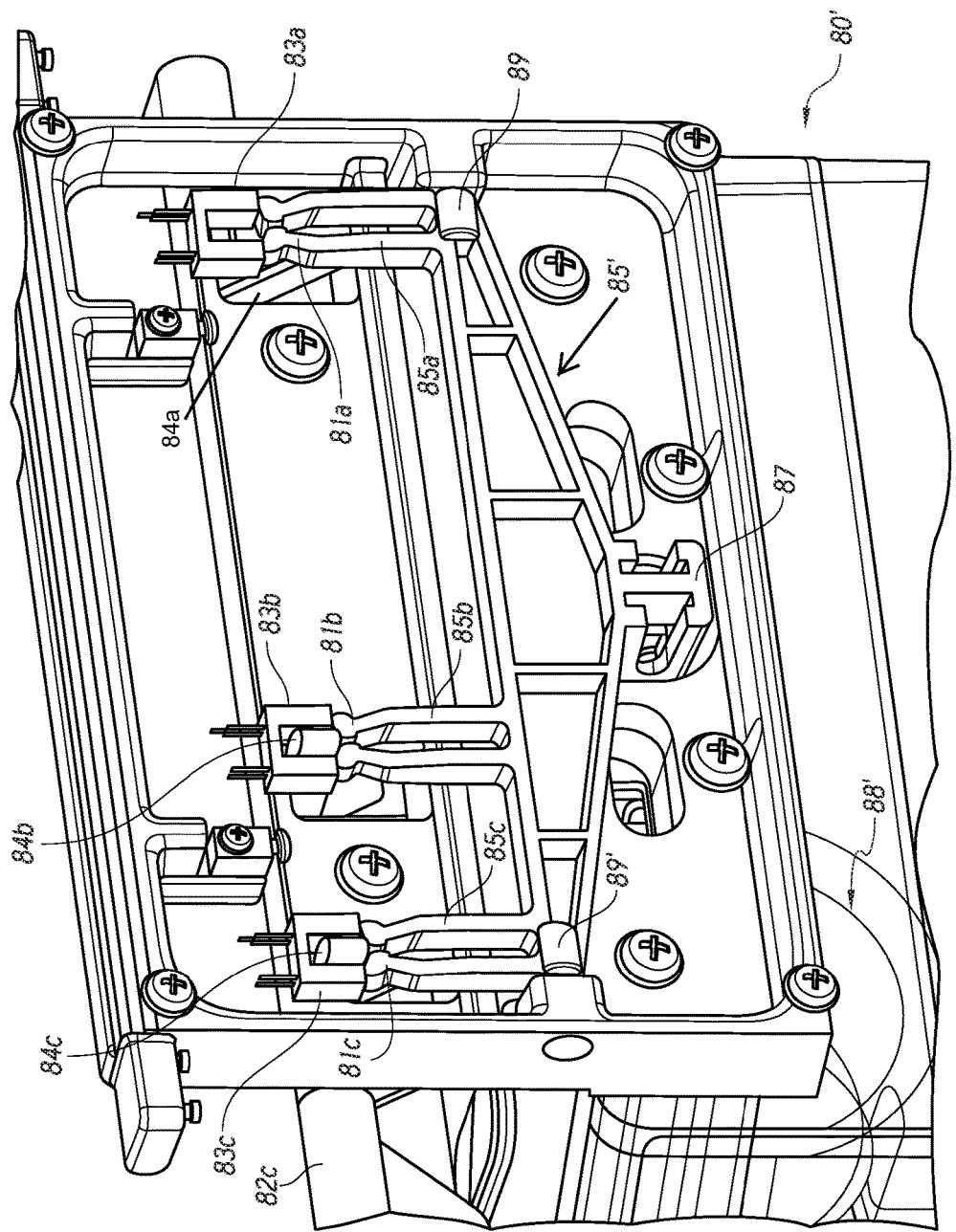
FIG. 2K illustrates a rear perspective view of another embodiment of a hopper selector assembly of the system of FIG. 1A.
Figure 2L:
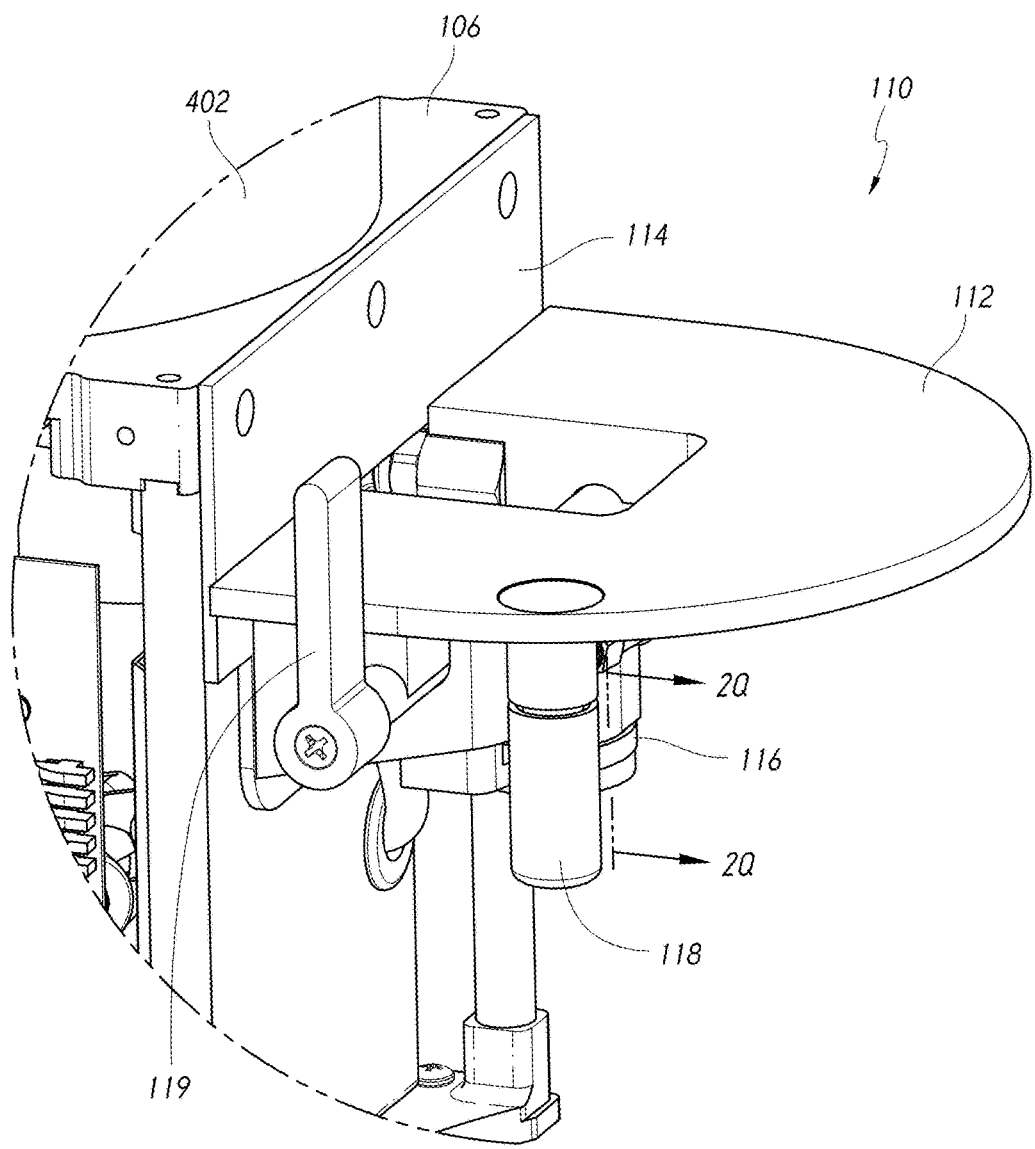
FIG. 2L illustrates a perspective view of a dispenser assembly of the system of FIG. 1A.
Figure 2M:
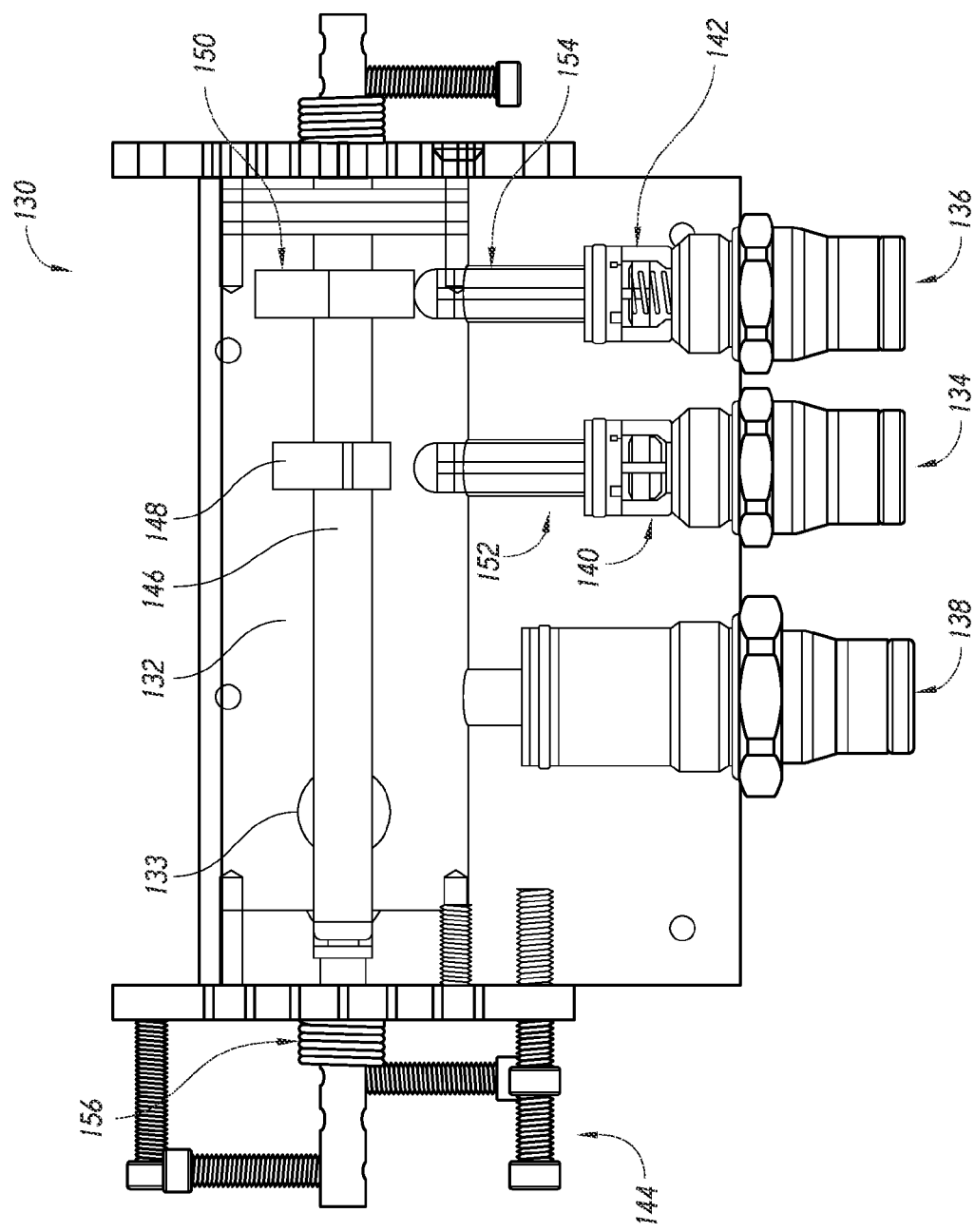
FIG. 2M illustrates a plan view of a hot water valve system of the system of FIG. 1A.

In some embodiments, as shown in FIGS. 2L-2M, the beverage apparatus 2 can include a hot water dispenser 118 independent from the beverage dispenser 116. The dispenser assembly 110 can include a hot water valve system 130 to deliver water at different temperatures to the hot water dispenser 118. This feature can be beneficial for producing multiple beverage products with different recipes, such as tea, hot chocolate, or oatmeal.

Figure 9A:
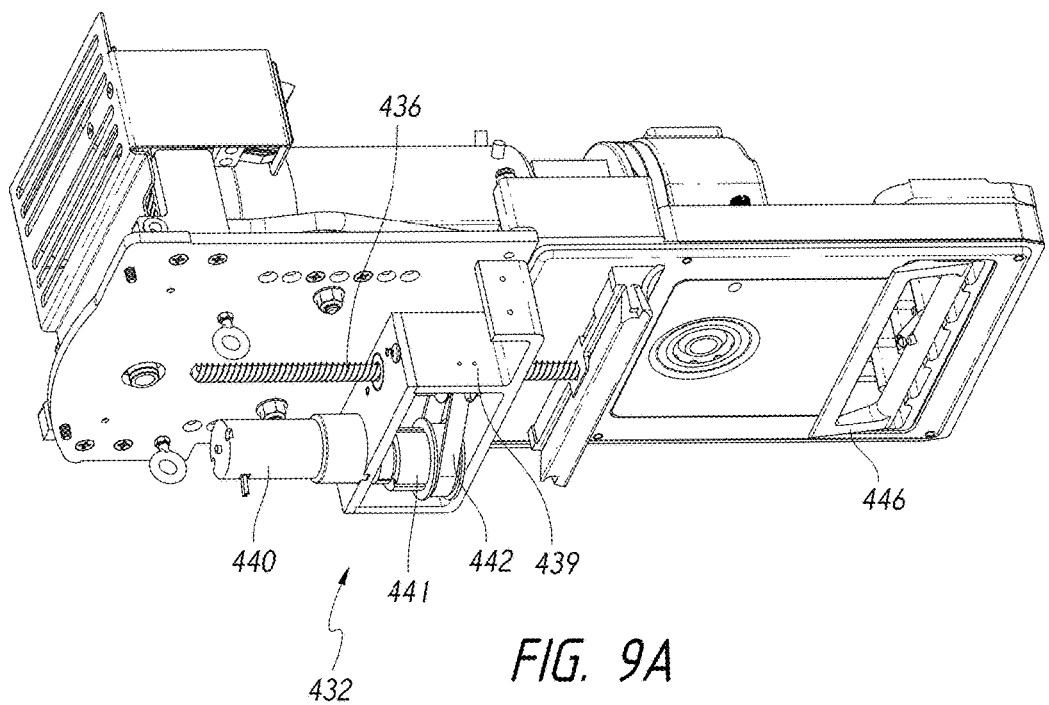
FIG. 9A illustrates a bottom perspective view of a grinder assembly and plow assembly of the system of FIG. 1A.
Figure 9B:
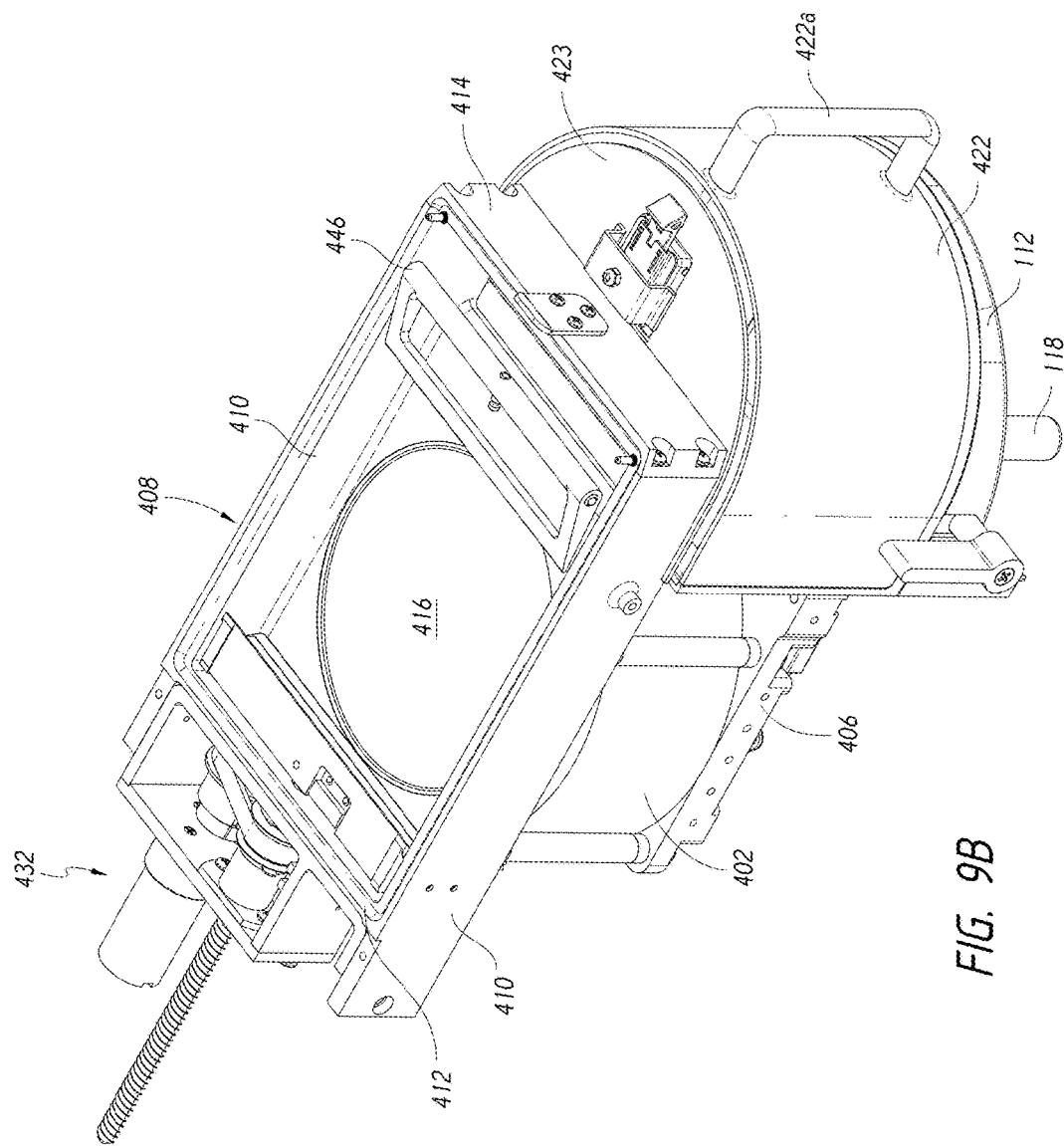
FIG. 9B illustrates a perspective view of a brewing assembly of the system of FIG. 1A.
Figure 9C:
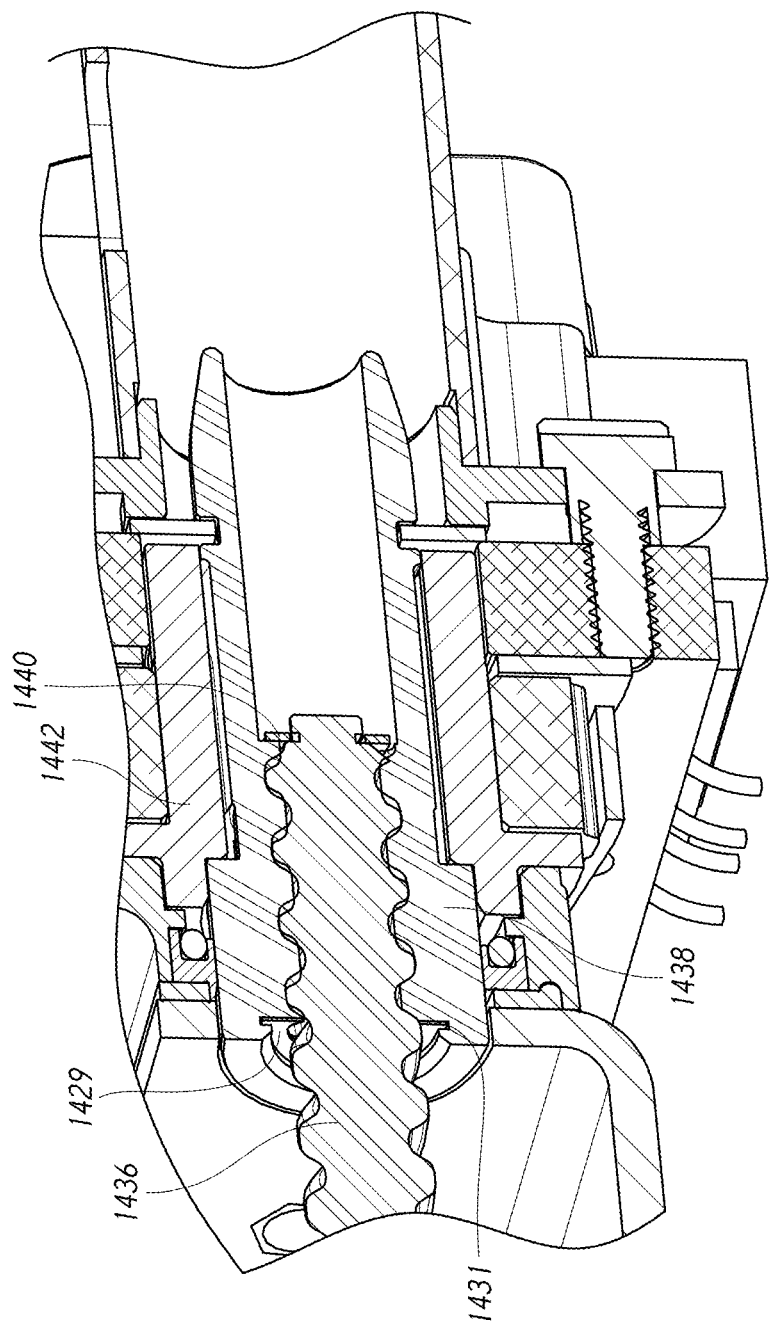
FIG. 9C illustrates a cross-sectional view of a portion of a plow assembly.
Figure 9D:
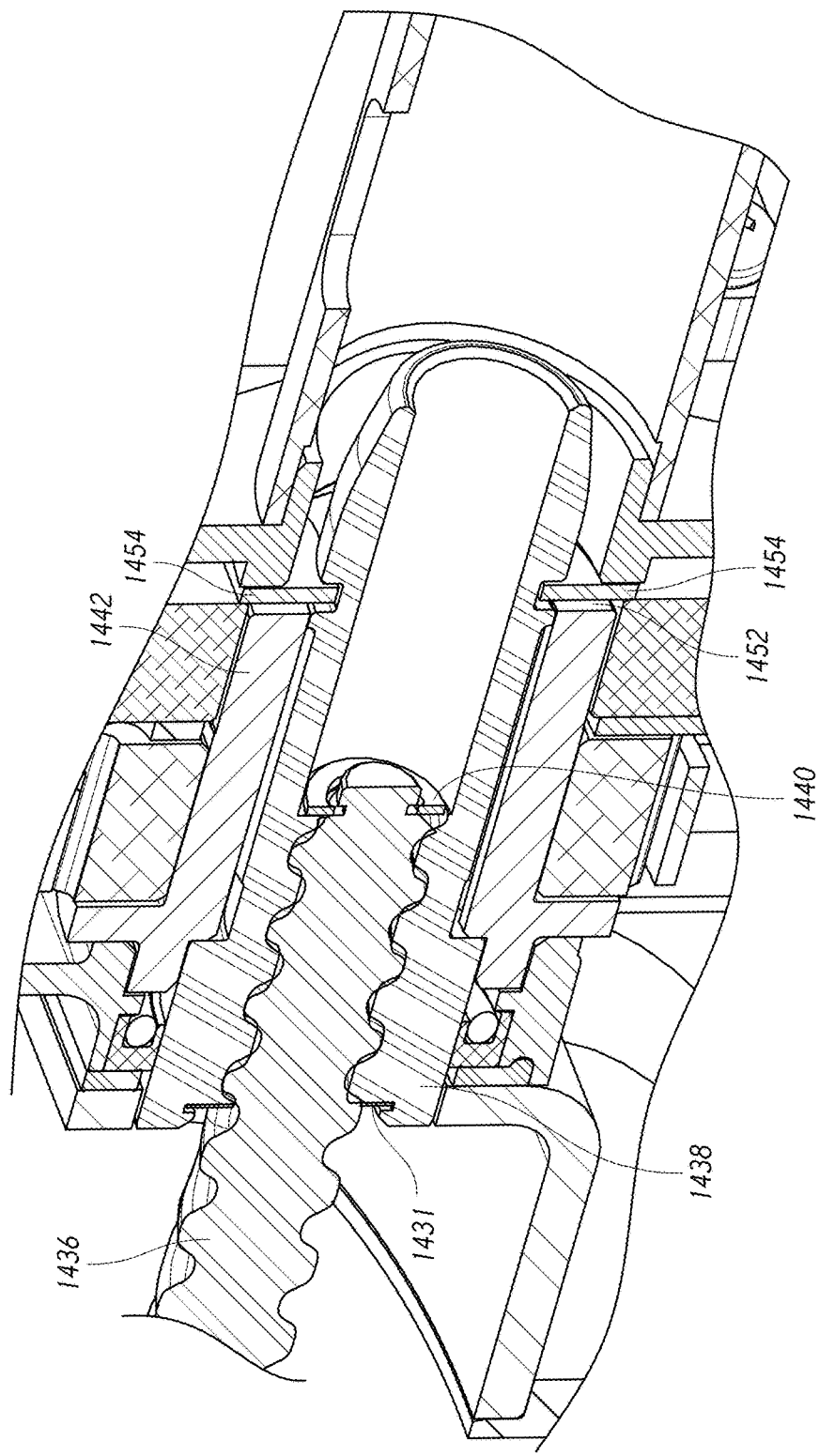
FIG. 9D illustrates another cross-sectional view of the portion of the plow assembly shown in FIG. 9C.

In some embodiments, as shown in FIGS. 9A-9B, the beverage apparatus 2 can include a plow assembly 432 that can clean interior components of the brewing assembly 400. The plow assembly 432 can be automatic such that a user does not need to manually clean components of a brewing machine between brewing cycles. The plow assembly 432 can move grounds and residue to the waste bin 422. The beverage apparatus 2 can also include a wiper 446 that can fully wipe the plow head 434 between cycles. Further, the plow assembly 432 can be configured for easy removal for serviceability.

The beverage apparatus 2 can include various features to help cool the system. For example, as shown in FIG. 2B, the beverage apparatus 2 can include a water intake assembly 40 that can dissipate heat within the apparatus 2. The water intake 40 assembly can direct cool water through the heat sink 46 before entering the boiler 50. As another example, the apparatus 2 can include an insulator ring 418 disposed between the brew chamber 402 and the upper brewing assembly 600.

Many of the features described herein, including, but not limited to, grind size adjustment, the brewing assembly, the water input system, the beverage dispensing features, and the plow assembly, are designed to brew beverages quickly. Existing brew processes for single-cup portions of a beverage often take more than 60 seconds. In contrast, the beverage apparatus 2 described herein can grind, brew, and dispense a single-cup portion of a beverage in about 60 seconds or less, such as less than 40 seconds, less than about 35 seconds, or less than about 30 seconds. In some embodiments, the beverage apparatus 2 can dispense the single-cup portion in less than about 10 seconds or less than about 5 seconds. Further, in some embodiments, the reset process, including cleaning the brewing assembly can also take about 30 seconds or less.

Although the beverage apparatus 2 is described with certain features, one or more of the assemblies or components described above may be omitted, replaced, consolidated, or divided among multiple subassemblies. Additional features described below can also be included.

Figure 1H:
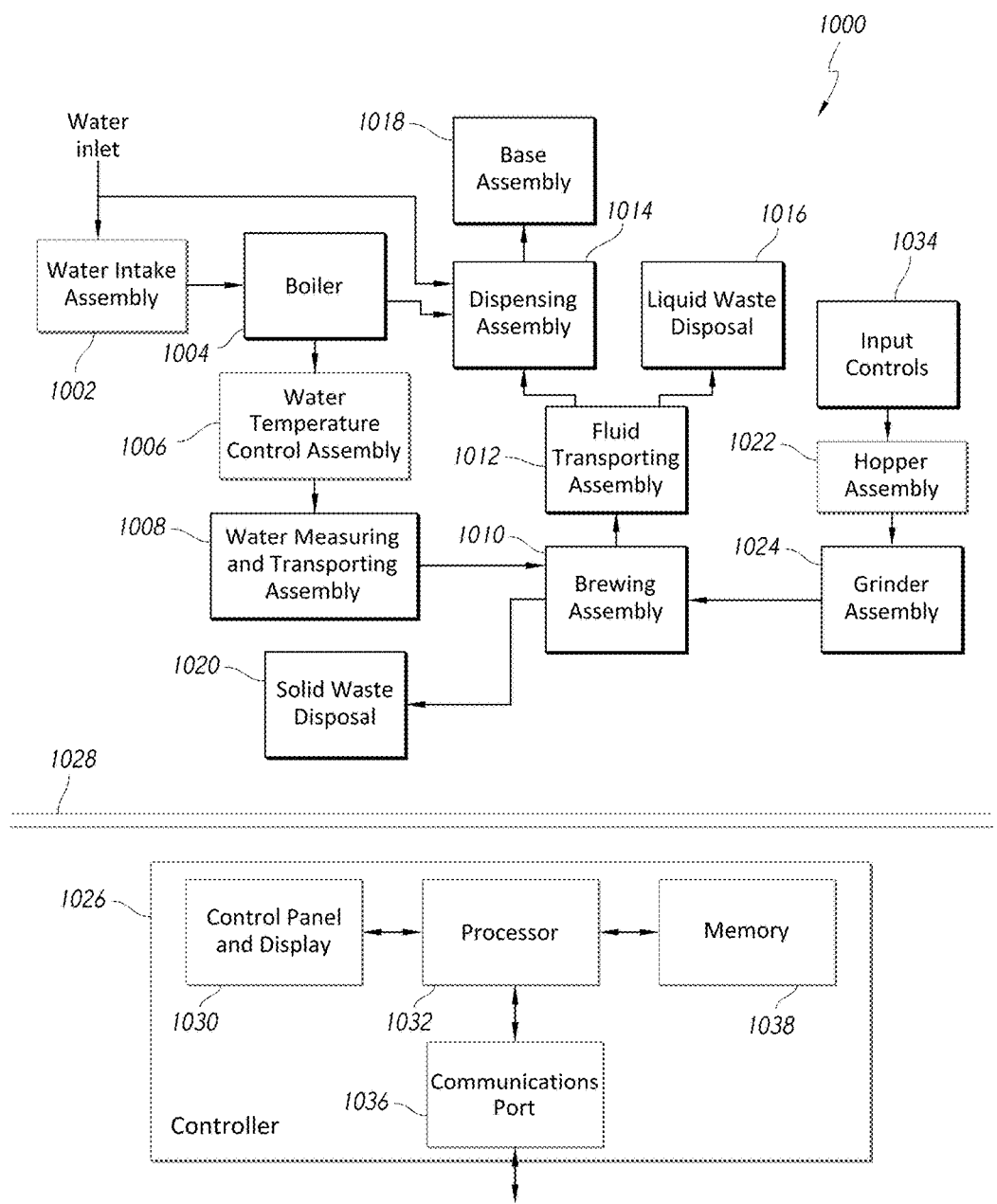
FIG. 1H illustrates a block diagram of a beverage apparatus for brewing a beverage.

FIG. 1H is a block diagram of a beverage apparatus 1000 for brewing a beverage. Although the beverage apparatus 1000 may brew beverages (e.g., tea, cocoa) other than coffee, for purposes of explanation the structure and operation of the beverage apparatus 1000 are described in conjunction with the machine brewing coffee.

The beverage apparatus 1000 can include a water intake assembly 1002. In some embodiments, the water intake assembly 1002 can include a water filter to filter the water that is used to brew the beverage. However, the water filter may not be necessary if the beverage apparatus 2 is installed in an establishment that has a water-purification system separate from the machine. In some embodiments, the water intake assembly 1002 can include a heat sink through which water can flow. The heat sink can dissipate such conductive or radiant heat by transferring the heat to the water passing through the heat sink. Transfer of heat to the water can preheat the water before it enters the boiler. Preheating the water before it enters the boiler can reduce the power requirements for the boiler and/or other components within the beverage apparatus 2. As described in further detail below, FIG. 2B illustrates a possible water intake assembly 1002 configuration. In some embodiments, at least some water can flow directly to the boiler 1004 and bypass the water intake assembly 1002, if present.

The boiler 1004 can receive and store water from the water intake assembly 1002 and heat the stored water to a desired temperature, for example to a temperature in the range from 150° F. to just below the boiling point of water, such as between about 190° F. and about 200° F. The heating element may be electric or any other type of conventional heating element.

In some embodiments, the beverage apparatus 1000 can include one or more sensors to measure the water temperature in the boiler 1004 or flowing from the boiler 1004. For example, the beverage apparatus 1000 can include a water temperature control assembly 1006 that can alter the temperature of the water from the boiler 1004 to provide different brew temperatures from cup to cup. The water temperature control assembly 1006 can receive water from the boiler 1004 during a brewing cycle, and, in response to the controller 1026, can adjust the temperature of the water received from the boiler 1004. In one implementation, the water temperature control assembly 1006 can mix the heated water from the boiler 1004 with colder water from the water intake assembly 1002 or water inlet to lower the temperature of the water used to brew the beverage. The water temperature control assembly 1006 may operate in an open-loop configuration by relying on a thermodynamic algorithm that, using the sensed temperatures of the heated and cold water, regulates the amount of cold water mixed with the heated water to provide water having a desired temperature. Alternatively, the water temperature control assembly 1006 may operate in a closed-loop configuration by sensing the temperature of the provided water and, in response to the sensed temperature, regulating the amount of cold water mixed with the heated water to provide water having the desired temperature. Moreover, instead of mixing water from the water intake assembly 1002 with the heated water, the water temperature control assembly 1006 may include a heat exchanger that allows the cold water to cool the heated water without actually mixing with the heated water. The water temperature control assembly 1006 may also be able to heat the water used to brew the beverage above the temperature of the water in the boiler 1004.

In some embodiments, the water temperature control assembly 1006 can sense the temperature of a fluid in the brew chamber. Based on the sensed temperature, the water temperature control assembly 1006 can control the temperature of water flowing into the brew chamber. For example, if the temperature of the fluid in the brew chamber is too high, cool water can be directed to the brewing assembly 1010. If the temperature of the fluid in the brew chamber is too low, hot water can be directed to the brewing assembly 1010.

Alternatively, the beverage apparatus 1000 may not include a water temperature control assembly 1006 and depend on the boiler 1004 to heat the water to the desired temperature.

The water measuring and transporting assembly 1008 transports a predetermined amount of water from the temperature control assembly 1006 to the brewing assembly 1010 during a brewing cycle. The brewing assembly 1010 can receive heated water from the water measuring and transporting assembly 1008, receive ground material from the grinder assembly 1024, brew a beverage, and then provide the brewed beverage to the dispensing assembly 1014 via the fluid transporting assembly 1012. As described in further detail below, FIGS. 4A-4F illustrate a possible embodiment of the brewing assembly. In some embodiments, the brewing assembly 1010 can include an upper brewing assembly (such as shown in FIGS. 6A-6F) to deliver water to the brew chamber. In some embodiments, the beverage apparatus 1000 can include a grinder outlet subassembly (as shown in FIG. 7A) to prevent water from moving from the brewing assembly 1010 to the grinder assembly 1024.

In some embodiments, the water measuring and transporting assembly 1008 does not include a pump and relies on gravity and/or external fluid line pressure to move fluid to the brewing chamber 1010. The controller 1026 can determine the amount of water provided to the brewing assembly 1010 based on a number of flow meters in the beverage apparatus 1000. For example, a flow meter 46 can be included in the water intake assembly 40. The flow meter 46 can measure the volume of water entering the beverage apparatus 2 via the water intake assembly 40. In some embodiments, a second flow meter (not shown) is positioned in a fluid line to a hot water dispenser. The second flow meter can measure the water output to the hot water dispenser. For example, the second flow meter can detect when hot water is output from the boiler 50 via the hot water dispenser (e.g., for brewing tea, for filling a French press, or otherwise).

In other embodiments, the water measuring and transporting assembly 1008 can include a pump for directing water to the brewing assembly 1010. The controller 1026 can determine the amount of water that the provided to the brewing assembly 1010 based on the pump rate and the amount of time that the pump is active.

In some embodiments, the water measuring and transporting assembly 1008 can also transport a predetermined amount of water to the brewing assembly 1010 during a cleaning cycle. The brewing assembly 1010 can also include a cleaning system, such as a plow assembly 432 (FIGS. 9A and 9B), to move spent ground material and residue from the brewing assembly 1010 to the solid waste disposal 1020. The solid waste disposal 1020 may include a receptacle that one periodically removes for emptying, or that is connected to an electronic garbage disposer or directly to the sewer line of the establishment in which the beverage apparatus 2 is installed. In addition, the solid waste disposal 1020 may be connected to receive tap water, and may use the tap water to flush "ground-through" and spent coffee from the disposal unit into the garbage disposer unit or directly into the sewer line. The solid waste disposal 1020 may periodically commence an automatic flushing sequence, e.g., after brewing each cup of coffee, or may commence the flushing sequence manually. In some embodiments, the solid waste disposal 1020 is the same as the liquid waste disposal 1016.

Figure 10A:
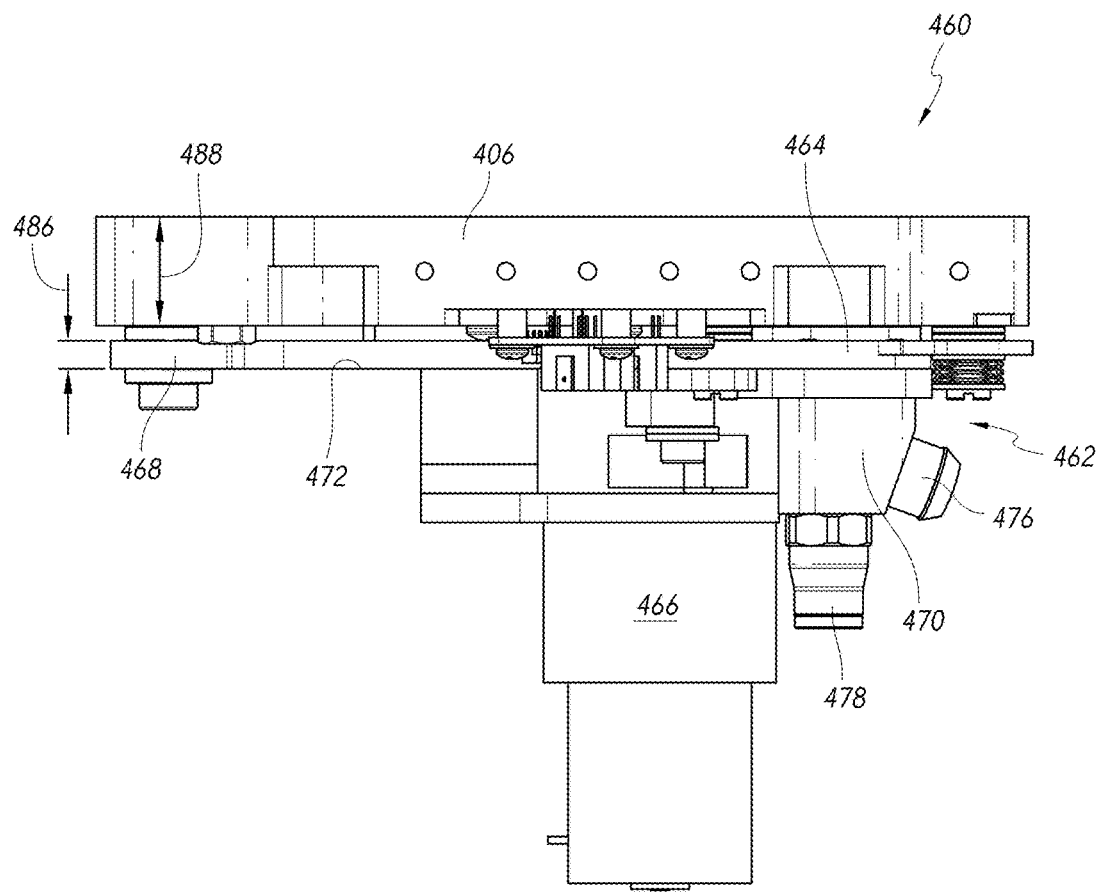
FIG. 10A illustrates a side plan view of a rotary valve assembly of the system of FIG. 1A.
Figure 10B:
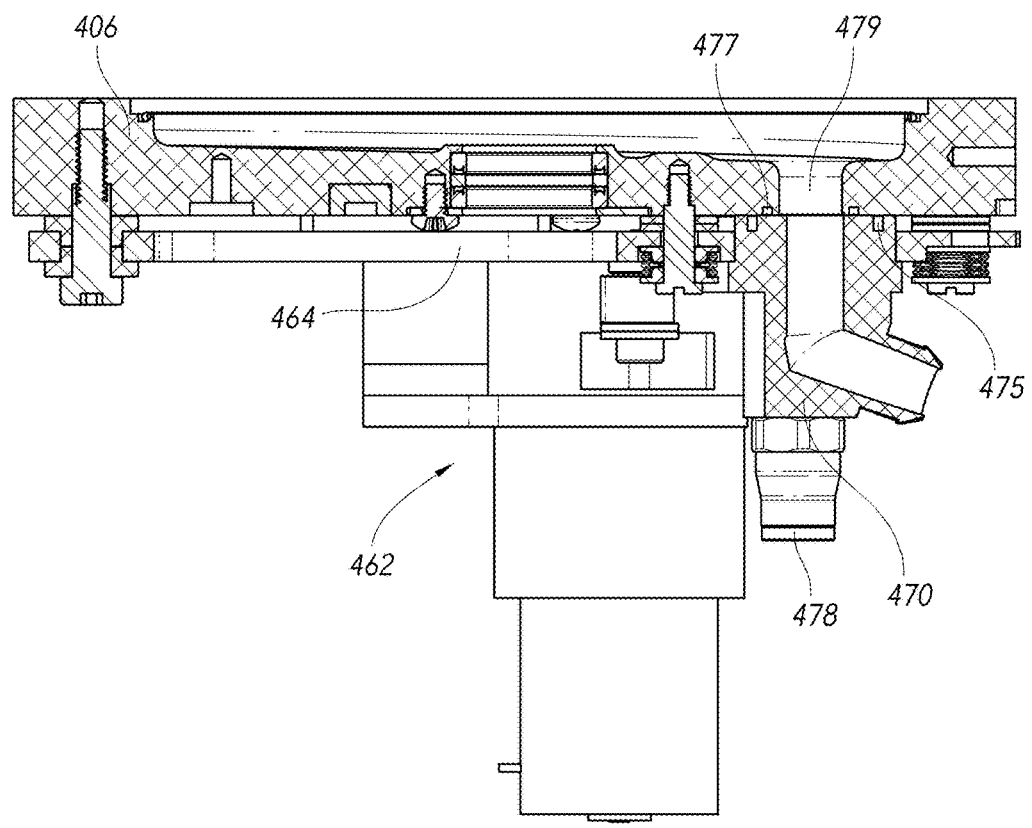
FIG. 10B illustrates a cross-sectional view of the rotary valve assembly of FIG. 10A.
Figure 10C:
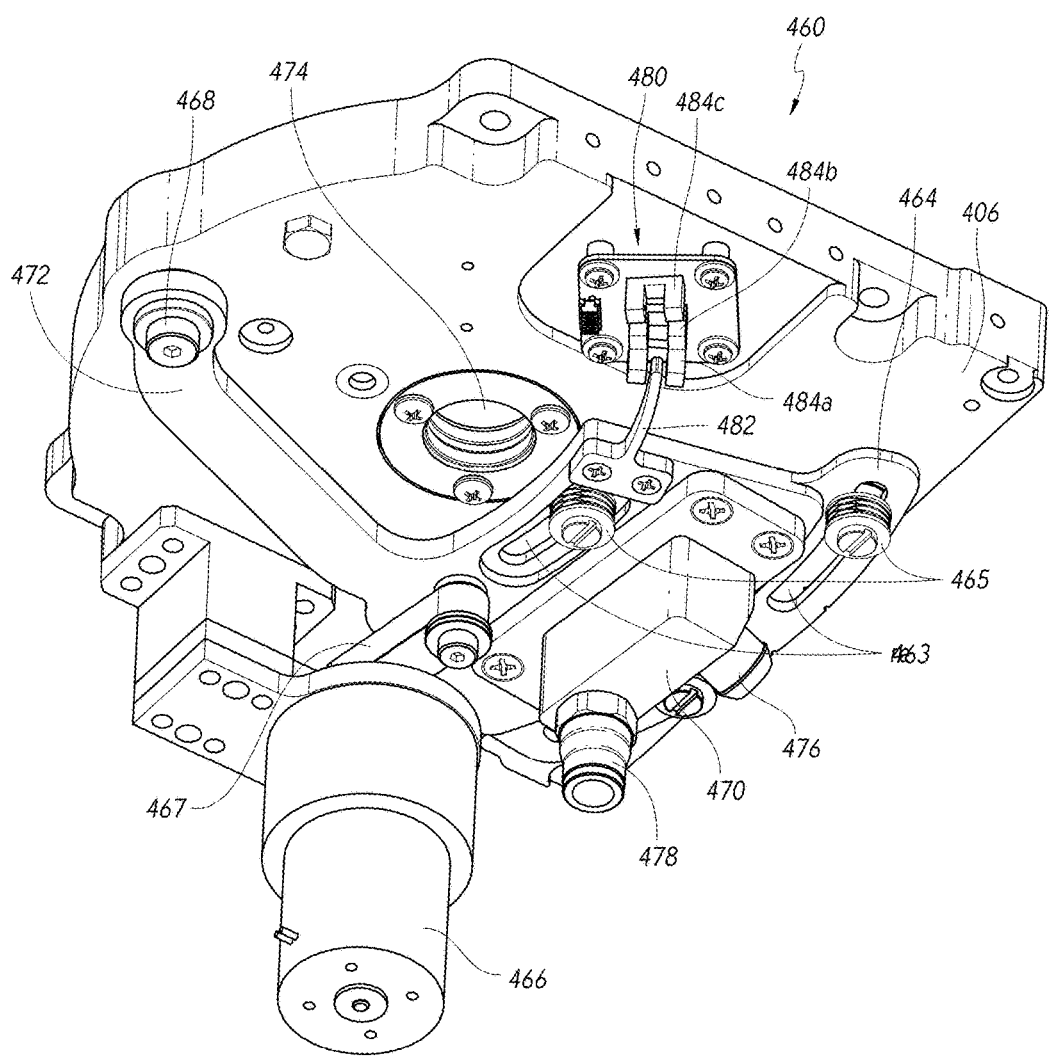
FIG. 10C illustrates a bottom perspective view of the rotary valve assembly of FIG. 10A.
Figure 10G:
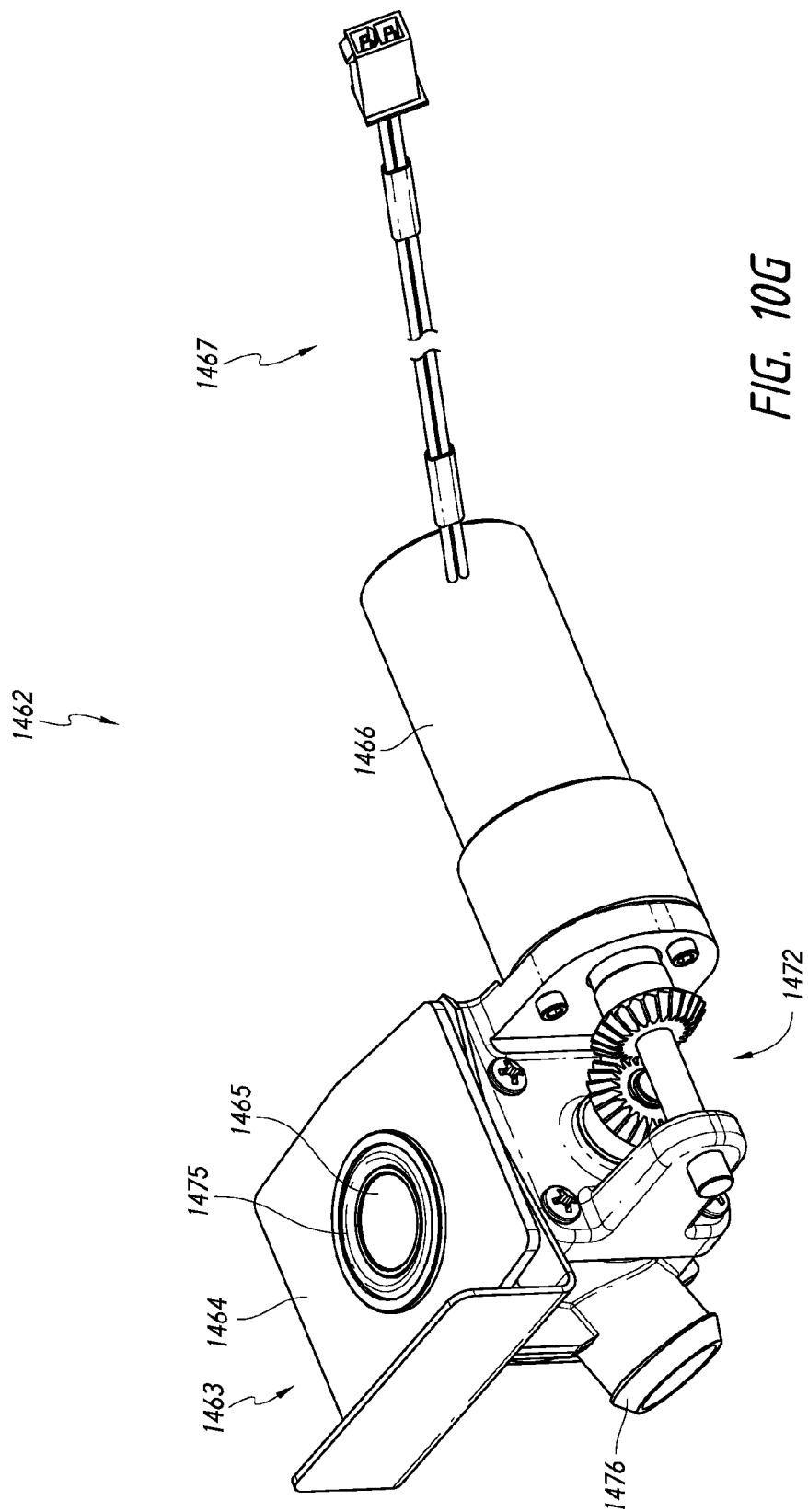
FIG. 10G illustrates another embodiment of a rotary valve assembly.
Figure 10H:
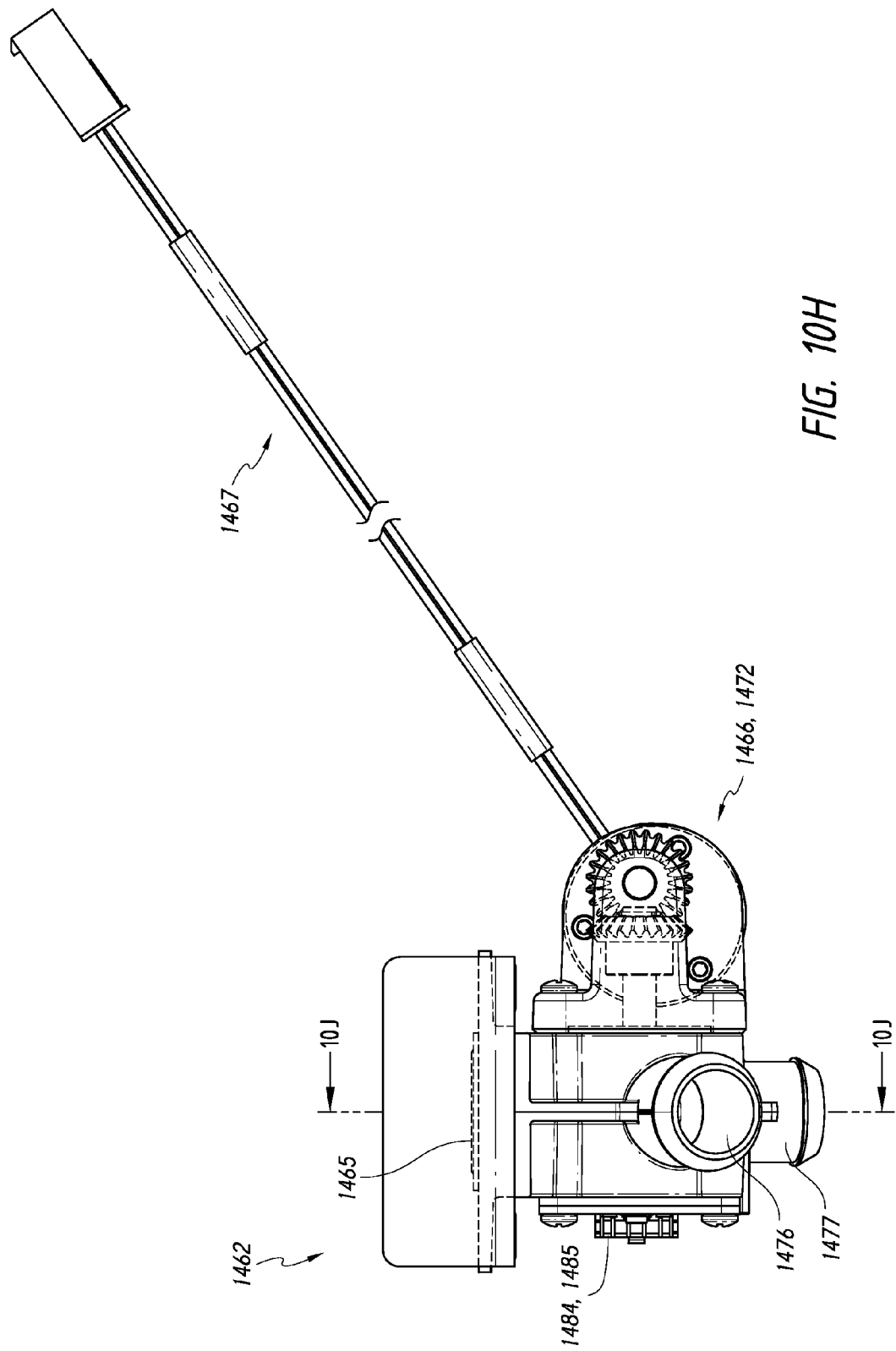
FIG. 10H illustrates a front plan view of the rotary valve assembly shown in FIG. 10G.

In some embodiments, the beverage apparatus 1000 can include a fluid transporting assembly 1012 to direct the beverage to the dispensing assembly 1014 and/or liquid waste to the liquid waste disposal 1016 (e.g., waste bin or drain). The fluid transporting assembly 1012 can include a valve or valve assembly that can transition between a first valve position wherein fluid communication is provided between the interior of the brewing assembly 1010 and the dispenser assembly 1014, and a second valve position wherein fluid communication is provided between the brewing assembly 1010 and the liquid waste disposal 1016. The fluid transporting assembly 1012 may respond to the controller 1026 to move between the first and second valve positions. For example, the fluid transporting assembly 1012 can include a rotary valve assembly 460 as shown in FIGS. 10A-10C.

The dispensing assembly 1014 can include one or more dispensers. For example, the dispensing assembly 1014 can include a beverage dispenser that can dispense a selected beverage. In some embodiments, the dispensing assembly 1014 can include a water dispenser. The water dispenser may include one or more fluid inlets connected to the boiler 1004 and/or a water source external to the apparatus 1000. In some embodiments, the dispensing assembly 1014 can include one or more valve assemblies to control fluid inflow and outflow. FIGS. 2L and 2M illustrate possible embodiments of the dispensing assembly 1014.

In some embodiments, beverage apparatus 1000 can include one or more sensors to detect and monitor qualities of the finished beverage. Data obtained from the one or more sensors may be stored and logged in the memory 1038. The one or more sensors may include sensors that can detect qualities such as temperature, opacity, total dissolved solids (or TDS), and Brix (e.g., sugar content of the beverage). The one or more sensors can conduct a final quality control check for the brewed beverage and indicate to the controller 1026 if certain data falls outside of predetermined tolerance ranges. For example, if the beverage temperature is low at the dispensing assembly 1014, then a user may discover that a heating element of the apparatus 1000 has failed. In some embodiments, the one or more sensors are disposed at or near the dispensing assembly 1000. In some embodiments, the one or more sensors may conduct initial and/or intermediate quality control checks in addition to, or in place of, a final quality control check.

The base assembly 1018 can hold or receive a container while the dispenser assembly 1014 fills the container with the brewed beverage (or water as described below). In some embodiments, the base assembly 1018 can include a drain portion to absorb, e.g., spillage from the cup and drippings from the dispenser assembly 1014. The drain portion may be removable for emptying, connected to the liquid waste disposal 1016, or connected directly to the sewer line of the establishment in which the beverage apparatus 2 is installed. In some embodiments, the base assembly 1018 can include a container-sensing unit (not shown) to indicate to the controller 1026 whether a container is present in the base assembly 1018. If the container is not present after the brewing assembly 1010 has brewed the beverage, then the controller 1026 may deactivate or close the fluid transporting assembly 1012 to prevent the dispense of the brewed beverage. As another example, if the container is present during a cleaning cycle, then the controller 1026 may deactivate or close the fluid transporting assembly 1012 to prevent rinse water from dispensing into the container. The cup-sensing unit may include any type of sensor, such as an optical, mechanical, or ultrasonic sensor.

In some embodiments, the base portion 16 can include one or more sensors to detect and monitor qualities regarding the size and volume of a container for the brewed beverage. The one or more sensors can detect the size of the container 20 and provide information to the controller 1026 to ensure that the appropriate quantity of beverage is dispensed. An interlock feature can activate to dispense only an appropriate amount of brewed beverage based on the size of the container present. For example, the one or more sensors can ensure that the beverage apparatus 1000 does not dispense 20 ounces of beverage when an 8-ounce container is present. In some embodiments, the interlock feature may comprise a motion interlock feature and/or an ultrasonic interlock feature.

The beverage apparatus 1000 may include one or more hopper assemblies 1022 for holding beverage material, which are fed to the grinding assembly 1024. FIGS. 3A-3J illustrate one such hopper assembly, which can include an auger system to deliver the beverage material to the grinder assembly 1024. The controller 1026 may indicate the amount of beverage material to be delivered to the grinder assembly 1024. Where the beverage apparatus 2 includes multiple hopper assemblies 1022, then one can load different types of beverage material into each hopper assembly 1022.

In response to the controller 1026, the grinder assembly 1024 can grind beverage material from the hopper assembly 1022, and then provide to the brewing assembly 1010 a predetermined amount of ground material. The controller 1026 may indicate one of multiple grind sizes (e.g., coarse, normal, fine) to the grinder assembly 1024, as the grind size may affect the taste and other characteristics of the brewed coffee. FIGS. 5A-5E illustrate one possible embodiment for the grinder assembly 500.

In some embodiments, the grinder assembly 1024 can include a safety mechanism for when a foreign object is caught in the grinder assembly 1024. For example, if the grinder assembly 1024 detects that the grinder has stalled, then the controller 1026 can indicate to the grinder assembly 1024 to automatically operate in reverse to open the burrs.

The beverage apparatus 1000 can include a barrier 1028 to separate the controller 1026 and associated circuitry from other components of the apparatus 1000. For example, steam from hot water and brewing the beverage may condense and damage or otherwise render inoperable the controller 1028. Furthermore, condensation on the conduits that carry cold tap water may cause similar problems. Therefore, a moisture barrier 1028 helps keep the controller 1026 and associated circuitry dry.

The controller 1026 controls the operation of some or all of the other components of the beverage apparatus 1000 as discussed above, and includes a processor 1032, a memory 1038, a control panel and display 1030, and a communications port 1036.

The processor 1032 executes a software program stored in the memory 1038 or in another memory (not shown), and controls the operations of the components of the beverage apparatus 1000 as described above and as described below.

In addition to storing one or more software programs, the memory 1038 may store sets of predetermined brew parameters or recipes as discussed in further detail below. The memory 1038 can also store data associated with machine activity (e.g., number of brewed beverages, types of brewed beverages or sizes of brewed beverages).

The control panel and display 1030 allows an operator to enter brewing options (e.g., coffee type, cup size, and brewing parameters) or to select brewing options from a menu that the processor 1032 may generate on the display. For example, the operator may select via the control panel and display 1030 individual brewing parameters (e.g., grind size, water temperature, brewing time, and the coffee-ground-to-water ratio), or a set of predetermined brewing parameters stored in the memory 1038. As an example of the latter, a coffee roaster may have determined preferred brewing parameters for its coffee. One may then store these preferred parameters in the memory 1038 as a set, and associate the set with an identifier, such as the name or type of the coffee. Therefore, instead of entering or selecting each brewing parameter individually, which may be tedious, the operator merely enters or selects from a menu the identifier, and the controller 1026 causes the beverage apparatus 1000 to brew coffee according to the set of parameters corresponding to the identifier.

In some embodiments, instead of or in addition to the control panel and display, the beverage apparatus 1000 can include a number of other input controls 1034 for selecting brewing options. For example, as shown in FIGS. 2C-2K, the beverage apparatus 1000 can include a hopper selector assembly 80 and/or a beverage size control assembly 60.

The communications port 1036 allows the processor 1032, memory 1038, and control panel and display 1030 to communicate with one or more devices external to the beverage apparatus 1000. For example, the port 1038 may be connected to a computer (not shown in FIG. 1H) so that one can program or run diagnostics from the computer. The port 1038 may also be connected to another beverage apparatus 1000 to communicate information (e.g., brewing parameters or power supply information). As another example, the port 1036 may be connected to the internet, so that one can download into the memory 1038 data such as sets of brewing parameters or upload usage statistics from the beverage apparatus 1000. In addition, the port 1036 may receive data via a wireless channel, such as a set of brewing parameters from a RFID tag or a barcode on a container of coffee or on a coffee cup (the tag may hold the cup owner's preferred coffee type, cup size, or brew parameters). Furthermore, the port 1036 may allow the processor 1032 to download demographic information, such as coffee-drinker preferences and number of cups brewed, to a coffee roaster or supplier or to the manufacturer/supplier of the beverage apparatus 1000.

Alternate embodiments of the beverage apparatus 1000 are contemplated. For example, one or more of the above-described units or components may be omitted, the function of multiple units may be consolidated into fewer units, or the function of a single unit may be divided among multiple units.

Water Intake Assembly

As described above, water can flow from the water inlet to the water intake assembly 40. FIG. 2B illustrates a water intake assembly 40 for the apparatus 2. The water intake assembly 40 can include a water inlet 42. The water inlet 42 can be positioned on the bottom of the apparatus 2. In some embodiments, the water inlet 42 is positioned on a side (e.g., the front, back, left, or right side) of the apparatus 2, or some other surface of the apparatus 2.

The water intake assembly 40 can include an inlet manifold 44. The inlet manifold 44 can comprise one or more internal fluid channels 43, 45. For example, the water inlet 42 can lead into an inlet channel 43 of the inlet manifold 44. Water in the inlet channel of the inlet manifold 44 can be directed to a first outlet of the inlet manifold 44. The first outlet of the inlet manifold 44 can communicate with an internal passage 41 of a flow meter 46. The flow meter 46 can be attached to the inlet manifold 44. For example, mechanical fasteners or other attachment methods (e.g., adhesion, welding) can be used to attach the flow meter 46 to the inlet manifold 44. The flow meter 46 can measure the volume of water flowing into the boiler 50 of the apparatus 2 from the water inlet 42.

Water can be passed through the internal passage 41 of the flow meter 46 and back into the inlet manifold 44 via a secondary inlet (not shown) of the inlet manifold 44. Water can exit the inlet manifold 44 to the boiler 50 via a manifold outlet 48. The manifold outlet 48 can be positioned on the top of the inlet manifold 44, or on some other surface of the inlet manifold 44. As illustrated in FIG. 2BB, the manifold outlet 48 can be in fluid communication with an outlet channel 45 of the intake manifold 44.

The water intake assembly 40 can include one or more sensors. For example, a temperature probe 49 may be positioned on the inlet manifold 44. The temperature probe 49 can measure a temperature of the water passing through one or more of the internal fluid channel of the inlet manifold 44.

In some embodiments, a solid state relay 47 is connected (e.g., via adhesives, welding, and/or mechanical fasteners) to the inlet manifold. The inlet manifold 44 can dissipate heat within the apparatus 2. For example, the inlet manifold 44 can absorb radiant heat from within the apparatus 2 and/or conductive heat from one or more components of the apparatus 2 (e.g., the solid state relay 47, the boiler, the auger, the brewing assembly, the grinder, or other components of the apparatus 2). The inlet manifold 44 can dissipate such conductive or radiant heat by transferring the heat to the water passing through the inlet manifold 44. In some embodiments, the water received by the inlet manifold 44 via the water inlet 42 is cold water (e.g., filtered and/or refrigerated water). The water that passes through the water intake assembly 40 can be directed to the boiler 50 via a fluid conduit (e.g., a hose or pipe). Dissipation of heat from the solid state relay 47 and/or from other system components can preheat the water entering the boiler. Preheating the water entering the boiler can reduce system power requirements.

The boiler 50 can operate as a saturated boiler. For example, the boiler 50 can remain substantially full of liquid before, during, and after a brew cycle or hot water dispense. In some embodiments, as hot water is pulled from the boiler 50 to the mixing nozzle and/or to the hot water dispenser, cold water is pulled into the boiler 50 via the water intake assembly 40. The boiler 50 can include an internal heater (e.g., a resistive heater) that heats cool water entering the boiler 50.

Beverage Size Control Assembly

As illustrated in FIGS. 2C-2H, the apparatus 2 can include a beverage size control assembly 60. The beverage size control assembly 60 can include a size control member 62. The size control member 62 can be, for example, a knob, a button, a dial, or some other user input. The control member 62 can include one or more visual indicators 64. For example, the control member 62 can include a notch or other marking on an exterior surface of the control member 62. Alignment of the visual indicator 64 with or without a visual indicator on a surface of the apparatus 2 can provide a visual confirmation of a setting of the control member 62 and of the size control assembly 60.

In some embodiments, the size control member 62 can be moved along its axis of rotation. For example, a user could push the control member toward the apparatus 2. In some embodiments, the size control assembly 60 includes one or more rotational locking features. For example, the assembly 60 can include a rotation limiter 62a. The rotation limiter 62a can be, for example, a protrusion can fit within a limiter channel in the size control member 62. The limiter channel can extend along a portion of the circumference of the size control member 62. Interference between the limiter 62a and the ends of the limiter channel can limit the extent to which the size control member 62 is permitted to rotate.

In some embodiments, the control member 62 includes one or more indentations into a surface of the control member 62. The control assembly 60 can include one or more stops. For example, the control assembly 60 can include an anti-rotation pin 66 (see FIG. 2D). The anti-rotation pin 66 can couple with a slot 66a or other indentation in the control member to inhibit rotational movement of the control member 62 when the control member is pushed in. Limiting the rotational movement of the control member 62 when it is pushed in can inhibit a user of the apparatus 2 from inadvertently changing the size setting during a brew cycle. In some embodiments, inhibiting or preventing the control member 62 from rotating during a brewing cycle can provide visual confirmation of the size of the beverage being brewed. Visual confirmation of the size of the beverage being brewed can help reduce the likelihood that an incorrect (e.g., wrong-sized) container (e.g., a mug or cup) is used for a given beverage cycle.

As shown in FIGS. 2E-2H, the control member 62 can be attached to a size control shaft 61. For example, the size control shaft 61 can be attached to the control member 62 via mechanical fastener(s), adhesives, welding, or otherwise. In some embodiments, the control member 62 and size control shaft 61 are formed (e.g., molded, extruded) as a monolithic part. The size control shaft 61 can be rotationally locked to the control member 62. For example, rotation of the control member 62 can cause the shaft 61 to rotate at a substantially equivalent rate and to a substantially equivalent angular extent.

The shaft 61 can be inserted through size encoder assembly 63. In some embodiments, the shaft 61, or some portion thereof, is keyed to correspond with an aperture shape in the encoder assembly 63. The shaft 61 can be rotational locked (e.g., via the keyed fit or otherwise) to the encoder assembly 63 such that rotation of the shaft 61 causes corresponding rotation of the encoder assembly 63. The rotational position of the encoder assembly 63 can control the size of the beverage produced in a given brewing cycle.

A biasing structure 69 (e.g., a spring or other resilient member) can be positioned between a portion of the control member 62 and a fixed portion of the size control assembly 60 or a portion of the apparatus 2. The biasing structure 69 can bias the size control member 62 away from the apparatus 2.

A distal end 61a (e.g., the end opposite the size control member 62) of the shaft 61 can include one or more notches or other surface features (e.g., channels, protrusions). The shaft 61 can include a retention recess 61a. In some embodiments, one or more retention structures 73 (e.g., rings, collars, protrusions) are positioned on the shaft 61 (e.g., in a recess of the shaft 61). The retention structure 73 can inhibit inadvertent movement of the shaft 61 in the proximal direction (e.g., toward the control member 62) beyond a predetermined point. For example, the retention structure 73 can interfere with a portion of the apparatus 2 (e.g., a wall 74 through which the shaft 61 passes) when the control member 62 is pulled away from the apparatus 2 due to the biasing force of the biasing structure 69 or due to pulling on the control member 62 by a user. In some embodiments, the retention structure 73 of the size control assembly 60 is positioned distal of the wall 74. The size control member 62 can be positioned proximal of the wall 74.

The size control assembly 60 can include a shaft retainer 65. The shaft retainer 65 can be, for example, a hinged pawl, a hinged pin or shaft, or lever. In some embodiments, the shaft retainer 65 is biased to a disengaged position, as illustrated in FIG. 2E. The shaft retainer 65 can be biased to the disengaged position by a solenoid 67 or other biasing structure. In some embodiments, a shaft sensor assembly 70 controls the solenoid 67. The shaft sensor assembly 70 can include one or more sensors (e.g., optical or other sensors). For example, the shaft sensor assembly 70 can include a shaft retainer sensor 71. The shaft retainer sensor 71 can sense a portion of the shaft retainer 65 (e.g., a protrusion 65a) when the shaft retainer 65 is in the engaged position, as illustrated in FIG. 2F. The shaft retainer sensor 71 can send a retainer signal (e.g., a wired or wireless signal indicating that the shaft retainer 65 is in the engaged position) to the solenoid 67 when the shaft retainer sensor 71 detects the protrusion 65a. The retainer signal can be a continuous and/or discrete signal. In some embodiments, the shaft sensor assembly 70 includes a shaft sensor 72. The shaft sensor 72 can be, for example, an optical sensor can detect a portion of the shaft 61 (e.g., a distal end of the shaft 61).

FIG. 2E illustrates the beverage size control assembly in the default position. In the default position, the biasing structure 69 biases the beverage size control member 62 away from the apparatus 2. The retention structure 73 interferes with a portion of the wall 74 (e.g., an aperture through which the shaft 61 passes) to inhibit the size control member 62 from moving beyond a predetermined point away from the apparatus 2. In the default position, the stop 66 is disengaged from the slot 66a. As such, a user may rotate the beverage size control member 62 about an axis of the size control shaft 61 to select a size for a beverage. The beverage size control member 62 can include a detent structure that can bias the beverage size control member 62 into discrete rotational positions. For example, the size control member 62 can include a hub portion having a finite number of slots or detentions sized and shaped to receive a ball or other detent member. The detent member can be housed in a radially-extending slot in a portion of the size control member 62 radially outward from the hub portion. In some embodiments, the detent member is biased toward the hub portion by a spring or other biasing structure. In some embodiments, the discrete rotational positions of the size control member 62, the shaft 61, and/or the encoder 63 correspond to discrete settings for the beverage size control assembly 60.

As illustrated in FIG. 2F, a user can push the beverage size control member 62 to a fully inserted position. In the fully inserted position, the stop 66 is engaged with a slot 66a of the beverage size control member 62. Engagement between the stop 66 and the slot 66a can inhibit rotation of the beverage size control member 62 about the central axis of the size control shaft 61. In the inserted position, a distal portion of the shaft 61 can be inserted at least partially into the shaft sensor 72. The shaft sensor 72 (e.g., an optical sensor) can sense the position of the shaft 61. The shaft sensor 72 can relay a shaft signal (e.g., a wired signal or a wireless signal indicating detection of the shaft 61 by the shaft sensor 72) to the solenoid 67. The shaft signal can be a continuous and/or discrete signal. Upon receipt of a shaft signal from the shaft sensor 72 in the absence of a retainer signal, the solenoid 67 can move the shaft retainer 65 to the engaged position. In the engaged position, a portion of the shaft retainer 65 may be inserted into the shaft recess 61a.

The biasing structure 69 can push the beverage size control member 62 away from the apparatus 2 upon release of the beverage size control member 62 by the user. The shaft retainer 65 can interfere with the portion of the shaft 61 distal to the shaft recess 61a, as illustrated in FIG. 2G. Interference between the shaft retainer 65 and the shaft 61 can retain the size control member 62 in an operative position (e.g., the position illustrated in FIG. 2G). In the operative position, the beverage size control member 62 can be inhibited from rotating due to interference between the stop 66 and the slot 66a. In some embodiments, the shaft 61 is disengaged from the shaft sensor 72 when the size control member 62 is in the operative position.

The solenoid 67 can return the shaft retainer 65 to the disengaged position. For example, the user initiate a manual release of the control member 62 by pushing the beverage size control member 62 to the fully inserted position (e.g., as illustrated in FIG. 2F), causing a distal portion of the shaft 61 to be detected by the shaft sensor 72. The shaft sensor 72 can send a shaft signal to the solenoid 67. The solenoid 67 can transition the shaft retainer 65 to the disengaged position when the solenoid receives the shaft signal from the shaft sensor 72 while the retention sensor 71 relays a retainer signal. In some embodiments, manual release of the size control member 62 interrupts and/or ends the brew cycle. In some embodiments, manual release of the size control member 62 permits a user to change the size of the beverage brewed during the brew cycle. In some embodiments, the shaft retainer 65 prevents release of the size control member 62 until the end of a brewing cycle.

In some embodiments, the apparatus 2 can release the size control member 62 to the default position upon completion of a brewing cycle. For example, the apparatus 2 can signal the solenoid 67 to move the shaft retainer 65 to the disengaged position upon dispensing of the completed beverage from the apparatus 2. Transition of the shaft retainer to the disengaged position can permit the biasing structure 69a to bias the size control member 62 to the default position. Transition of the size control member 62 to the default position upon completion of a brewing cycle can provide visual and/or audible confirmation of the completion of the brewing cycle.

Hopper Selector Assembly

The apparatus 2 can include a hopper selector assembly 80. In some embodiments, the hopper selector assembly 80 can include one or more user input structures 82. For example, as shown in FIGS. 2I and 2J, the user input structure 82 can include one or more paddles 82a, 82b, 82c. As illustrated in FIG. 2I, the hopper selector 80 includes a left paddle 82a, a center paddle 82b and a right paddle 82c. Each of the paddles 82a, 82b, 82c can be used to select one or more hopper assemblies 300. The paddles 82a, 82b, 82c can rotate about a hinge point. In some embodiments, the paddles 82a, 82b, 82c are biased to a disengaged position (e.g., the position illustrated in FIG. 2J). The paddles 82a, 82b, 82c may be biased by a spring (e.g., a torsion spring) or other biasing structure (not shown).

In some embodiments, actuation (e.g., depression, switching, or turning) of first one of the paddles 82a, 82b, 82c selects one of the hopper assemblies 300 for the brewing cycle. In some embodiments, actuation of a second paddle 82a, 82b, 82c releases the first paddle and adjusts the hopper assembly selection to an alternative hopper assembly 300. The hopper selector 80 can permit actuation of two or more paddles 82a, 82b, 82c to select two or more of the hopper assemblies 300 (e.g., to brew two or more types of beans together, such as caffeinated and decaffeinated coffees). For example, substantially simultaneous actuation of two or more of the paddles 82a, 82b, 82c can release beans from two or more of the hopper assemblies 300.

In some embodiments, operation of the hopper selector assembly 80 is at least partially controlled by software protocols. For example, after actuation of a first paddle 82a, 82b, 82c, the hopper selector assembly 80 can permit actuation of a second paddle 82a, 82b, 82c when one of the first and second paddles 82a, 82b, 82c correspond to caffeinated coffee and the other paddle corresponds to decaffeinated coffee. In some embodiments, actuation of a second paddle 82a, 82b, 82c that is of the same caffeine character (e.g., decaffeinated or caffeinated) as the first paddle 82a, 82b, 82c releases the first paddle 82a, 82b, 82c and configures the brewing apparatus 2 to release beans from the hopper corresponding to the second paddle 82a, 82b, 82c.

As shown in FIG. 2J, the user input structure 82 can include an actuating portion 84. For example, each of the paddles 82a, 82b, 82c can include a hopper actuating portion 84a, 84b, 84c. The actuating portion 84 of the paddles can move about the hinge point when the input structure 82 is pushed down. For example, the hopper actuating portion 84*a* can be moved upward as the left paddle 82*a* is pushed downward to an engaged position. Each of the hopper actuating portions 84*a*, 84*b*, 84*c* can include a sensor-tripping portion (e.g., a protrusion) (not shown). The sensor tripping portion of each hopper actuating portion 84*a*, 84*b*, 84*c* can engage with a sensor 83*a*, 83*b*, 83*c* (e.g., an optical sensor, mechanical switch, proximity sensor). Engagement between the tripping portions and the sensors 83*a*, 83*b*, 83*c* can signal one or more of the hopper assemblies 300 to release beverage material to the grinder assembly 500. For example, engagement between the tripping portion of the hopper actuating portion 84*a* and the sensor 83*a* can signal a first hopper assembly 300 to release beverage material and engagement between the tripping portion of the hopper actuating portion 84*b* and the sensor 83*b* can signal a second hopper assembly 300 to release beverage material. In some embodiments, a hopper assembly 300 is signaled to release beverage material upon actuation of both the beverage size control member 62 and one or more paddles 82*a*, 82*b*, 82*c*.

An input retaining structure (e.g., paddle retainer 85) can be positioned on a rear side of the hopper selector assembly 80. The paddle retainer 85 can retain one or more of the hopper actuating portions 84*a*, 84*b*, 84*c* in a raised position (e.g., retaining one or more of the paddles 82*a*, 82*b*, 82*c* in a depressed position). For example, the hopper actuating portions 84*a*, 84*b*, 84*c* can include magnets that can couple (e.g., magnetically) with the paddle retainer 86 when the corresponding paddle 82*a*, 82*b*, 82*c* is depressed. The paddle retainer 85 can retain the hopper actuating portion 84*a*, 84*b*, 84*c* of one or more of the paddles 82*a*, 82*b*, 82*c* during the duration of a brewing cycle and dispense of a beverage.

In some embodiments, the hopper selector assembly 80 can include a paddle disengagement structure 86. The disengagement structure 86 can be, for example, a bar that can move the hopper actuating portions 84*a*, 84*b*, 84*c* (e.g., the magnetic portions thereof) away from the paddle retainer 85. The disengagement structure 86 can be moved by a solenoid 88 or other control structure. The biasing force provided by the biasing structure (not shown) of the one or more engaged paddles 82*a*, 82*b*, 82*c* can decouple the one or more hopper actuating portions 84*a*, 84*b*, 84*c* and the paddle retainer 85 to return the one or more engaged paddles 82*a*, 82*b*, 82*c* to the disengaged position.

Depression of one or more of the paddles 82*a*, 82*b*, 82*c* can initiate a brew cycle for the apparatus 2. In some embodiments, depression of one or more of the paddles 82*a*, 82*b*, 82*c* activates a dispense assembly (e.g., augers 308) of one or more of the hopper assemblies 300. The paddles 82*a*, 82*b*, 82*c* can end a brew cycle (e.g., before dispensing of a beverage) upon manual release (e.g., lifting) of one or more of the paddles 82*a*, 82*b*, 82*c*. The paddles 82*a*, 82*b*, 82*c* and/or augers 308 can be configured to provide visual confirmation to a user of the device and/or to a customer when a specific hopper is selected. For example, selection of one or more paddles can initiate agitation of the contents of the respective hoppers which may be viewable from outside of the apparatus 2. In some embodiments, disengagement of one or more of the hopper actuating portions 84*a*, 84*b*, 84*c* from the paddle retainer 85 during a brew cycle will end the brew cycle.

In some embodiments, the apparatus 2 can release the one or more actuating structures 84*a*, 84*b*, 84*c* from the raised (e.g., engaged) position at the end of a brew cycle. For example, the disengagement structure 86 can release the one or more hopper actuating portions 84*a*, 84*b*, 84*c* from the engaged position upon completion of a brewing cycle (e.g., upon dispense of the beverage). Release of the one or more hopper actuating portions 84*a*, 84*b*, 84*c* and corresponding transition of the paddles 82*a*, 82*b*, 82*c* from the engaged to the disengaged position can provide visual confirmation that the brewing cycle is completed.

Although the paddles 82*a*, 82*b*, 82*c* have been described as moving from a raised, disengaged position to a lowered, engaged position, the paddles 82*a*, 82*b*, 82*c* can operate between a lowered, disengaged position and a raised, engaged position. In some embodiments, the paddles 82*a*, 82*b*, 82*c* are moved horizontally between the engaged and disengaged positions. Many variations are possible.

FIG. 2K illustrates an embodiment of a hopper selector assembly 80' that can have components or portions that are the same as or similar to the components or portions of the hopper selector assembly 80 described above. Some numerical references to components in FIG. 2K are the same as or similar to those previously described for the hopper selector assembly 80 (e.g., solenoid 88' v. solenoid 88; paddle retainer 85 v. paddle retainer 85'; and sensors 83*a*, 83*b*, 83*c* v. sensors 83*a*, 83*b*, 83*c*). It is to be understood that the components can be the same in function or similar in function to previously described components. The hopper selector assembly 80' of FIG. 2K shows certain variations to the hopper selector assembly 80 of FIGS. 2I-2J.

The hopper selector assembly 80' can include an input retaining structure (e.g., paddle retainer 85') having a plurality of actuator tracks 85*a*, 85*b*, 85*c*. One or more of the actuator tracks 85*a*, 85*b*, 85*c* can include a pair of flexible extension (e.g., legs) defining a track through which a portion of each of the hopper actuating portions 84*a*, 84*b*, 84*c* may pass as the hopper actuating portions 84*a*, 84*b*, 84*c* transition between the engaged (e.g., raised) position and the disengaged (e.g., lowered) position.

The actuator tracks 85*a*, 85*b*, 85*c* can include a narrowed portion forming a seat 81*a*, 81*b*, 81*c*. The flexible extensions of the tracks 85*a*, 85*b*, 85*c* can deflect outwardly to permit a portion of the hopper actuating portions 84*a*, 84*b*, 84*c* to pass through the narrowed portion upon transition of the paddles 82*a*, 82*b*, 82*c* to the engaged (e.g., lowered) position (see, e.g., hopper actuating portions 82*b* and 82*c* in FIG. 2K). The flexible extensions can return to an undeflected position (e.g., the position illustrated in FIG. 2K) to form the seats 81*a*, 81*b*, 81*c*. The seats 81*a*, 81*b*, 81*c* can retain the paddles 82*a*, 82*b*, 82*c* in the engaged position through, for example, physical interference with the hopper actuating portions 84*a*, 84*b*, 84*c*.

The paddles 82*a*, 82*b*, 82*c* can be manually transitioned to the disengaged position from the engaged position by lifting on the paddles 82*a*, 82*b*, 82*c* with sufficient force to permit the hopper actuating portions 84*a*, 84*b*, 84*c* to pass down through the narrowed portion (e.g., by forcing the flexible extensions of the tracks 85*a*, 85*b*, 85*c* outward). In some embodiments, the paddle retainer 85' can release the engaged paddles 82*a*, 82*b*, 82*c* upon completion of a brewing cycle. For example, a transition structure 87 of the paddle retainer 85' can be pulled in the proximal direction by a solenoid 88' upon completion of a brewing cycle. Proximal motion of the transition structure 87 can move the tracks 85*a*, 85*b*, 85*c* in the distal direction via rotation of the paddle retainer 85' about a hinge point 89. Distal motion of the tracks 85*a*, 85*b*, 85*c* can transition the seats 81*a*, 81*b*, 81*c* in the distal direction out of a transition path (e.g., the path traveled between the engaged and disengaged positioned) of the hopper actuating portions 84*a*, 84*b*, 84. In some embodiments, the paddles 82*a*, 82*b*, 82*c* are biased to the disengaged position.

Hopper Assembly

FIGS. 3A-3J illustrate an exemplary embodiment of a hopper assembly 300 and its various components. The hopper assembly 300 provides a controlled dose of beverage material to the grinder assembly 500. The controlled dose can vary based on a number of factors, including, but not limited to, the type of beverage material stored in the hopper assembly 300, a size of the desired beverage, or the type of the desired beverage.

Figure 3A:
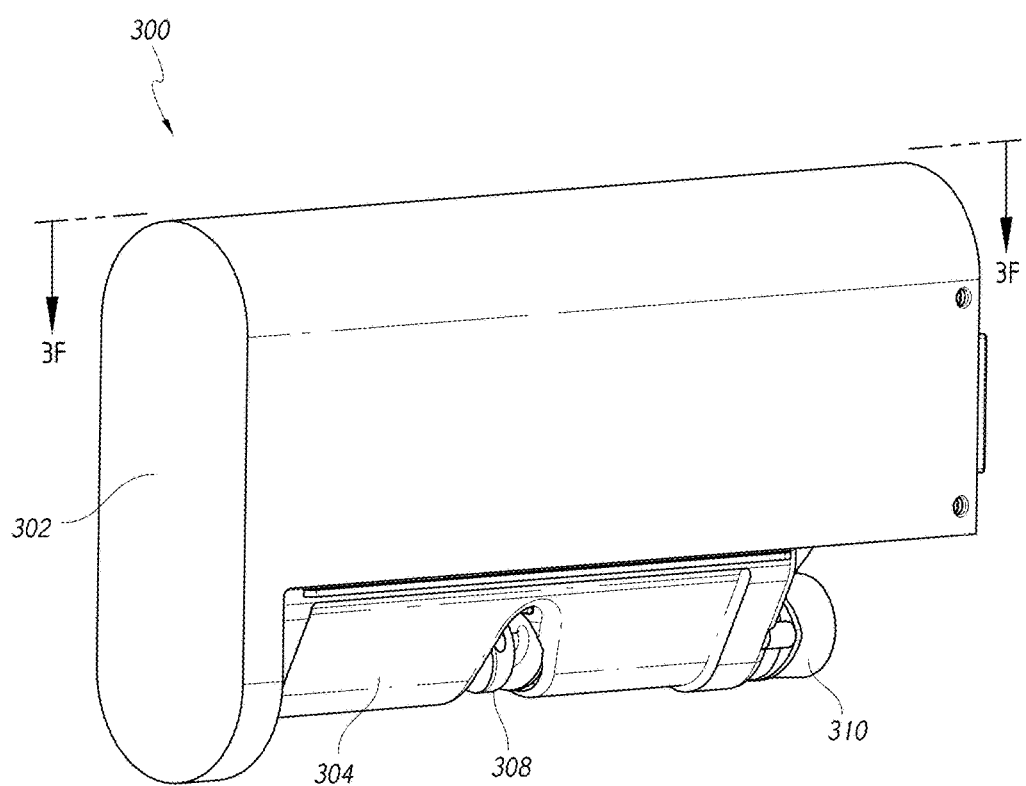
FIG. 3A illustrates a perspective view of an embodiment of a hopper assembly.
Figure 3B:
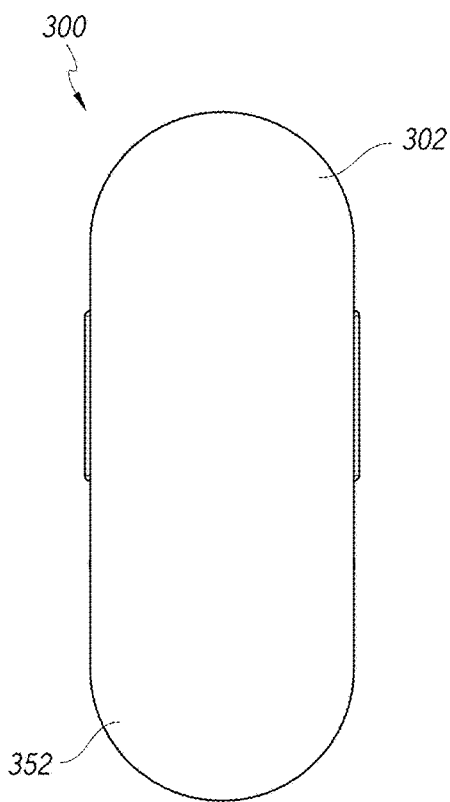
FIG. 3B illustrates a front view of the hopper assembly shown in FIG. 3A.
Figure 3C:
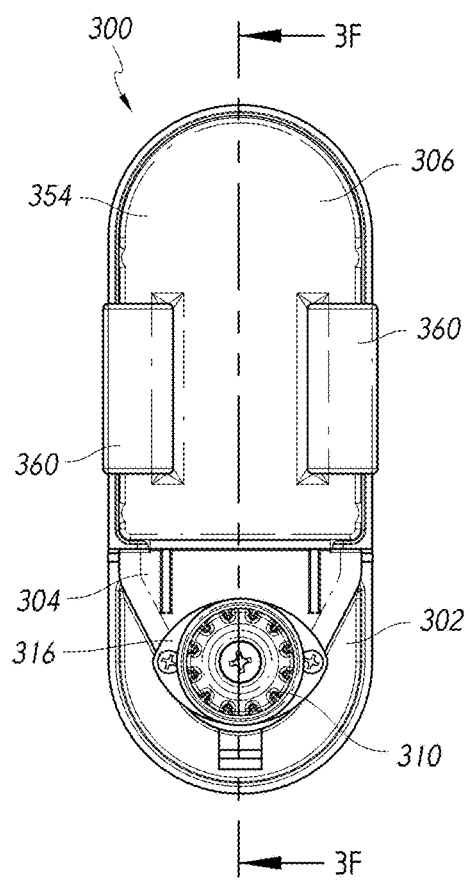
FIG. 3C illustrates a rear view of the hopper assembly shown in FIG. 3A.
Figure 3D:
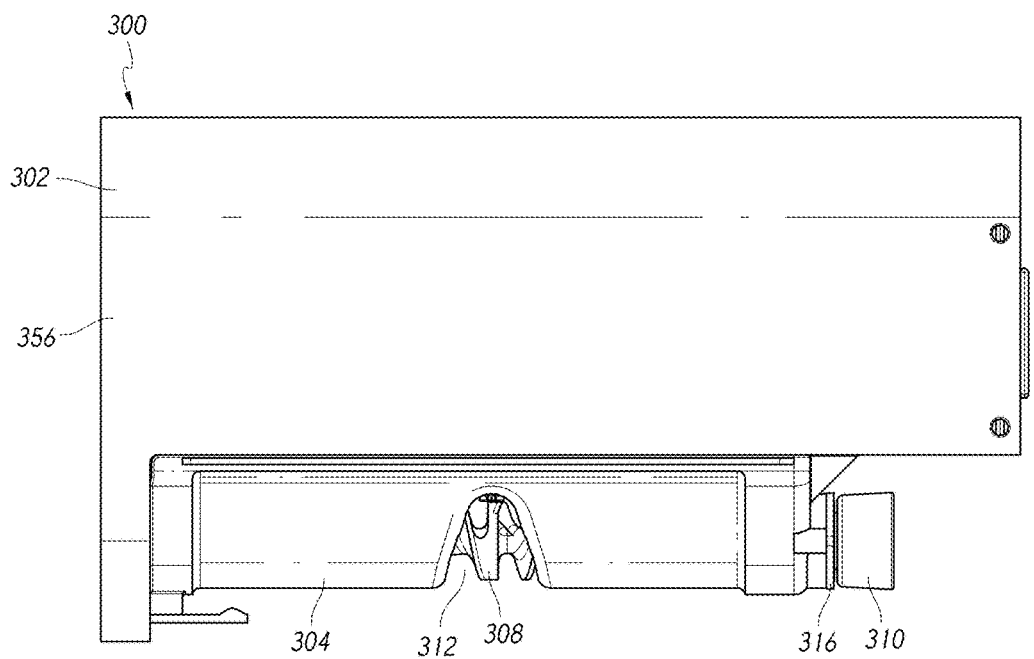
FIG. 3D illustrates a side view of the hopper assembly shown in FIG. 3A.
Figure 3E:
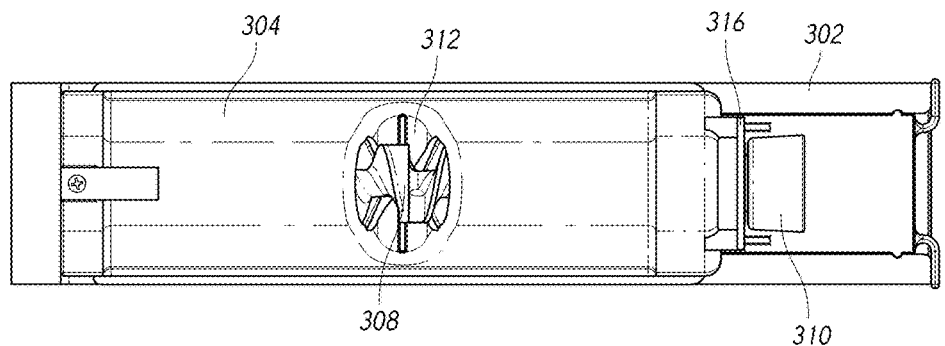
FIG. 3E illustrates a bottom view of the hopper assembly shown in FIG. 3A.
Figure 3F:
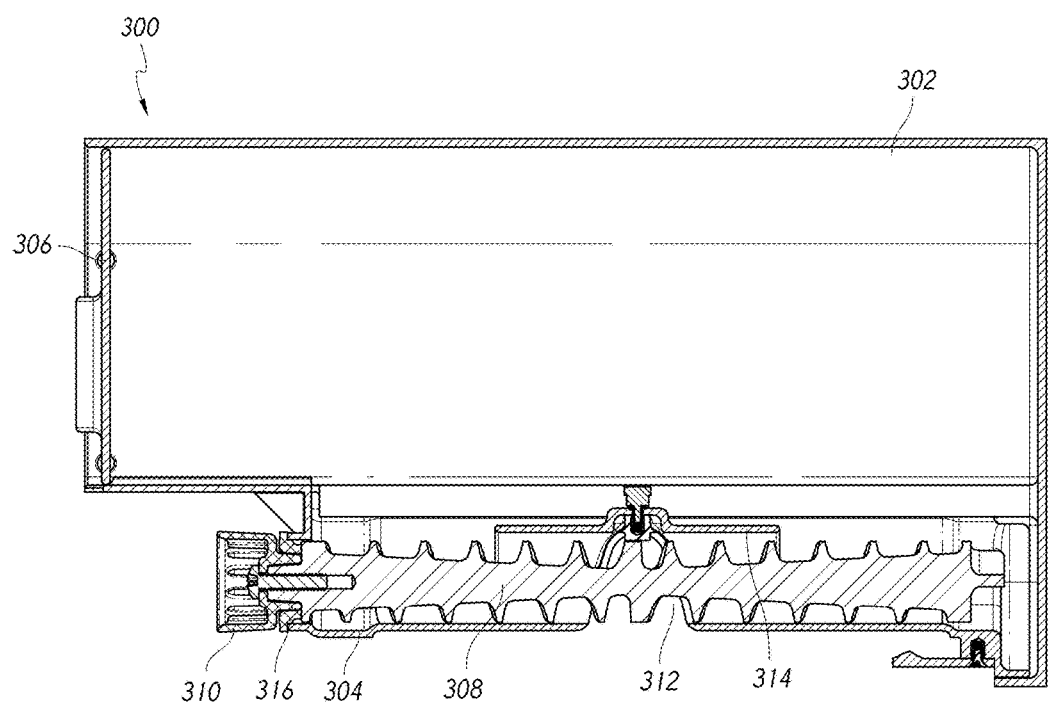
FIG. 3F illustrates a cross-section of the hopper assembly shown in FIG. 3A through line 3F-3F.
Figure 3G:
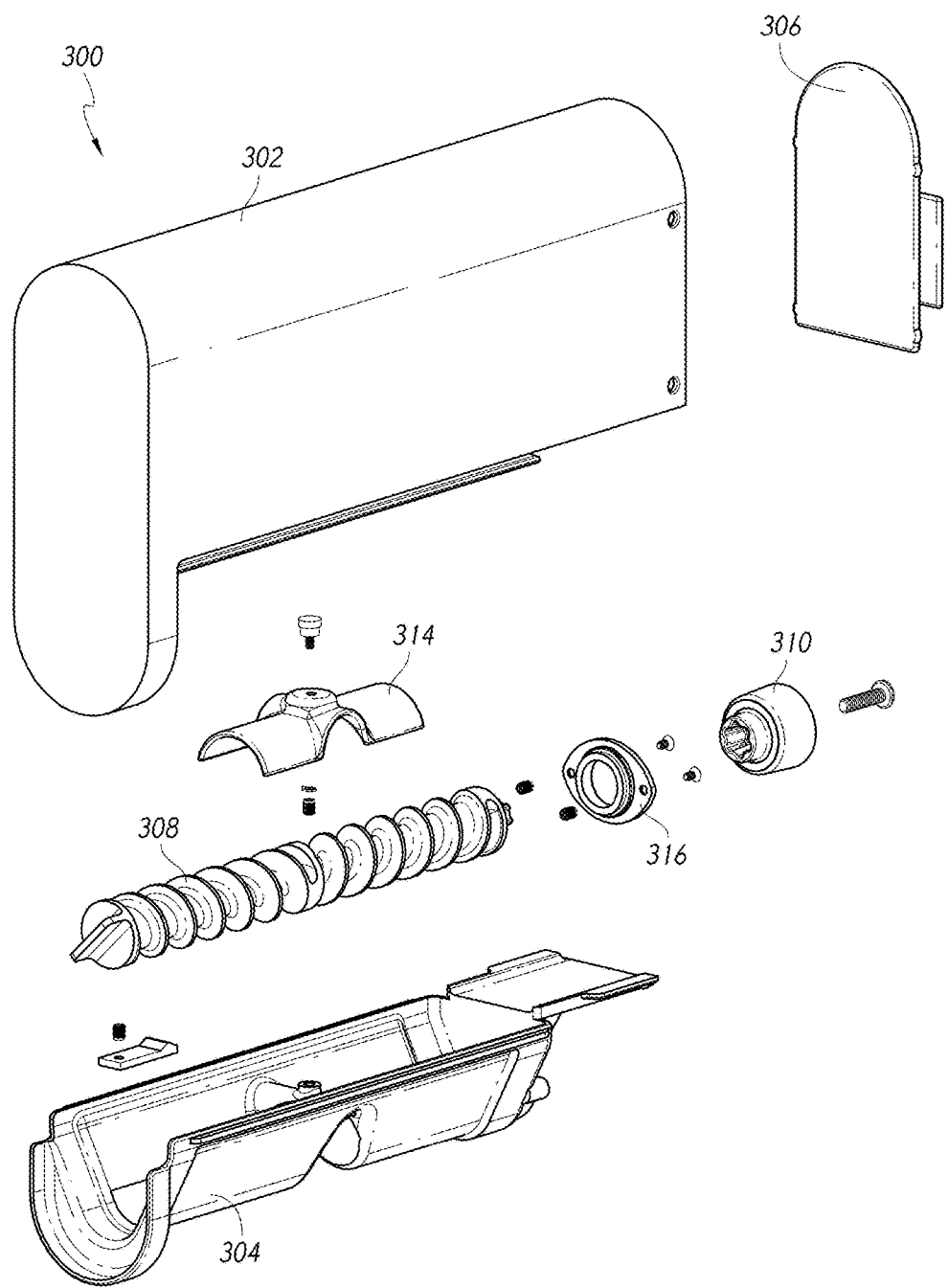
FIG. 3G illustrates an exploded view of the hopper assembly shown in FIG. 3A.

In general, as shown in FIG. 3G, the hopper assembly 300 can include an outer housing having an upper body portion 302 and a lower body portion 304. The upper and lower body portions 302, 304 can define an interior volume that can receive the beverage material. Although FIG. 3G illustrates the upper and lower body portions 302, 304 as separate components, the upper and lower body portions 302, 304 can be integrally formed. An auger 308 can be disposed at least partially within the outer housing and can deliver the controlled dose of beverage material to the grinder assembly 500.

Figure 2N:
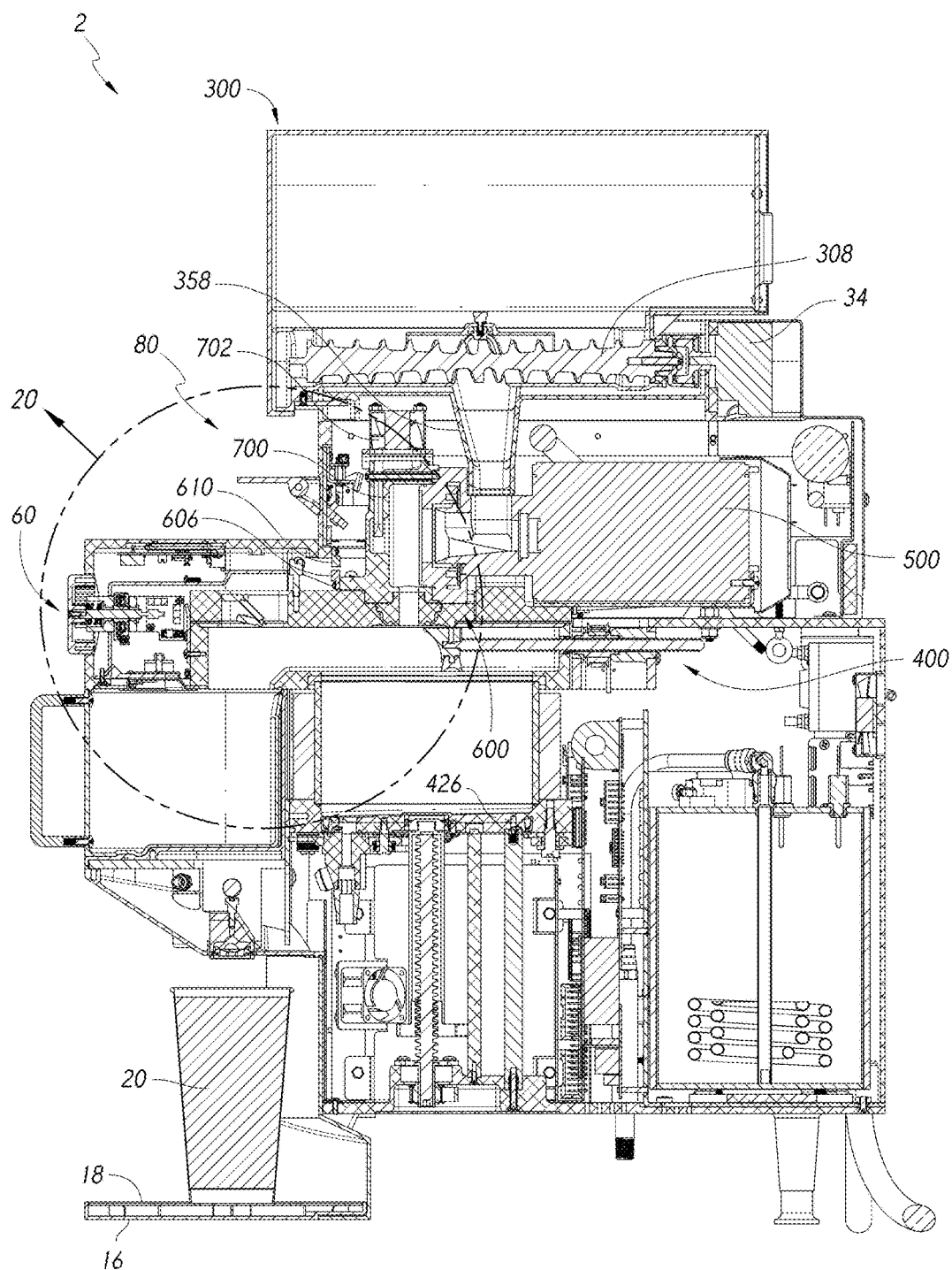
FIG. 2N illustrates a cross-section of the system shown in FIG. 2A taken along line 2N-2N.
Figure 20:
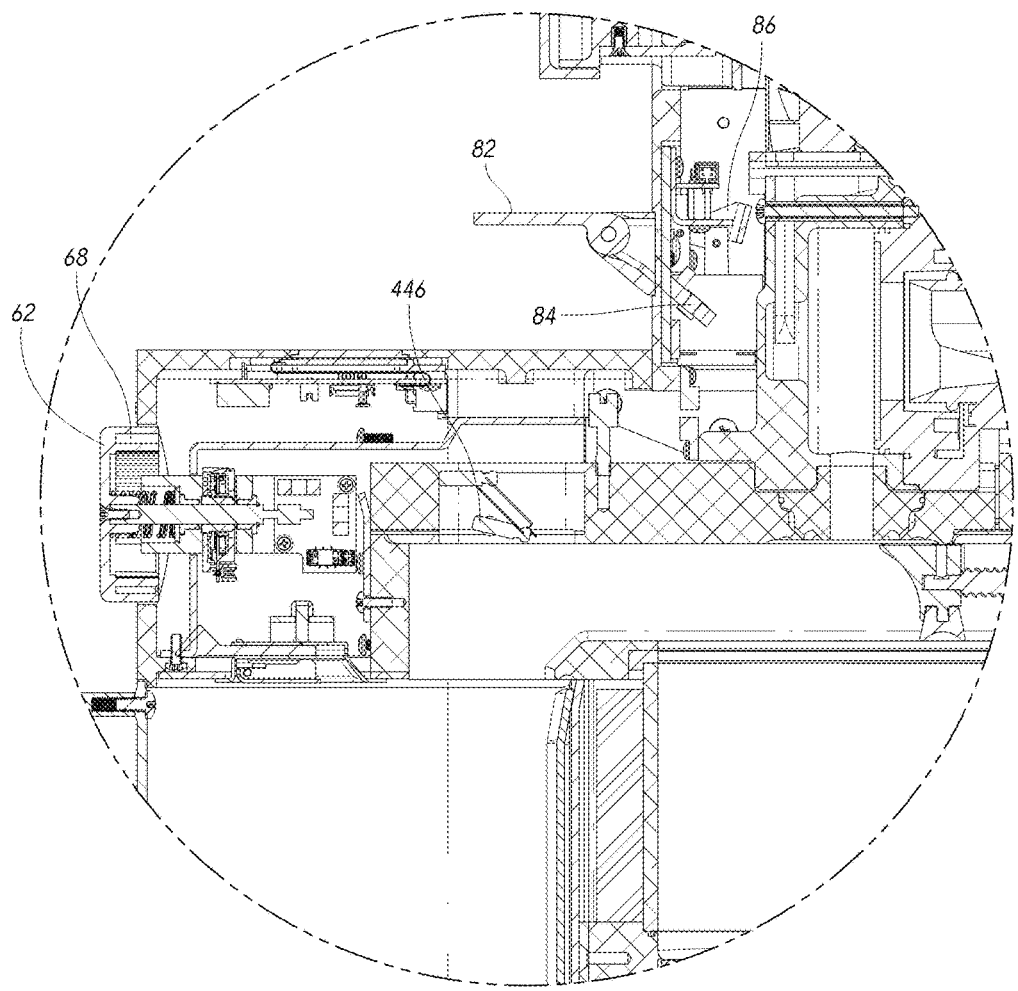

When fully assembled, the auger 308 can be at least partially disposed within the lower body portion 304. An auger retainer 316 can secure an end of the auger 308 to the lower body portion 304. As shown in FIG. 2N, an auger coupling 310 can couple an end of the auger 308 to a hopper motor 34 that can drive the auger 308. The auger coupling 310 and the auger retainer 316 can be coupled to a same end or different ends of the auger 308. In certain configurations, as shown in FIG. 3F, the hopper assembly 300 can include a visor 314 disposed along at least a portion of the auger 308, such that the auger 308 is positioned between the visor 314 and the lower housing portion 304. The visor 314 can prevent beverage material from being excessively pulled from the center of hopper assembly 300. Further, the visor 314 in combination with the auger 308 can prevent beverage material from inadvertently falling through the outlet 312 when the auger 308 is inactive. Although the visor 314 is illustrated as a separate component, the visor 314 can be integrally formed with the lower body portion 304.

The hopper motor 34 can turn the auger 308 in a clockwise or a counterclockwise direction. For example, the hopper motor 34 can turn the auger 308 in a first direction to dispense the beverage material from the hopper assembly 300, and the hopper motor 34 can turn the auger 308 in a second direction to move beverage material away from the hopper assembly outlet 312. The ability to rotate the auger 308 in the second direction allows the user to move beverage material away from the outlet 312 before removing the hopper assembly 300 from the beverage apparatus 2. This minimizes the likelihood that beverage material will spill out of the hopper assembly 300 when the hopper assembly 300 is disengaged from the beverage apparatus 2.

Further, if the hopper assembly 300 is completely empty and refilled with beverage material, the initial rotation of the auger 308 will not release any beverage material from the hopper assembly 300 because there is no beverage material disposed in the flutes near the outlet 312. Thus, to improve dose accuracy, it can be desirable to rotate the auger 308 in the second direction between each beverage to return the auger 308 to an initial position, for example, in which there is no beverage material retained in the flutes near the outlet 312. With a repeatable and known initial position (i.e., known coffee volume in the flutes), it is more likely that the dose will be consistent from beverage to beverage.

As shown in FIG. 3A, the hopper assembly 300 can be shaped such that the length L and height H of the hopper assembly 300 are substantially larger than a width W of the hopper assembly 300. For example, each of the length L and the height H can be at least about three times, at least about four times, or at least about five times greater than the width W of the hopper assembly 300. As shown in FIG. 1A, this hopper assembly 300 configuration makes it possible to include a multiple number of hopper assemblies 300 on a single beverage apparatus 2. The narrow width W allows the barista to see the proximal face 354 of each hopper assembly 300, while still limiting the width of the counter space necessary for the beverage apparatus 2. In some embodiments, the width W can be less than or equal to about 10 inches, preferably less than or equal to about 5 inches, for example, 4 inches, 3 inches, or 2 inches.

As shown in FIGS. 3B-3D, the upper body portion 302 can include a proximal face 352, a distal face 354, and lateral sides 356 therebetween. The proximal face 352 can include curved upper and lower edges and straight lateral edges therebetween. The distal face 354 can include a curved upper edge, a straight bottom edge, and straight lateral edges therebetween. Though, in other configurations, the proximal and distal faces 352, 354 can be substantially rectangular, circular, elliptical, or any other desired shape. In other configurations, the upper body portion 302 can be substantially cylindrical, conical, or any other desired shape.

As shown in FIG. 3G, the distal face 354 can be a removable hopper door 306 to provide access to the interior volume of the hopper assembly 300, which can be useful for refilling the beverage material. The hopper door 306 can be secured to the lateral sides 356 of the upper body portion 302 using screws, a hinge, a snap fit, a friction fit, or any other suitable connection mechanism. In other configurations, access to the interior volume of the hopper assembly 300 can be disposed along the proximal face 352, lateral sides 356, an upper portion, or a lower portion of the upper body portion 302 (e.g., by removing the lower body portion 304).

In some configurations, as shown in FIG. 3A, the proximal face 352 can extend further than the distal face 354, such that the lower body portion 304 can be secured to the upper body portion 302 without extending past a bottom edge of the proximal face 352. The extension portion 344 can include a lip portion 346 for mating with a corresponding lip portion 337 on the lower body portion 304. Further, one or more engagement features (e.g., lip, ridge, protrusion, indentation, groove, or opening) can extend intermittently or continuously along at least a portion of a bottom edge of one or both lateral sides of the upper body portion 302. For example, the upper body portion 302 can include an inward facing ridge 342 that can support an outward facing ridge 350 on the lower body portion 304. In some configurations, the upper body portion 302 can include an outward facing ridge 340 for engaging a corresponding outward facing ridge 340 on another hopper assembly 300 or the hopper retainer 8.

Figure 3H:
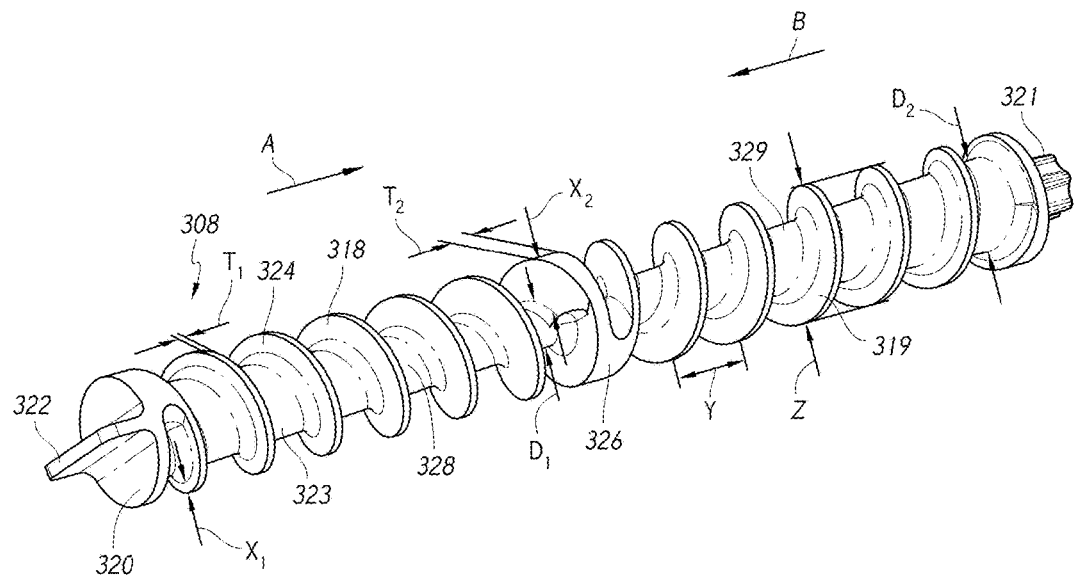
FIG. 3H illustrates an auger component of the hopper assembly shown in FIG. 3A.
Figure 3I:
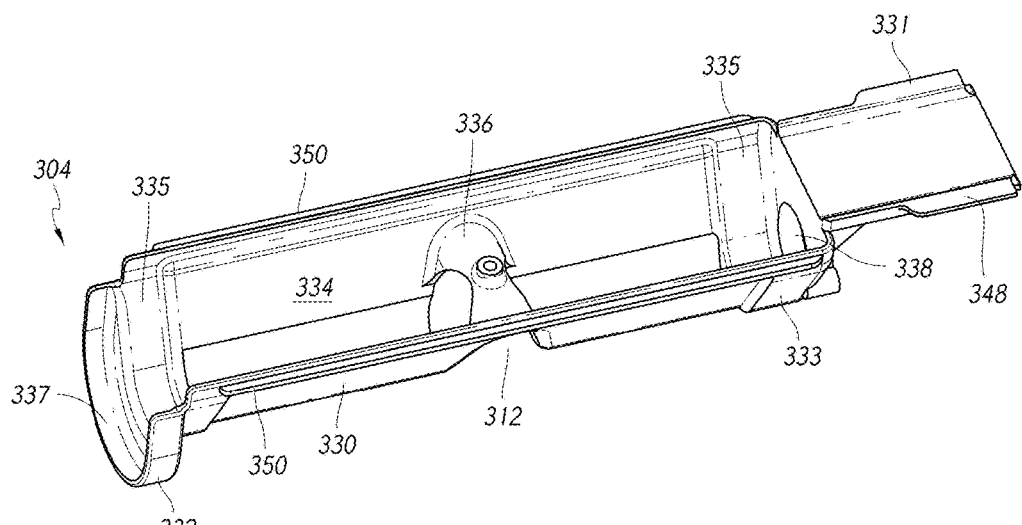
FIG. 3I illustrates a lower body portion of the hopper assembly shown in FIG. 3A.
Figure 3J:
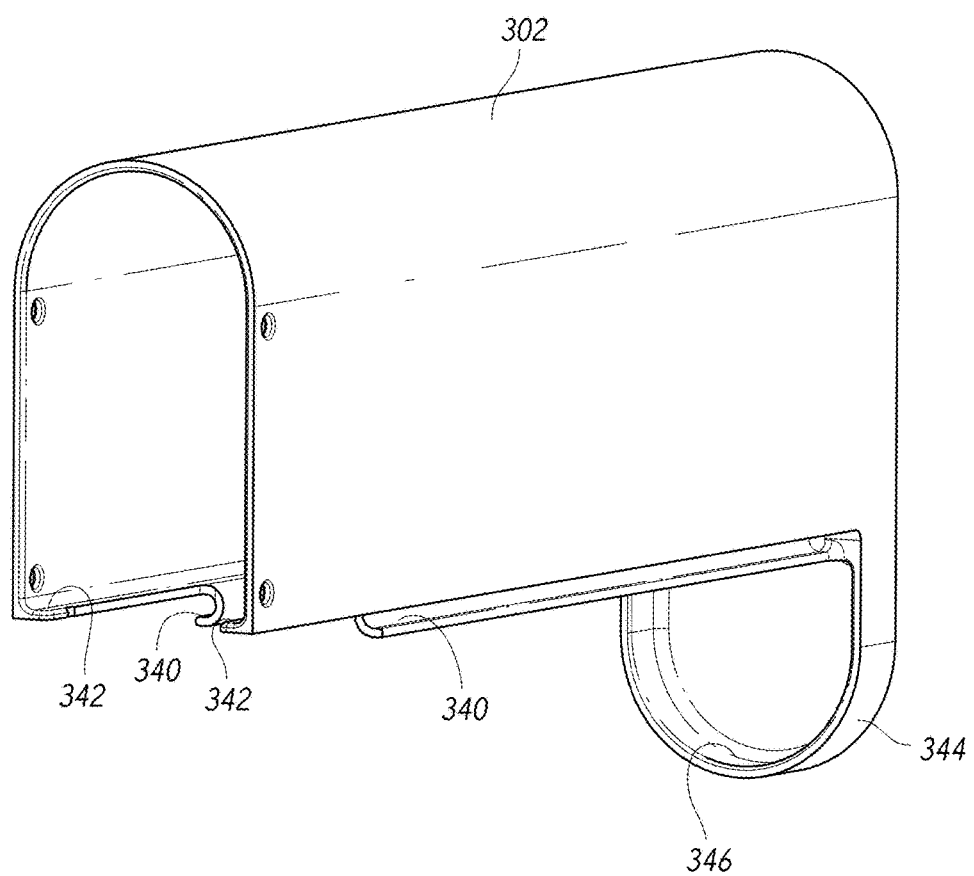
FIG. 3J illustrates an upper body portion of the hopper assembly shown in FIG. 3A.

As shown in FIG. 3I, the lower body portion 304 can define an open area 334 for receiving the auger 308. The lower body portion 304 can be shaped and positioned in the beverage apparatus 2, such that the auger 308 is substantially parallel to a base of the beverage apparatus 2. In other configurations, the auger 308 can be positioned at an incline.

The lower body portion 304 can include an auger holder portion 330 and an extension portion 331. The auger holder portion 330 can have a length adequate to receive substantially the entire length or the entire length of the auger 308.

Further, the auger holder portion 330 can include a first end 332 and a second end 333. The first end 332 can include a lip portion 337 that can engage the lip portion 346 of the upper body portion 302. The second end 333 can define an opening 338 through which an end of the auger 308 can extend to connect to the hopper motor 34.

The lower body portion 304 can include an outlet 312 for the beverage material to exit the hopper assembly 300. The outlet 312 can be positioned anywhere along the lower body portion 304, for example, at a central portion of the lower body portion 304. A portion 336 of the lower body portion 302 can extend over the outlet 312 to define a space through which the auger 308 can extend. The portion 336 can help maintain the position of the auger 308. Further, the visor 314 can be secured to the portion 336 and over the auger 308.

The auger holder portion 330 can include a number of grooves 335, indentations, or likewise, to retain the position of the auger 308. For example, each groove 335 can have a width sized to retain a portion (e.g., a single rotation) of the screw thread 324. The grooves 335 can be positioned anywhere along a length of the auger holder portion 330. For example, the auger holder portion 330 can include one or more grooves 330 at one or both ends of the auger holder portion 330 and/or at or near a center of the auger holder portion 330. The auger holder portion 330 can include one groove, two grooves, three grooves, or more at each position. As shown in FIG. 3I, the auger holder portion 330 can include a groove 335 at each end of the auger holder portion 330.

The grooves 335 retain the position of the auger 308, while still making it easy to remove the auger 308 from the lower body portion 302 for cleaning. The grooves 335 are also sized for easy cleaning, so beverage material is not stuck in the grooves 335. Further, the hopper assembly 300 has a minimal total number of parts for easy disassembly.

Although not shown, in other configurations, the auger holder portion 330 can include one or more protrusions for retaining the position of the auger 308. Each protrusion can be sized to fit between two rotations of the screw thread.

The extension portion 331 can extend from the second end 333 of the auger holder portion 330. The extension portion 331 can include one or more engagement features 348 (e.g., lip, ridge, protrusion, groove, indentation, or opening) for engaging a corresponding engagement feature, such as the inward facing ridge 342 on the upper body portion 302. The extension portion 331 can be shaped to engage the upper body portion 302 while providing a space for the hopper motor 34 at least partially below the upper body portion 302 and distal to the lower body portion 304.

The hopper motor 34 can be positioned anywhere distal to the hopper assembly 300, below the hopper assembly 300, lateral from the hopper assembly 300, proximal to the hopper assembly 300, or above the hopper assembly 300. In some configurations, the lower body portion 304 does not include an extension portion 331, and the lower body portion 302 has a length less than a length of the upper body portion 302, such that the hopper motor 34 can still be positioned at least partially below the upper body portion 302 and distal to the lower body portion 304. In other configurations, the lower body portion 304 can have a length that is substantially the same as the upper body portion 302, such that the hopper motor 34 is positioned distal to both the upper and lower body portions 302, 304 or below the lower body portion 304.

FIG. 3H illustrates an exemplary embodiment of the auger 308 including an inner core 323 and a screw thread 324 at least partially surrounding the inner core 323. The auger 308 can be tapered so that the auger 308 pulls beverage material substantially evenly from the hopper assembly 300. With conventional auger-based beverage apparatuses, beverage material is often pulled excessively from one or both ends of the hopper until a mound of beverage material remains at the center of the hopper. Once the beverage material at each end is exhausted, the auger cannot dispense any beverage material even though a mound of beverage material remains at the center of the hopper.

As shown in FIG. 3H, the auger 308 can include a first end 320 and a second end 321. The first end 320 can include a tabbed portion 322 to facilitate easy grasping of the auger 308. The second end 321 can connect directly or indirectly to the hopper motor 34.

The auger 308 can include a first end 320 and a second end 321. The first end 320 can include a tabbed portion 322 to facilitate easy grasping of the auger 308. The second end 321 can connect directly or indirectly to the hopper motor 34.

The inner core 323 and the screw thread 324 can include a same material or different materials. For example, the inner core 323 can include stainless steel and the screw thread 324 can be injection molded around the inner core 323 using nylon, PVC, polymers, ceramics, or any combination thereof. As another example, the inner core 323 and the screw threads 324 can each include nylon, PVC, polymers, ceramics, or any combination thereof.

Manufacturing the auger 308 can include a two-step injection molding process. First, the inner core 323 can be injection molded using nylon, PVC, polymers, ceramics, or any combination thereof. After the inner core 323 cools, the screw thread 324 can be injection molded over the inner core 323 using nylon, PVC, polymers, ceramics, or any combination thereof.

The tapered inner core 323 can include a first tapered portion 328 and a second tapered portion 329. The first tapered portion 328 can extend from a first end 320 toward a central portion 326. The second tapered portion 328 can extend from a second end 321 toward the central portion 326. The inner core portions 328, 329 can be separately formed or integrally formed to form a single auger 308 component. Further, each portion 328, 329 can extend along about one-half a length of the auger 308, one-third, one-fourth, or any other fraction of the length of the auger 308.

The first portion 328 can be tapered in a first direction, and the second portion 329 can be tapered in a second direction that is opposite the first direction. For example, the first portion 328 can be tapered in direction A toward the central portion 326, and the second portion 329 can be tapered in direction B toward the central portion 326. The first and second portions 328, 329 can be tapered to the same degree, such that the inner core 323 is symmetrical. To evenly deliver beverage material from the hopper assembly 300, each of the first and second portions 328, 329 can be tapered at an angle of at least about 1 degree and/or less than or equal to about 10 degrees, for example between about 1 degree and 5 degrees, such as about 3 degrees. A smallest diameter $D_1$ of the tapered portion can be less than or equal to about 75% of a largest diameter $D_2$ of the tapered portions 328, 329, such as less than or equal to about 70%, 65%, 60%, 55%, 50%, 45%, or 40%. For example, the smallest diameter $D_1$ can be between about 50% and about 75% of the largest diameter $D_2$, such as between about 50% and about 60%, between about 55% and about 65%, between about 60% and about 70%, or between about 65% and about 75%. The diameter $D_2$ of the inner core 323 can be less than or equal to about 3 inches, less than or equal to about 2 inches, or less than or equal to about 1 inch, such as about 0.8 inches. A diameter $D_1$ of the inner core 323 can be less than or equal to about 3 inches, less than or equal to about 2 inches, less than or equal to about 1 inch, or less than or equal to about 0.5 inches, such as about 0.4 inches.

Although FIG. 3H illustrates an exemplary auger 308, the inner core 323 can take on other configurations. In some configurations, the first and second portions 328, 329 can be tapered at different angles. In other configurations, the entire inner core 323 can be tapered in a single direction. In further configurations, the first portion 328 can be tapered in direction B, and the second portion 329 can be tapered in direction A. In some configurations, the inner core 328 is substantially straight and not tapered.

As described above, the screw thread 324 can at least partially surround the inner core 323. The screw thread 324 can include a first threaded portion 318 and a second threaded portion 319. The first threaded portion 318 can extend from the first end 320 of the auger 308 toward the central portion 326 of the auger 308. The second threaded portion 319 can extend from the second end 321 of the auger 308 toward the central portion 326 of the auger 308. The first and second threaded portions 318, 319 can form a continuous screw thread or form separate screw threads. In some configurations, there can be more than two threaded portions. Further, although the screw thread 324 is shown extending along substantially the entire length of the auger 308, in other configurations, the screw thread 324 may extend continuously or intermittently along only a portion of the auger 308, but preferably, along at least a majority of the length of the auger 308.

In some configurations, the auger 308 can include a tapered inner core 323, while still maintaining a substantially uniform outermost diameter Z. The diameter Z of the auger 308 can be less than or equal to about 3 inches, less than or equal to about 2 inches, or less than or equal to about 1 inch. For example, the diameter Z can be between about 1 inch and 2 inches, such as about 1.2 inches.

In some configurations, a height of the screw thread 324 can vary along the tapered inner core 323. The height of the first and second threaded portions 318, 319 can increase from the ends 320, 321 of the auger 308 toward the central portion 326 of the auger 308. For example, the screw thread 324 can include a smallest height $X_1$ and a largest height $X_2$. $X_1$ can be less than or equal to about 50% of $X_2$, such as less than or equal to about 40%, less than or equal to about 30%, or less than or equal to about 20% of $X_2$. For example, $X_1$ can be between about 15% and about 25%, between about 20% and 30%, between about 25% and about 35%, between about 30% and about 40%, between about 35% and about 45%, or between about 40% and about 50% of $X_2$. The height of the screw thread 324 at any position can be less than or equal to about 1 inch, 0.5 inches, 0.4 inches, 0.3 inches, 0.2 inches, or 0.1 inches. For example, $X_2$ can be between about 0.25 inches and about 0.5 inches, and $X_1$ can be less than or equal to about 0.25 inches.

A thickness $T_1$ of the screw thread 324 can be the same along substantially the entire length of the screw thread 324. In some configurations, as shown in FIG. 3H, a threaded portion at the central portion 326 can have a greater thickness $T_2$, for example, at the transition from the first threaded portion 318 to the second threaded portion 319. $T_2$ can be at least two times, at least about three times, or at least about four times greater than $T_1$. $T_1$ can be less than or equal to about 0.5 inches, preferably less than or equal to about 0.25 inches, for example, less than or equal to about 0.1 inches, such as about 0.07 inches. $T_2$ can be less than or equal to about 0.5 inches, preferably between about 0.25 inches and about 0.35 inches or between about 0.3 inches and 0.4 inches, such as about 0.34 inches.

To evenly deliver beverage material from the hopper assembly 300, the screw threads 324 can be disposed at an angle of at least about 90 degrees and less than 180 degrees relative to a longitudinal axis of the auger 308, preferably between about 90 degrees and about 120 degrees, for example, between about 90 degrees and about 105 degrees or between about 105 degrees and 120 degrees. In some embodiments, the screw threads 324 can be disposed at an angle of about 102 degrees relative to the longitudinal axis of the auger 308.

In some configurations, an inner diameter of the screw thread 324 can vary along the tapered inner core 323. The inner diameter of the first and second threaded portions 318, 319 can decrease from the ends 320, 321 of the auger 308 to the central portion 326 of the auger 308. For example, the screw thread 324 can include a smallest inner diameter $D_1$ and a largest inner diameter $D_2$. A smallest inner diameter $D_1$ of the threaded portions 318, 319 can be less than or equal to about 75% of a largest inner diameter $D_2$ of the threaded portions 318, 319, such as less than or equal to about 70%, 65%, 60%, 55%, 50%, 45%, or 40%. For example, the smallest inner diameter $D_1$ can be between about 50% and about 75% of the largest inner diameter $D_2$, such as between about 50% and about 60%, between about 55% and about 65%, between about 60% and about 70%, or between about 65% and about 75%. The inner diameter $D_2$ of the threaded portions 318, 319 can be less than or equal to about 3 inches, less than or equal to about 2 inches, or less than or equal to about 1 inch, such as about 0.8 inches. A diameter $D_2$ of the threaded portions 318, 319 can be less than or equal to about 3 inches, less than or equal to about 2 inches, less than or equal to about 1 inch, or less than or equal to about 0.5 inches, such as about 0.4 inches.

As shown in FIG. 3H, a distance Y between each rotation of the screw thread 324 can be substantially the same along the length of the screw thread 324. Although, depending on the dimensions of the screw thread 324, the spacing Y can vary between each rotation of the screw thread 324. The distance Y can be less than or equal to about 1.0 inch, 0.75 inches, or 0.5 inches, for example, between about 0.25 inches and 0.5 inches, between about 0.5 inches and 0.75 inches, or between about 0.75 inches and about 1.0 inch.

Further, as shown in FIG. 3H, the first threaded portion 318 can be twisted in a first direction and the second threaded portion 319 can be twisted in a second direction opposite the first direction to drive the beverage material toward the centrally disposed outlet 312 of the lower body portion 304. However, depending on the position of the outlet 312, the entire screw thread 324 may be twisted in the same direction.

Viewed another way, the auger 308 can include a body portion having one or more spiral flutes surrounding the body portion. The auger 308 can drive ground material through the spiral flutes and out through the outlet 312. The flutes are structured such that the auger 308 has a substantially constant outer diameter and a tapered inner diameter. The depth of the flutes can vary across a length of the auger 308 such that the depth is greater near the center of the auger 308 than at the ends of the auger 308. The sidewalls of the flutes of can be at an angle of greater than 90 degrees and/or less than 180 degrees relative to a longitudinal axis of the auger 308. To evenly deliver beverage material from the hopper assembly 300, the sidewalls can be angled between about 90 degrees and 120 degrees, such as between about 90 degrees and 100 degrees, between about 100 degrees and 110 degrees, or between about 110 degrees and about 120 degrees relative to the longitudinal axis of the auger 308. The angle can be about 100 degrees, about 102 degrees, or about 105 degrees.

Although the threaded portions 318, 319 have been described above according to certain configurations, other configurations are also imaginable. For example, the screw thread 324 may be configured such that the outermost diameter Z of the screw thread 324 varies along the length of the screw thread 324.

Figure 3K:
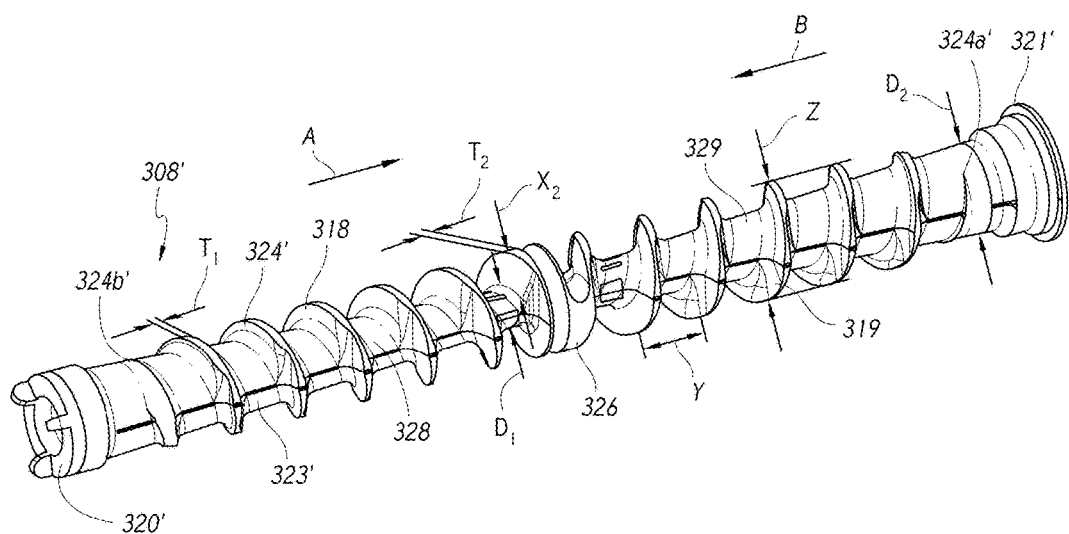
FIG. 3K illustrates a perspective view of another embodiment of an auger.

As another example, FIG. 3K illustrates another auger 308' that can be used with the hopper assembly 300 as described above. The screw thread 324' may not extend entirely from the first end 320' to the second end 321' of the auger 308'. At least one end of the screw thread 324' can be spaced apart from the ends of the auger 320', 321'. The screw thread 324' may extend across less than about 90% of the inner core 323' or less than about 80% of the inner core 323'. The clearance between the ends of the screw thread 324a', 324b' and the ends of the auger 320', 321' can provide greater clearance for the beverage material when the auger is back-driving the beverage material away from the auger outlet 312.

Grinder Assembly

Figure 2P:
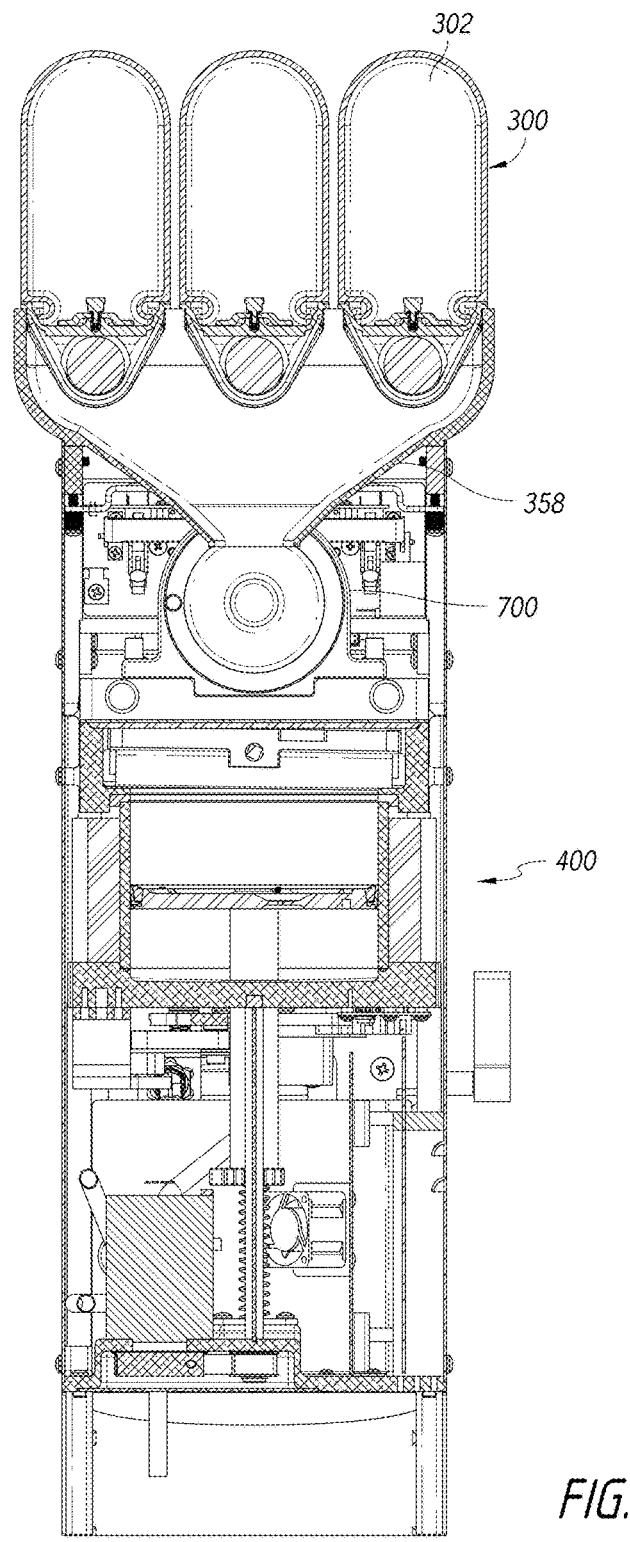
FIG. 2P illustrates a cross-section of the system shown in FIG. 2A taken along line 2P-2P.

One or more hopper assemblies 300 can connect to the brewing assembly 400 via a chute 358 (shown in FIG. 2P). The chute 358 can provide a passageway from one or more hopper assembly outlets 312 to the grinder assembly opening 502. Although FIG. 2P illustrates a single chute 358, the beverage apparatus 2 can include multiple chutes leading to a single grinder assembly 500 or separate grinder assemblies 500.

In some configurations, there can be a grinder assembly 500 for each hopper assembly 300. However, it can be desirable to use one grinder assembly 500 for at least two hopper assemblies 300, for example, two, three, four, five, or more hopper assemblies 300. Using a single grinder assembly 500 for multiple hopper assemblies 300 can reduce the amount of space required for the grinder assemblies 500, reduce the cost of goods, reduce points of failure, and reduce the amount of necessary calibration.

FIGS. 5A-5E illustrate different views of the grinder assembly 500. The grinder assembly 500 can grind the beverage material to a controlled ground size. The ground size can vary based on a number of factors, including, but not limit to, the type of beverage material or the type of drink.

The grinding mechanism illustrated in FIGS. 5A-5E is a burr grinder, but other grinding mechanisms, such as a blade grinder or a roller grinder can be used. The grinder assembly 500 can include a grind adjustment mechanism to adjust the distance between the burrs 514. The grind adjustment mechanism can be driven by a motor and belt system (not shown). The motor can drive a gear 506 to adjust the distance between the burrs 514. In some configurations, the gear mechanism can be a worm gear mechanism.

The grinder assembly 500 can continue to grind beverage material until there is no beverage material retained in the grinder assembly 500. In certain aspects, the grinder assembly 500 can continue to grind beverage material until there is no beverage material retained between the hopper assembly 300 and the grinder outlet 510. In other words, the grinder assembly 500 can grind the entire amount of beverage material released from the hopper assembly 300. This feature can be beneficial for a beverage apparatus 2 having multiple hopper assemblies 300 connected to a single grinder assembly 500 to prevent cross-contamination of different beverage materials.

Ground material can be transferred from the grinder assembly 500 to the brew chamber 402 through the grinder outlet 510. Once the ground material enters the brew chamber 402, the ground material can be mixed with water. However, if the water (e.g., steam or condensation) enters the grinder assembly 500, the grinder assembly 500 can rust or ground material can get wet and clog the grinder assembly 500. As such, it can be desirable to position a fan 702 near the grinder outlet 510 to create positive pressure to displace water vapor (see FIG. 2N).

Figure 7B:
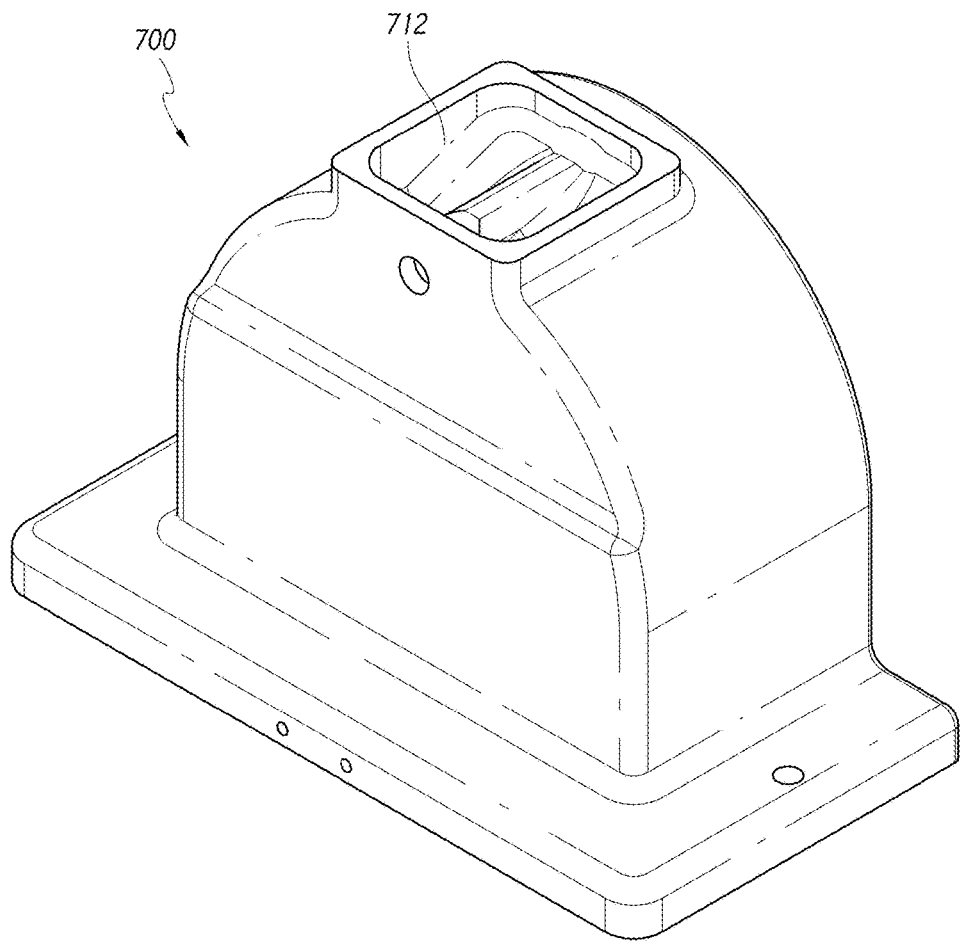
FIG. 7B illustrates a rear perspective view of the grinder cap shown in FIG. 7A.
Figure 7C:
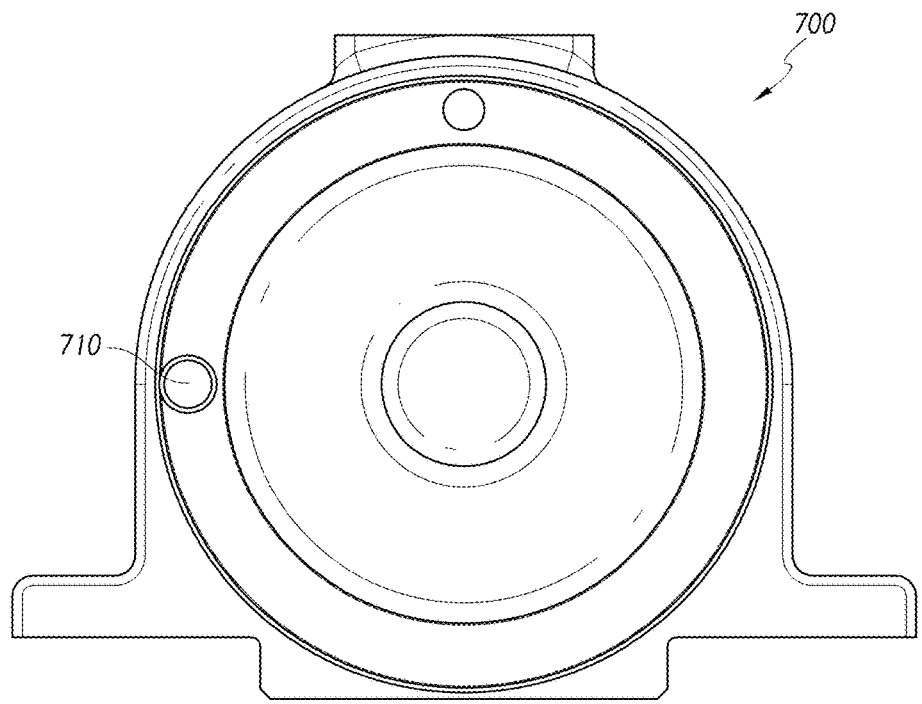
FIG. 7C illustrates a front view of the grinder cap shown in FIG. 7A.
Figure 7D:
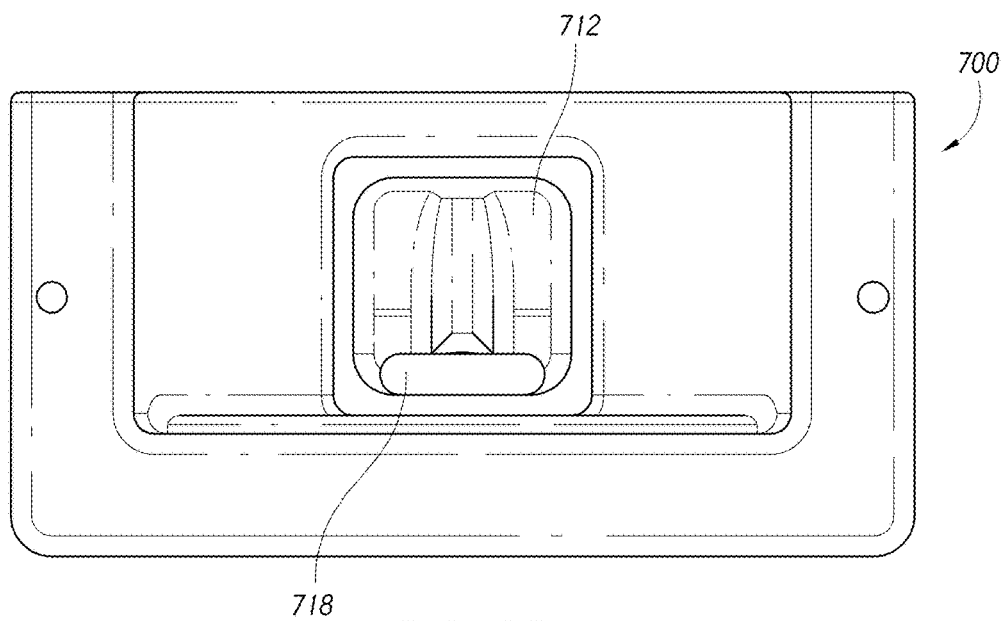
FIG. 7D illustrates a top view of the grinder cap shown in FIG. 7A.

In some configurations, as shown in FIGS. 4A-4F, a grinder cap 700 can be secured to the outlet end of the grinder assembly 500 to enclose the burr zone. FIGS. 7A-7D illustrate enlarged views of the grinder cap 700. The grinder cap 700 can include grinder engagement feature 710 (e.g., recess, opening, protrusion, or otherwise) that can engage a corresponding grinder cap engagement feature 516 (e.g., recess, opening, protrusion, or otherwise). The grinder cap 700 can also include an outlet 708 positioned along a lower portion of the grinder cap 700 such that ground material can pass from the grinder assembly 500 to the brew chamber 402. The fan 702 can be positioned along an upper portion of the grinder cap 700. For example, as shown in FIG. 7A, the fan 702 can be secured to the grinder cap 700 by a mounting member 704. Further, as shown in FIGS. 7B and 7D, in some embodiments, the upper portion of the grinder cap 700 can include a baffle device 712 to direct airflow from the fan 702 toward opening 718. The fan 702 and the baffle device 712 can be positioned such that the grinder outlet 510 is positioned between the baffle device 712 and the grinder cap outlet 708 to the brew chamber 402. This configuration provides positive pressure across the entire grinder outlet 510 and grinder cap outlet 708 to ensure water vapor does not escape into the grinder assembly 500. The baffle 712 can also direct air at the center of the burr region, so the ground material stays closer to a periphery of the grinder outlet 510. Although the baffle 712 is shown in connection with the grinder cap 700, the baffle 712 can be a separate component from the grinder cap 700 or grinder assembly 500.

Figure 7E:
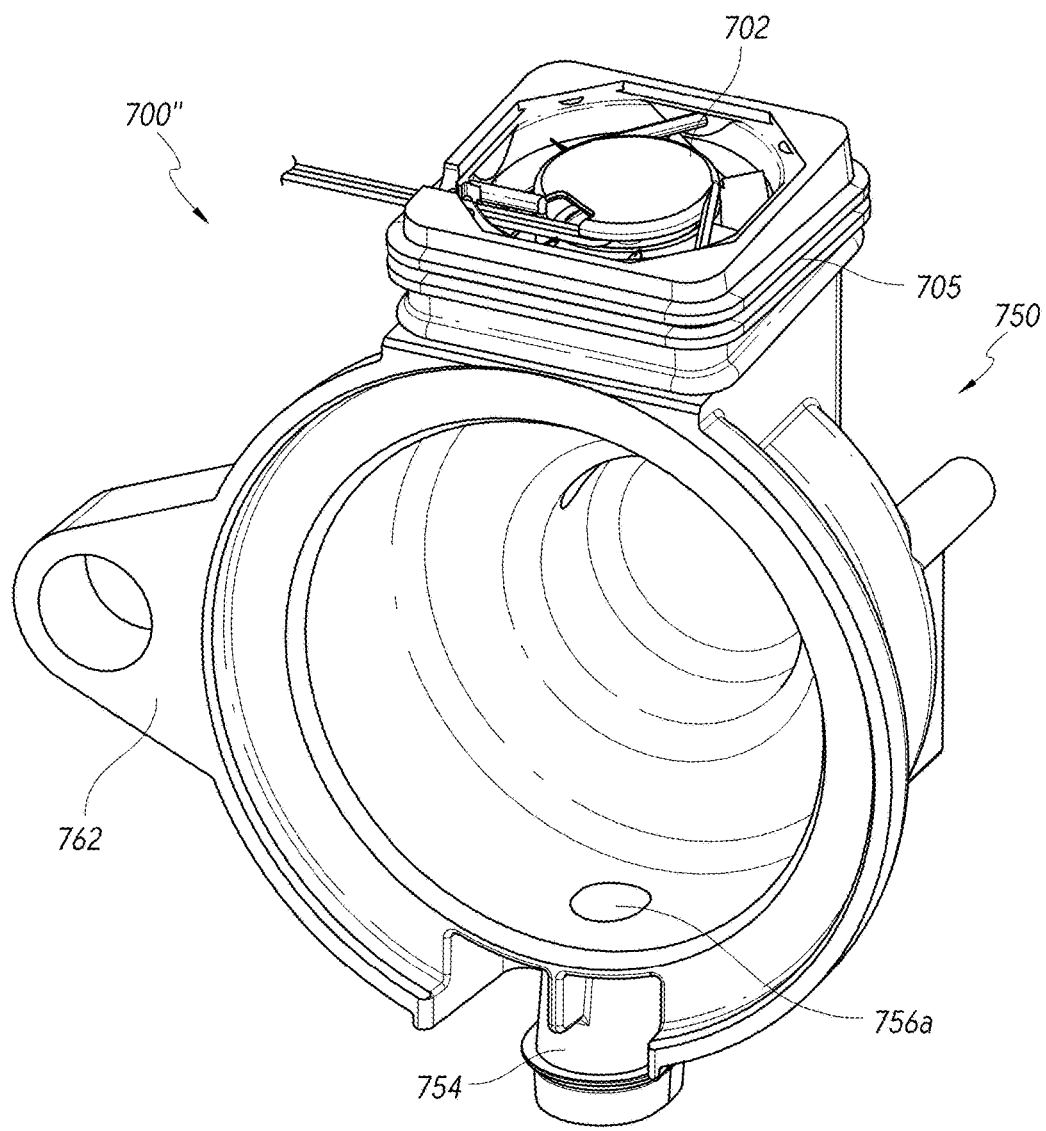
FIG. 7E illustrates a perspective view of another embodiment of a grinder outlet subassembly.

FIG. 7E illustrates another embodiment of a grinder outlet subassembly 700". As shown in FIG. 7E, the fan 702 can be coupled to the grinder cap 750. For example, the fan 702 can interface with the baffle device 752, such that the baffle device 752 directs airflow into the grinder cap 750. The fan 702 can be coupled to the grinder cap 750 by a bellow feature 705. The bellow feature 705 can be constructed from compliant rubber to provide a seal between the fan 702 and the grinder cap 750. Air flowing from the fan 702 can flow through the bellow feature 705 to the baffle device 752.

Similar to the grinder cap 700, the grinder cap 750 can be secured to the outlet end of the grinder assembly 500 to enclose the bur zone using any of the engagement features described in connection with the grinder cap 700. Further, the grinder cap 750 can include a securement member 762 to secure the grinder cap to a fluid passageway of the beverage apparatus.

Figure 7F:
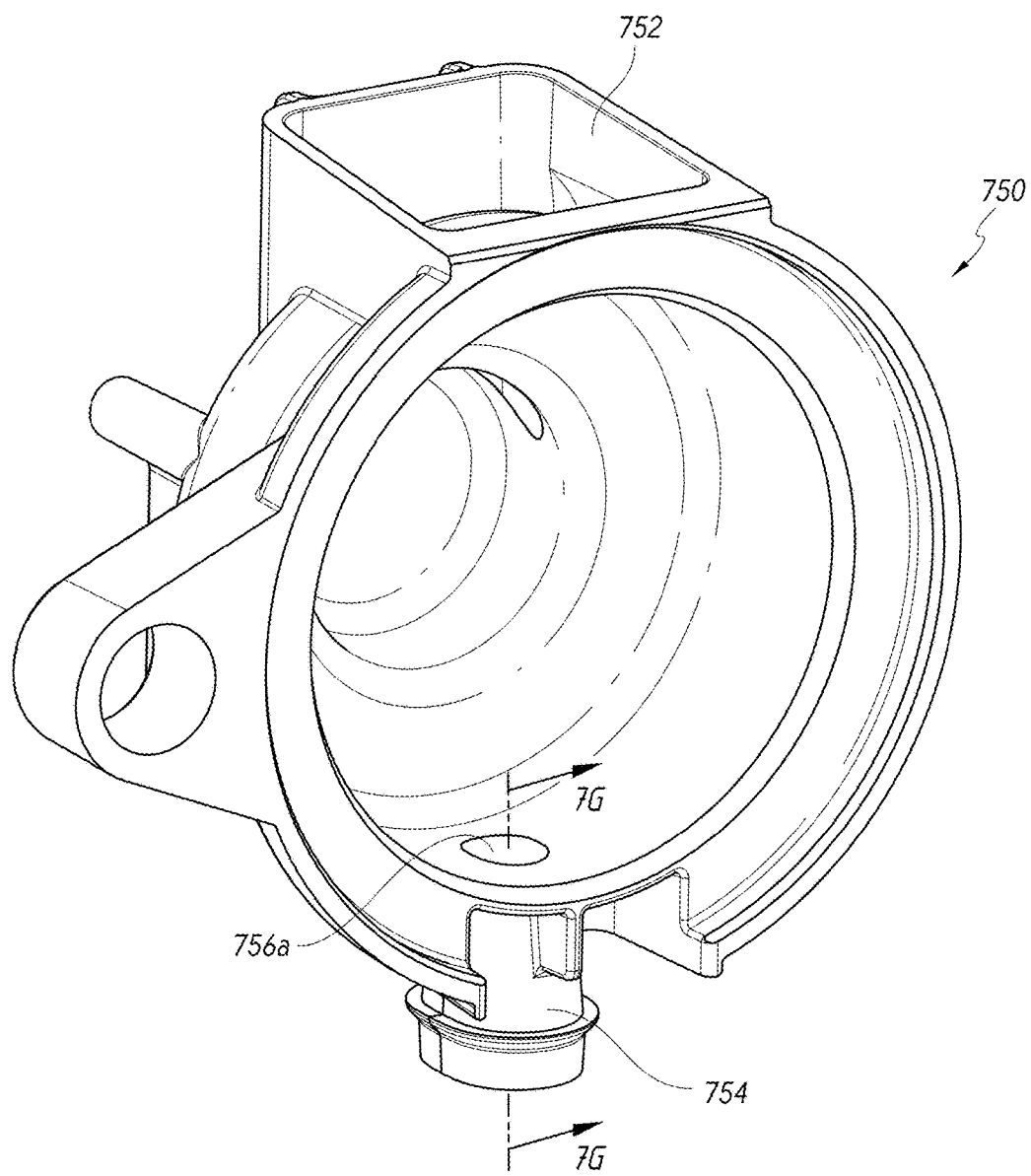
FIG. 7F illustrates a perspective view of the grinder cap shown in FIG. 7E.
Figure 7G:
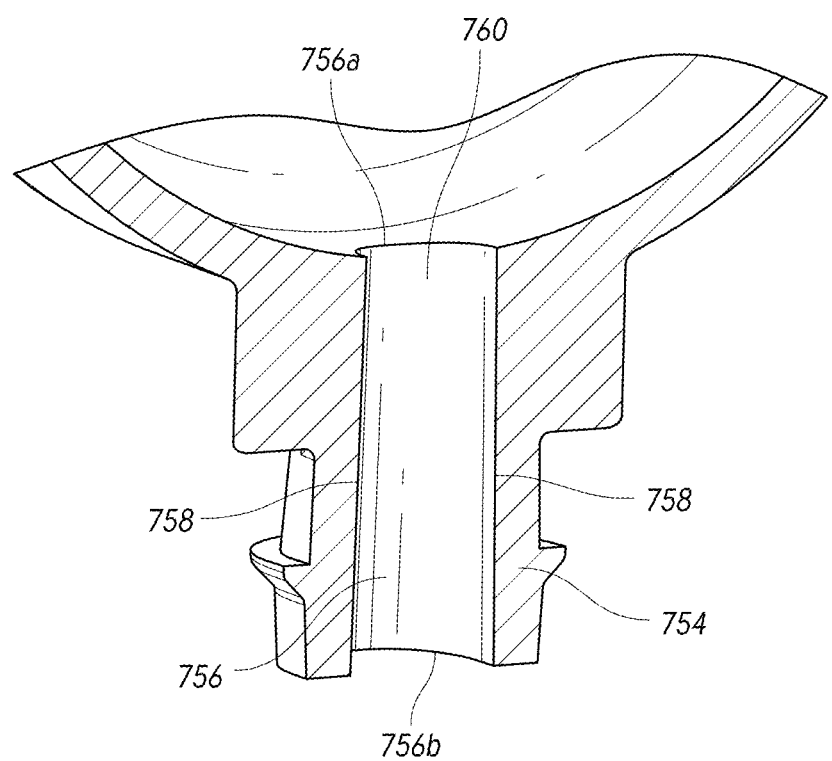
FIG. 7G illustrates an enlarged cross-section of an outlet portion of the grinder cap shown in FIG. 7F taken through line 7G-7G.
Figure 8A:
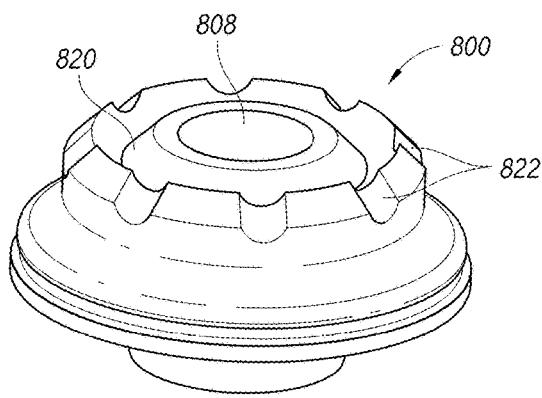
FIGS. 8A-8B illustrates perspective views of an embodiment of the mixing valve.
Figure 8B:
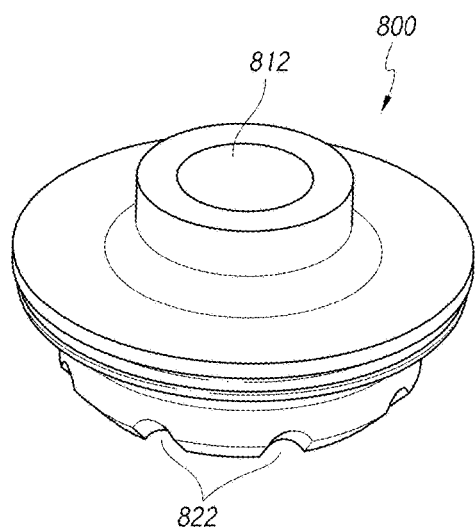
Figure 8C:
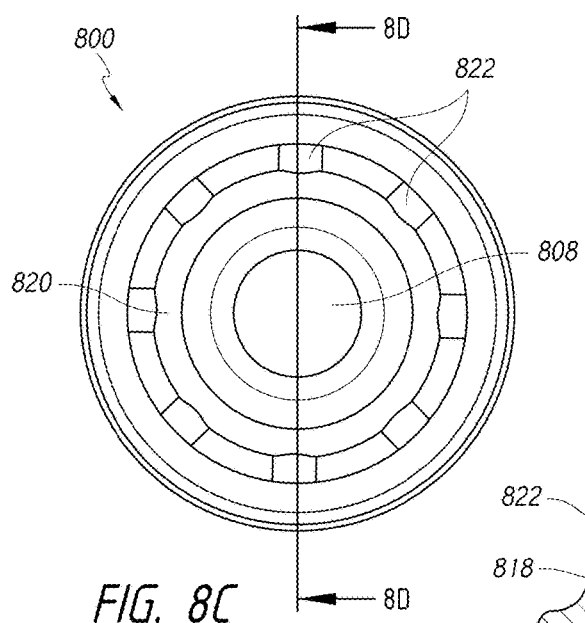
FIG. 8C illustrates a bottom view of the mixing valve shown in FIG. 8A.
Figure 8D:
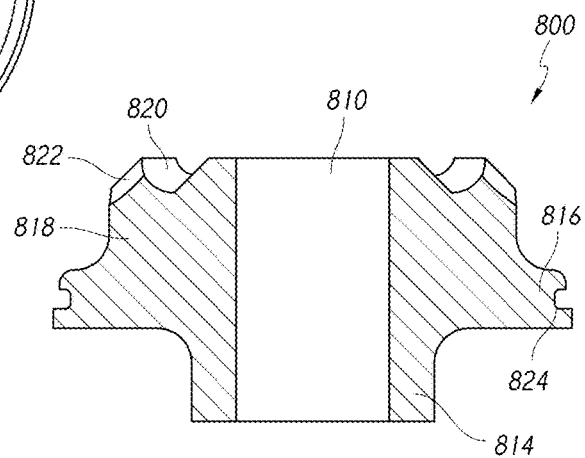
FIG. 8D illustrates a cross-section of the mixing valve shown in FIG. 8C taken along line 8D-8D.
Figure 8E:
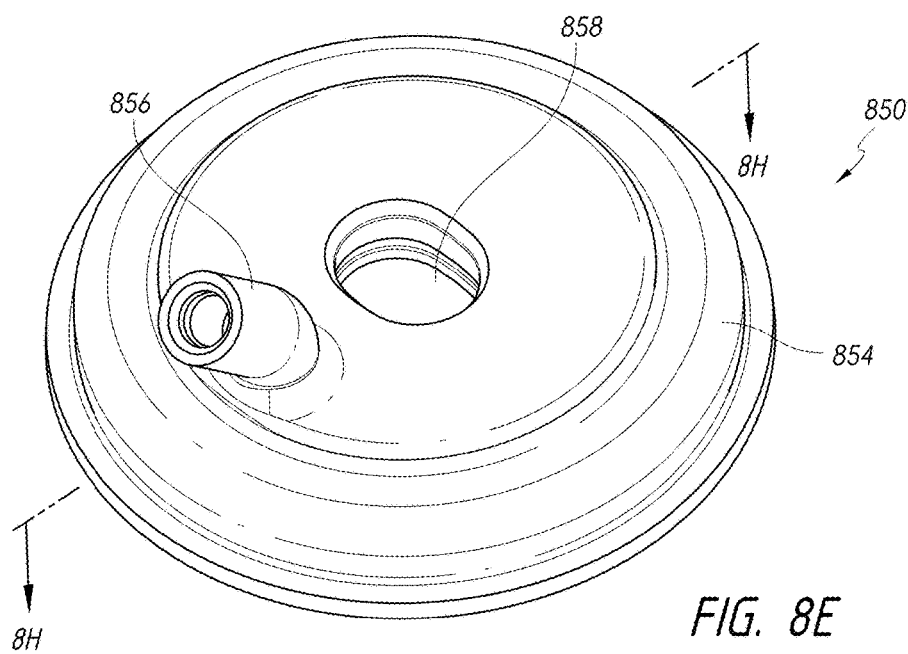
FIG. 8E illustrates a perspective view of another embodiment of the mixing valve.
Figure 8F:
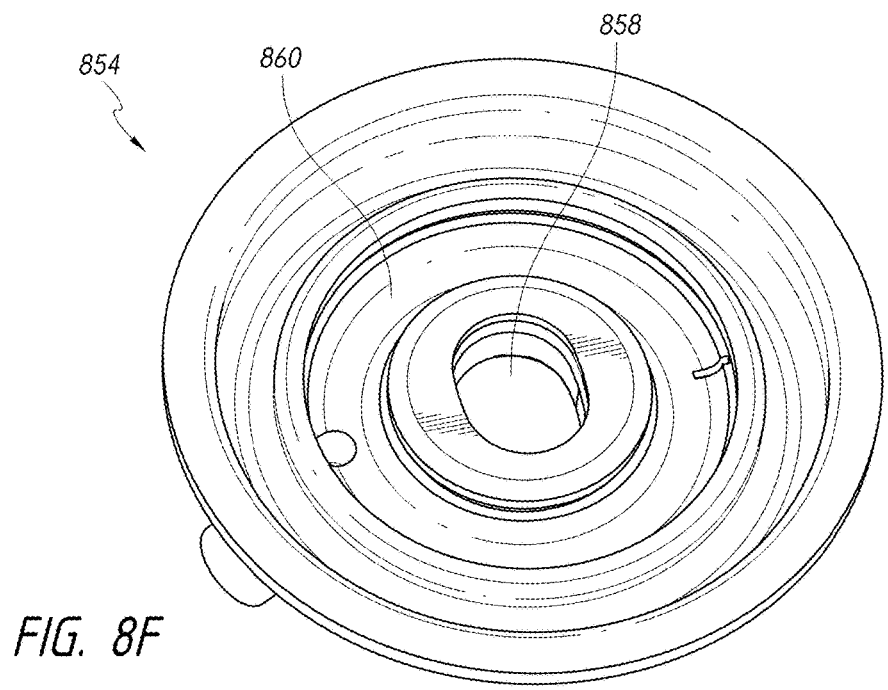
FIG. 8F illustrates a bottom perspective view of an outer member of the mixing valve shown in FIG. 8E.

As shown in FIG. 7F, the grinder cap 750 can include a grinder outlet portion 754 can extend through a central opening of a mixing valve, e.g., the mixing valve 850 (see FIGS. 8E and 8F). The grinder outlet portion 754 can include a tapered lumen 756 to facilitate dispensation of the grinds without clogging the grinder cap 750. As shown in FIG. 7G, the tapered lumen 756 can include non-tapered surfaces 760 extending between tapered lateral surfaces 758, thus forming an opening 756a and an outlet 756b that are elliptical or rectelliptical (i.e. a curved rectangle). The non-tapered surfaces 760 can be substantially parallel to each other and generally perpendicular to a transverse plane extending through the beverage assembly.

It can also be desirable to include a power interlock mechanism to ensure that the beverage apparatus 2 does not function when the grinder assembly 500 is not in the machine 2 or is not properly connected. The upper brewing assembly 600 can include a magnet 606, and the upper portion 4 of the beverage apparatus 2 can include a proximity sensor 610 to detect the magnet 606 (shown in FIG. 2N). The proximity sensor 610 will only detect the magnet 606 when the upper brewing assembly 600 is correctly positioned in the beverage apparatus 2 and the upper portion 4 is in a closed position. If the proximity sensor 610 does not detect the magnet 606, then the beverage apparatus 2 cannot be activated. Although sensor 610 is described as a proximity sensor, any other type of sensor is possible, such as an optical sensor, ultrasonic sensor, or a mechanical switch.

Upper Brewing Assembly

As described earlier, after the ground material enters the brew chamber 402, the ground material can be mixed with water as soon as the ground material enters the brew chamber to prevent static grounds from adhering throughout the chamber and to consistently maximize flavor extraction. Immediate wetting also ensures that the ground material falls to the bottom of the brew chamber and forms an evenly packed bed of ground material with a uniform depth. Further, immediate wetting can increase speed of service by decreasing total brew time.

Figure 6A:
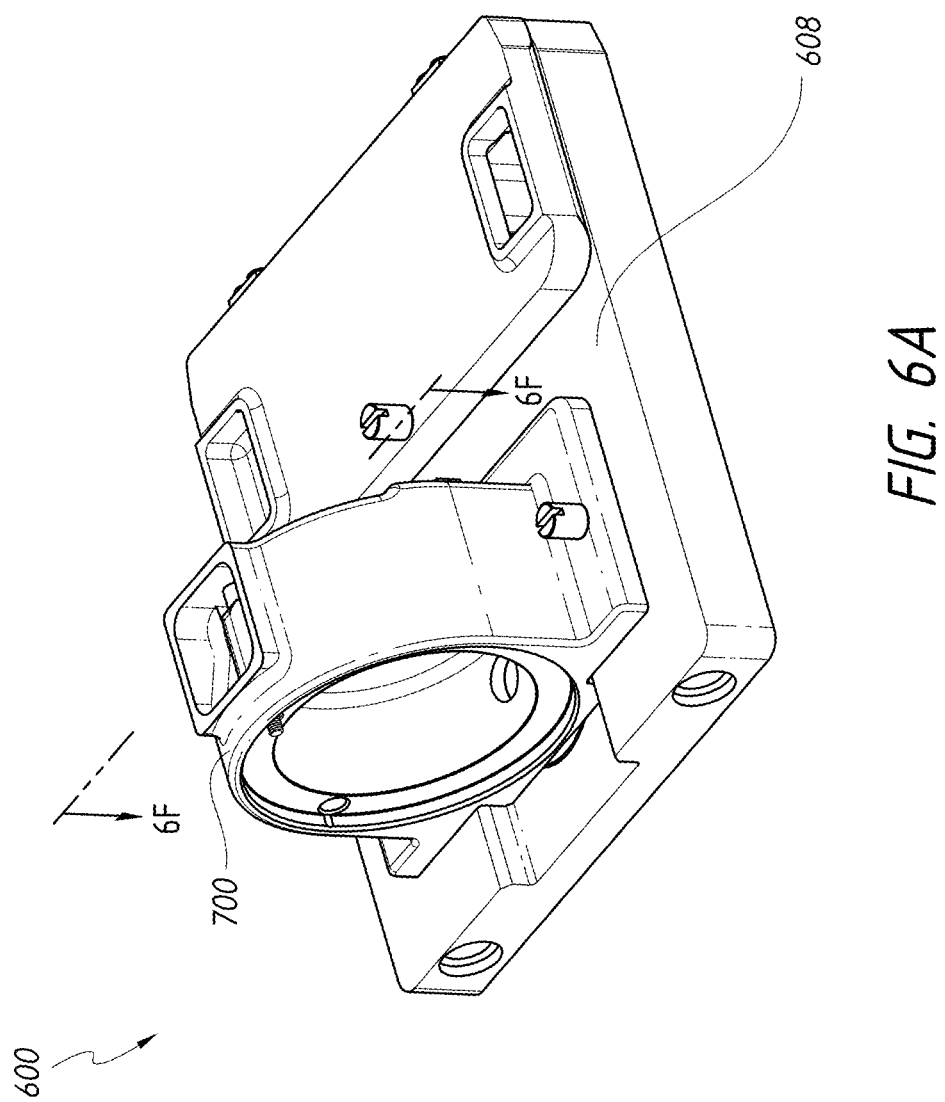
FIG. 6A illustrates an embodiment of an upper brewing assembly.
Figure 6B:
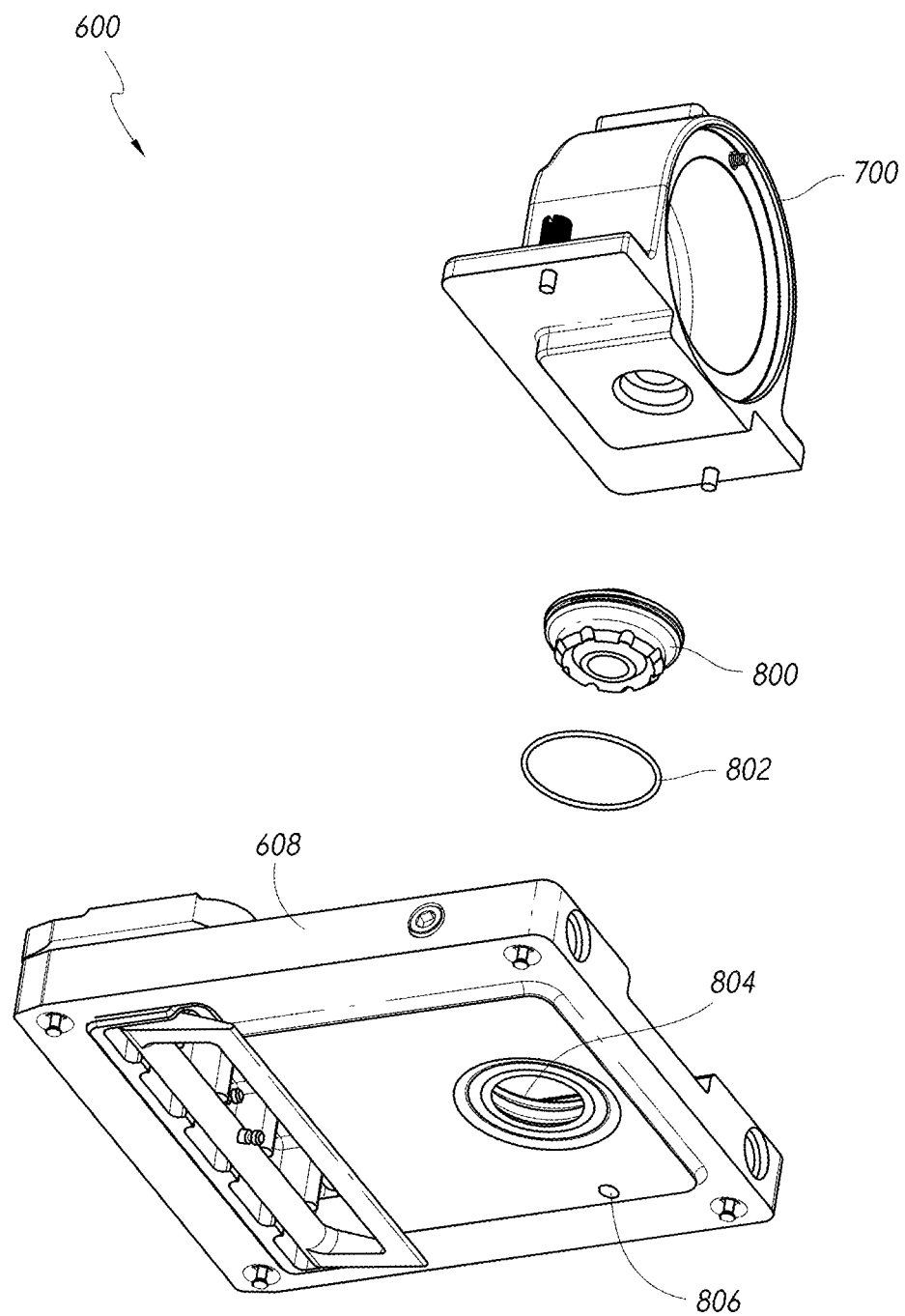
FIG. 6B illustrates a bottom, perspective view of an exploded view of the upper brewing assembly shown in FIG. 6A.
Figure 6C:
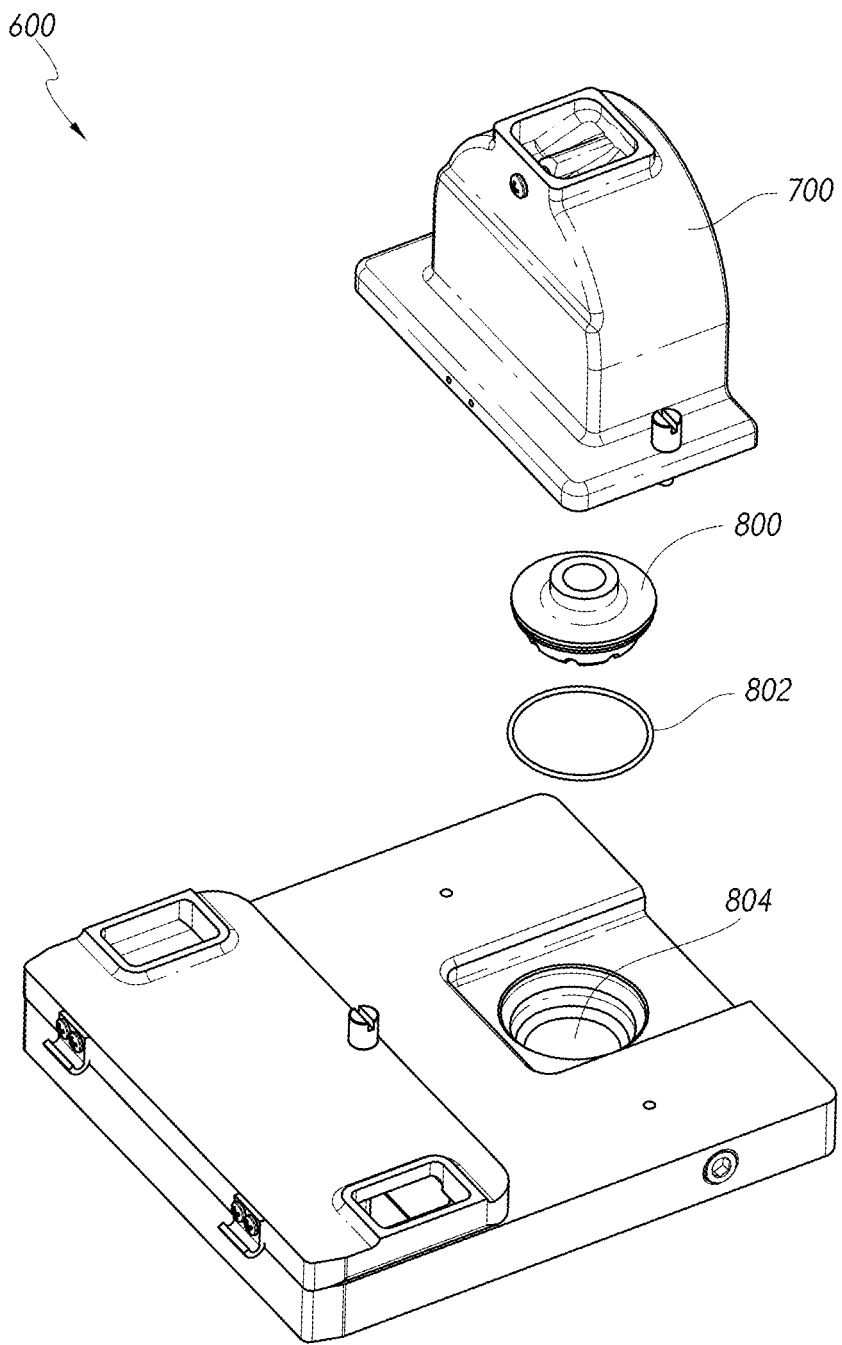
FIG. 6C illustrates a top, perspective view of an exploded view of the upper brewing assembly shown in FIG. 6A.
Figure 6D:
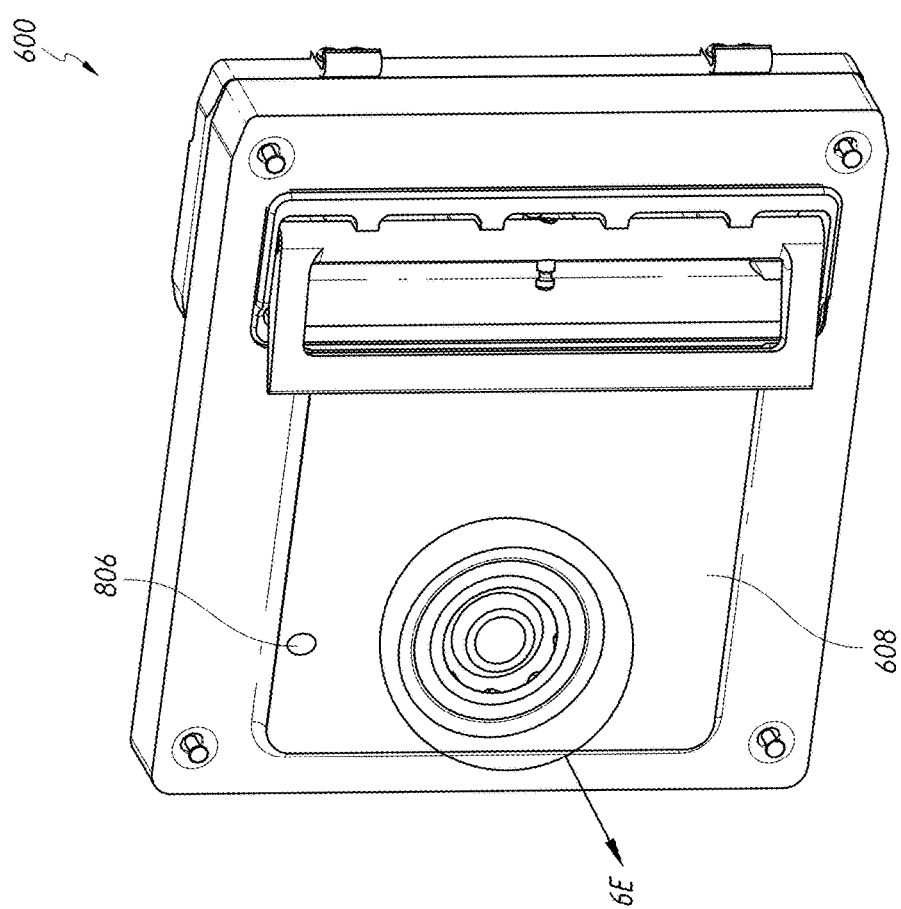
FIG. 6D illustrates a bottom view of the upper brewing assembly shown in FIG. 6A.
Figure 6E:
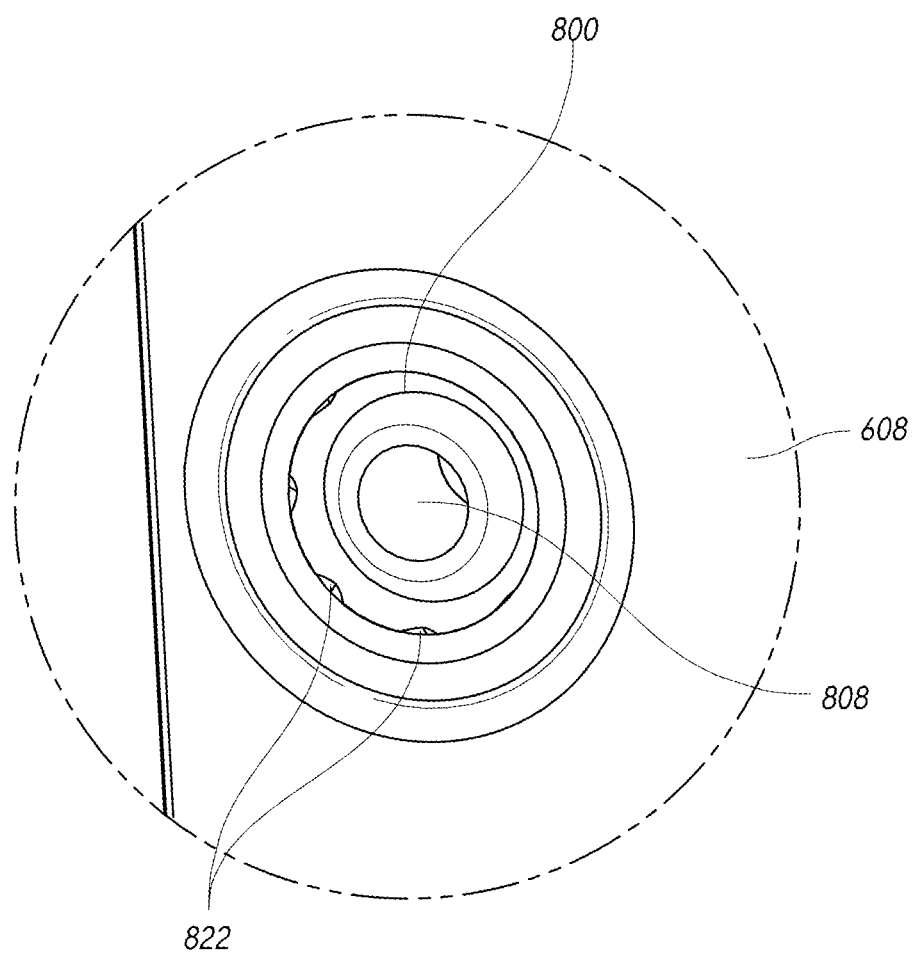
FIG. 6E illustrates an enlarged view of the mixing valve shown in FIG. 6D taken along line 6E.

FIGS. 8A-8D illustrate different views of a mixing valve 800 designed to wet the ground material as soon as the ground material exits the grinder cap outlet 708. As shown in FIGS. 6A-6C and 6F, the mixing valve 800 can be positioned in the opening 804 of the upper assembly plate 608, between grinder cap 700 and the brew chamber 402. FIGS. 6D and 6E illustrate a bottom view of the upper assembly 600, which shows a bottom view of the mixing valve 800 when the upper assembly 600 is fully assembled.

As shown in FIG. 8D, the mixing valve 800 can be a unitary structure including an upper portion 814, a lower portion 818, and an intermediate portion 816 therebetween. However, in other embodiments, one or more of the upper, lower, and intermediate portions 816 can be separate components.

Figure 6F:
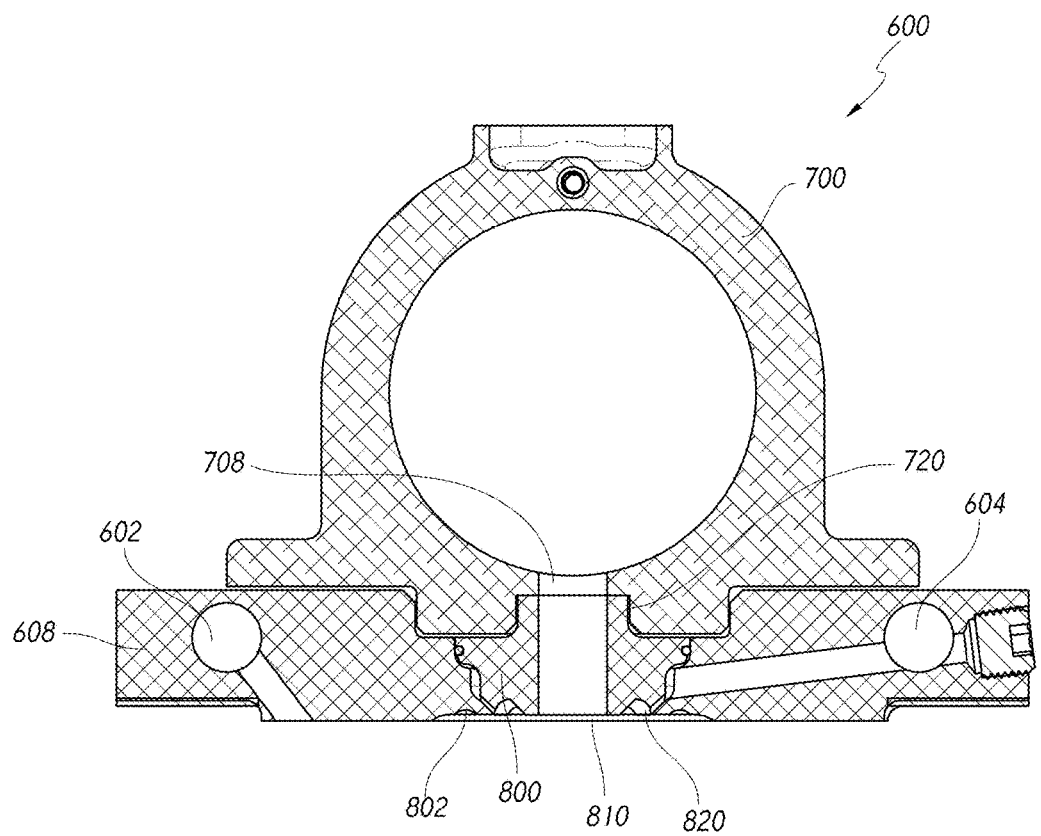
FIG. 6F illustrates a cross-section of the upper brewing assembly shown in FIG. 6A taken along line 6F-6F.

As shown in FIG. 6F, the grinder cap 700 can include a recessed portion 720 that can receive the upper portion 814. In some embodiments, the intermediate portion 816 can include an annular recess 824 that can receive a seal ring 802 to form a seal between the mixing valve 800 and the upper assembly plate 608.

The intermediate portion 816 can include a diameter that is greater than both the upper and lower portions 814, 818. Further, a diameter of each of the intermediate portion 816 and lower portions 818 can be at least 25%, at least about 50%, at least about 75%, or at least about 100% greater than a diameter of the upper portion 814. In some instances, the diameter of each of the intermediate portion 816 and the lower portion 818 can be between about 1.0 inch and 3.0 inches, such as between about 1.0 inch and 1.5 inches, between about 1.5 inches and 2.0 inches, between about 2.0 inches and 2.5 inches, or between about 2.5 inches and 3.0 inches.

The mixing valve 800 can define a channel 810 that provides a passageway for ground material to pass from the grinder cap 700 to the brew chamber 400. The channel 810 can include an inlet 812 and an outlet 808. The inlet 812 can be in fluid communication with the grinder cap outlet 708. The outlet 808 can be in fluid communication with the brew chamber 402. The channel 810 can be centrally disposed along a longitudinal axis of the mixing valve 800.

As shown in FIG. 6F, the mixing valve 800 can be in fluid communication with a first fluid channel 604. The first fluid channel 604 can deliver water from a water input port to the mixing valve 800. Further, the mixing valve 800 can include a number of pathways 822 (e.g., channels, indentations, openings) for directing water into the brew chamber 402. The number of pathways 822 can include one, two, three, four, five, six, seven, eight, or more pathways 822 circumferentially disposed around the channel 810. The pathways 822 can be positioned at an angle to direct water toward ground material exiting the outlet of the channel 810. For example, each pathway 822 can direct water at an angle greater than 0 degrees and less than 90 degrees relative to the longitudinal axis of the mixing valve 800, such that the water is directed generally inward toward ground material exiting the outlet 808. For example, each pathway can be directed at an angle between about 1 degree and 15 degrees, between about 15 degrees and 30 degrees, between about 30 degrees and about 45 degrees, between about 45 degrees and about 60 degrees, between about 60 degrees and about 75 degrees, or between about 75 degrees and 90 degrees. Preferably, the pathways 822 are angled at about a 45-degree angle relative to the longitudinal axis of the mixing valve 800. In some instances, the pressure behind the mixing valve 800 can be between about 0 and 4 PSI. In certain aspects, the water delivered from each pathway 822 can intersect just below the outlet 808. Advantageously, directing water at an angle can also help agitate the ground material and reduce or eliminate the need for mechanical agitation, which can help reduce the total brew time.

Each pathway 822 can include a width of at least about 0.05 inches and/or less than or equal to about 0.5 inches, for example, between about 0.05 inches and about 0.15 inches, between about 0.1 inches and about 0.2 inches, between about 0.15 inches and about 0.25 inches, between about 0.2 inches and about 0.3 inches, between about 0.25 inches and about 0.35 inches, between about 0.3 inches and about 0.4 inches, between about 0.35 inches and about 0.45 inches, or between about 0.4 inches and about 0.5 inches.

As shown in FIG. 8A, the mixing valve 800 can include a recessed portion 820, disposed between at least one of the pathways 822 and the channel outlet 808. The recessed portion 820 is sufficiently deep to collect water droplets and prevent water droplets from entering the channel 810. As described above, it can be important to prevent water from moving toward the grinder assembly 500 to avoid rusting or clogging the grinder assembly 500. As shown in FIG. 8A, the recessed portion 820 can be an annular ring disposed between the pathways 822 and the channel outlet 808. The recessed portion 820 can be at least 0.05 inches deep and/or less than or equal to about 0.5 inches deep, for example, between about 0.5 inches and about 0.25 inches, such as about 0.125 inches. In other configurations, the recessed portion 820 can include a multiple number of recessed portions that can collect water droplets.

To create different beverage recipes, it can be desirable to deliver water to the brew chamber 402 at different temperatures. Thus, it can be desirable to include a second water input to deliver water at a different temperature. As shown in FIGS. 6D and 6F, the upper assembly 600 can include a fill nozzle 806 that can direct additional water to the brew chamber 402. The fill nozzle 806 can be in fluid communication with a second fluid channel 602. In some embodiments, a fill valve can be disposed in the fill nozzle 806 to control fluid flow through the fill nozzle 806. Based on the selected beverage, the controller can indicate the timing and amount of water delivered from the fill nozzle 806 and/or mixing valve 800 can be controlled for different recipes.

The temperature of the water (e.g., net or at any time) delivered from both the fill nozzle 806 and mixing valve 800 can be at least about 190 degrees and/or less than or equal to about 200 degrees. In some configurations, water delivered from the fill nozzle 806 can have a higher temperature than water delivered from the mixing valve 800. The net temperature of the water delivered from the fill nozzle 806 can be between about 200 degrees and about 205 degrees or between about 205 degrees and about 210 degrees. The net temperature of the water delivered from the mixing valve 800 can be between about 190 degrees and about 195 degrees or between about 195 degrees and about 200 degrees.

FIGS. 8E-8H illustrate another embodiment of a mixing valve 850. Similar to the mixing valve 800, the mixing valve 850 can direct water at an angle and toward the ground material to wet the ground material and eliminate the need for mechanical agitation. The mixing valve 850 can include an inner member 852 secured to an outer member 854. The outer member 854 can include silicone or other elastomeric material to form a seal with the upper assembly plate 608 and prevent steam from escaping the brew chamber 402.

Figure 8G:
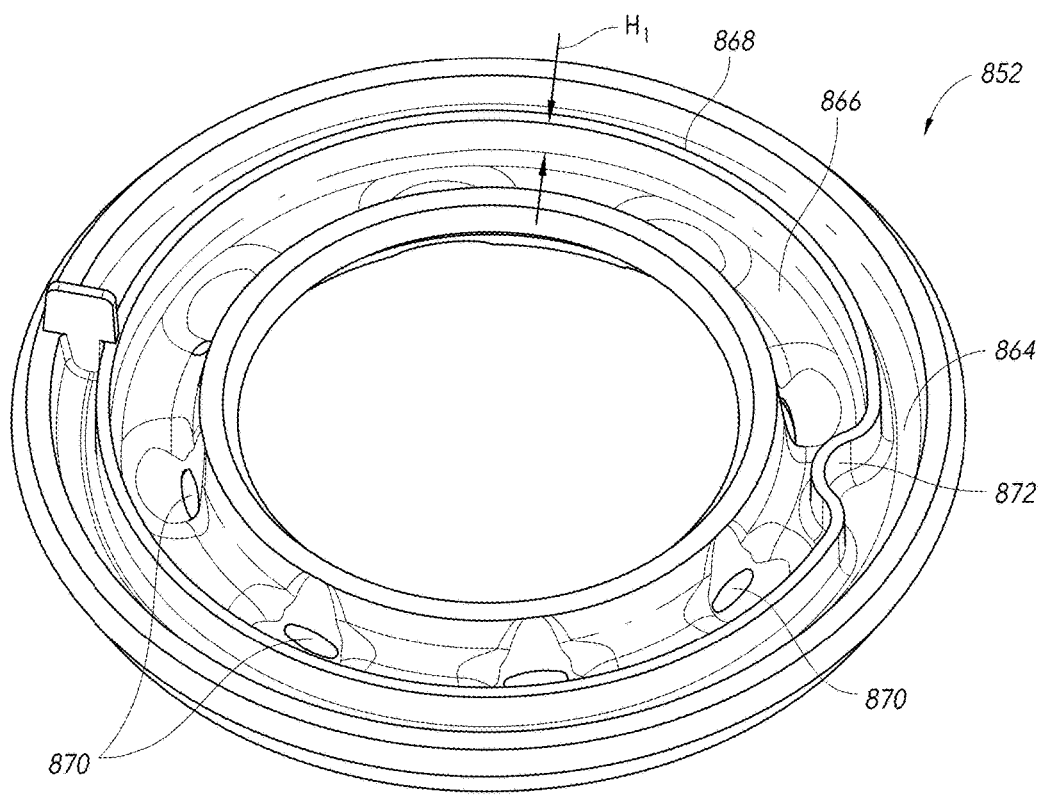
FIG. 8G illustrates a top perspective view of an inner member of the mixing valve shown in FIG. 8E.
Figure 8H:
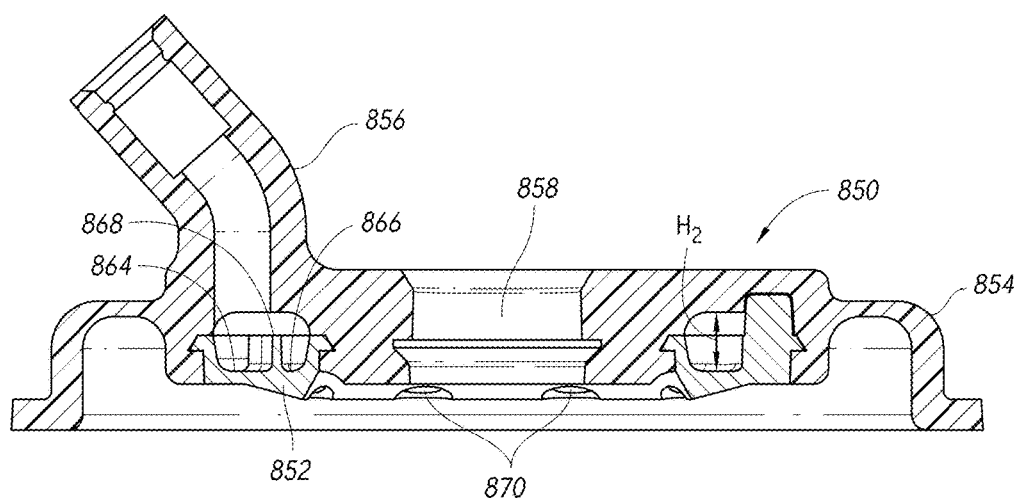
FIG. 8H illustrates a cross-section of the mixing valve shown in FIG. 8E taken through line 8H-8H.

As shown in FIG. 8H, the outer member 854 can include an inlet portion 856 in fluid communication with a fluid source. The outer member 854 can include a central opening 858 that can receive or be in fluid communication with an outlet portion of the grinder cap. The outer member 854 can include an inner recess 860 surrounded by an outer recess 862 (see FIG. 8F). Each of the inner and outer recesses 860, 862 can be substantially annular. The inner recess 862 can be adapted to receive the inner member 860.

As shown in FIG. 8G, the inner member 852 can be shaped to deliver water at a uniform pressure. The inner member 852 can include an outer recess 864 surrounding an inner recess 866. The inner and outer recesses 866, 864 can be substantially annular and separated by a wall portion 868. The inner recess 866 can include a number of pathways 870 that can include any of the features of the pathways 822 described above. As shown in FIG. 8G, a section 872 of the wall portion 868 below the inlet portion 856 can be sinusoidal to prevent fluid flowing through the inlet portion 856 from immediately flowing into the inner recess 866.

A height $H_1$ of the wall portion 868 (see FIG. 8G) can be less than a height $H_2$ of the inner recess 856 of the outer member 854 (see FIG. 8H), such that fluid can flow from the inlet portion 856 to the outer recess 864 and over the wall portion 868 to the inner recess 866. As fluid enters the mixing valve 850, the fluid can flow around the entire outer recess 864 before flowing over the wall portion 868 and into the inner recess 866, thereby circumferentially flowing fluid into the inner recess 866 at a substantially even rate. By circumferentially flowing fluid into the inner recess 866, fluid is dispensed from the pathways 870 at a substantially even rate, thereby wetting and agitating the grinds evenly. Additionally, the wall portion 868 can lower the pressure of the fluid flowing in through the inlet portion 856.

Brewing Assembly

As illustrated in FIGS. 4A-4F, the brewing assembly 400 can include a brew chamber 402. The brew chamber 402 can be positioned below the mixing valve 800. In some embodiments, the brew chamber 402 is positioned to receive coffee grounds and water output from the mixing valve 800.

The brew chamber 402 can have a brew sidewall 404. The brew sidewall 404 can form a cylindrical, oval shaped, rectangular, or any other appropriately shaped chamber. The brew chamber 402 can be defined by the brew wall 404 on the sides and defined on a lower end by a lower brew plate 406. In some embodiments, the brew chamber 402 has a diameter (e.g., a diameter measured from the interior surface of the wall 404) less than 3 inches, less than 4 inches, less than 6 inches, less than 10 inches, less than 15 inches, or less than 24 inches. In some embodiments, the brew chamber 402 has a diameter of approximately 6 inches. Many variations are possible.

An upper bound of the brew chamber can be defined by an upper brew frame 408. The brew wall 404 can extend between the lower brew plate 406 and the upper brew frame 408. In some embodiments, the brew wall 404 is fixedly attached (e.g., adhered, welded, and/or attached with mechanical fasteners) to both the brew plate and the brew frame 406, 408.

The upper brew frame 408 can include brew frame sidewalls 410. The distance between the frame sidewalls 410 (e.g., the perpendicular distance between the inner surfaces of the sidewalls 410) can be greater than or equal to the diameter of the brew chamber 402. In some embodiments, the distance between the sidewalls 410 is greater than 100%, greater than 101%, greater than 103%, greater than 106%, or greater than 110% of the diameter of the brew chamber 402. For example, the distance between the sidewalls 410 can be approximately 104% of the diameter of the brew chamber 402. Many variations are possible.

In some embodiments, the upper brew frame 408 includes a brew frame plate 413. The brew frame plate 413 can be attached to (e.g., via mechanical fasteners, welding, and/or adhesives) the sidewalls 410. In some embodiments, the brew frame plate 413 and brew frame sidewalls 410 are formed (e.g., molded, extruded) as a monolithic part. The brew frame plate 413 can extend between a distal end 412 of the brew frame 408 and a proximal end 414 of the brew frame 408. The brew frame plate 413 can have a generally flat shape. In some embodiments, the brew frame plate 413 has a brew frame opening 416. The brew frame opening 416 can define an opening of the brew chamber 402. In some embodiments, the brew frame plate includes a disposal opening 420 positioned between the brew frame opening 416 and the brew frame proximal end 414. The disposal opening 420 can have a generally rectangular shape. In some embodiments, the disposal opening 420 extends between the sidewalls 410 of the upper brew frame 408. The distal end of the disposal opening 420 can comprise a disposal edge 424 (e.g., a lip or ledge). The brew frame proximal end 414 can comprise a vertical wall or plate attached (e.g., via mechanical fasteners, welding, and/or adhesives) to a proximal end of the brew frame plate 413 and/or the brew frame sidewalls 410.

A waste container 422 can be positioned beneath the disposal opening 420. For example, as illustrated in FIG. 4C, the waste container 422 can be positioned proximal to the brew chamber 402 and directly beneath the disposal opening 420. In some embodiments, the disposal edge 424 can extend proximally over a distal edge of the waste container 422 when the waste container 422 is installed in the apparatus 2. The waste container 422 can include a handle 422a or other tactile feature to facilitate removal of the waste container 422 from the apparatus for cleaning. The apparatus 2 can include a waste cover 423 positioned above the waste container 422 when the waste container 422 is installed in the apparatus 2. In some embodiments, the beverage apparatus 2 includes a waste chute (not shown). The waste chute can be in communication with the disposal opening 422. The waste chute can be in communication with a waste bin or other waste disposal system. Use of a waste chute may be advantageous in high-volume applications wherein a great amount of waste is generated during use of the beverage apparatus 2.

The brewing assembly 400 can include a brew piston 426 positioned within the brew chamber 402. The brew piston 426 can have a cross-sectional shape that substantially matches the cross-sectional shape of an inner surface of the brew wall 404. The brew piston 426 can move up and down within the brew chamber 402. After the water and ground material brew for a selected brew time, the piston 426 moves upward to expel brewed beverage through the filter 490. For example, the rotary valve 460 can be maintained in the closed position during at least a portion of the brewing process. Upward movement of the piston 426 when the rotary valve 460 is in the closed position can create a vacuum beneath the piston 426. The vacuum can pull the liquid portion of the brewed beverage through the filter 490 while at least some of the ground brew material remains on top of the piston 426. The brewed beverage can transition to the brew chamber outlet 492 along a lower portion of the brew chamber 402.

The brew piston 426 can be driven by a brew drive 428. In some embodiments, the brew drive 428 extends through a piston drive aperture 474 in the lower brew plate 406. The brew drive 428 can comprise structure having internal threads that can receive a threaded drive screw. The threaded drive screw can be driven by a motor or other electro-mechanical device.

As shown in FIGS. 4C-4F and 9A-9B, the brewing assembly 400 can include a plow assembly 432. The plow assembly 432 can include a plow 434. The plow 434 can be constructed (e.g., formed, molded, extruded) from a polymer, metal, ceramic, and/or other material. In some embodiments, the plow 434 is constructed from a hard and/or rigid NSF grade material (e.g., acetal, PEEK, Ultem, treated aluminum). In some embodiments, the plow is co-molded from a plurality of materials. The plow 434 can have a width (e.g., a width substantially perpendicular to the sidewalls 410) of less than 3 inches, less than 4 inches, less than 6 inches, less than 10 inches, less than 15 inches, or less than 24 inches. In some embodiments, the width of the plow 434 and is approximately 6.25 inches. Many variations are possible.

Plow 434 can be connected to a lead screw 436. The lead screw 436 can drive the plow 434 between a distal position (see, e.g., FIG. 4C) and a proximal position (see, e.g., FIG. 4F). In some embodiments, the lead screw 436 can be inserted into the plow 434 via an aperture in a distal side of the plow 434. An attachment screw (not shown) can be used to fix the lead screw 436 to the plow 434. In some embodiments, the plow 434 is easily removed from the lead screw 436 via loosening of the attachment screw and/or pulling of the plow 434 away from the lead screw 436. In some arrangements, a user of the apparatus 402 can remove the upper brewing assembly 600 to access the plow 434 and/or lead screw 436 for removal and/or cleaning. In some embodiments, the lead screw 436 is welded and/or adhered to the plow 434. The lead screw 436 can have a length sufficient to accommodate a desired stroke of the plow 434. In some embodiments, the length of the lead screw 436 is less than 5 inches, less than 7 inches, less than 9 inches, less than 11 inches, less than 13 inches, or less than 20 inches.

In some embodiments, the length of the lead screw 436 is approximately 8.25 inches. Many variations are possible.

The lead screw 436 can be driven by a plow drive nut 438. The plow drive nut 438 can be positioned in a plow frame 439. The plow frame 439 can be positioned distal of the brew chamber 402. A plow motor 440 can be positioned within the plow frame 439. The plow motor 440 can be used to drive the plow drive nut 438. For example, the plow motor can be operably connected to the plow drive nut 438 via a plow belt 442 (see, e.g., FIG. 9A). In some embodiments, the plow motor 440 drives rotation of a clutch 441 positioned adjacent to the plow motor 440. Rotation of the plow clutch 441 and/or the plow motor 440 can rotate the plow drive nut 438 via the plow belt 442. In some embodiments, the plow drive nut 438 and other components of the plow assembly 432 can be removed through a front wall of the apparatus 2 for cleaning or servicing.

Figure 4G:
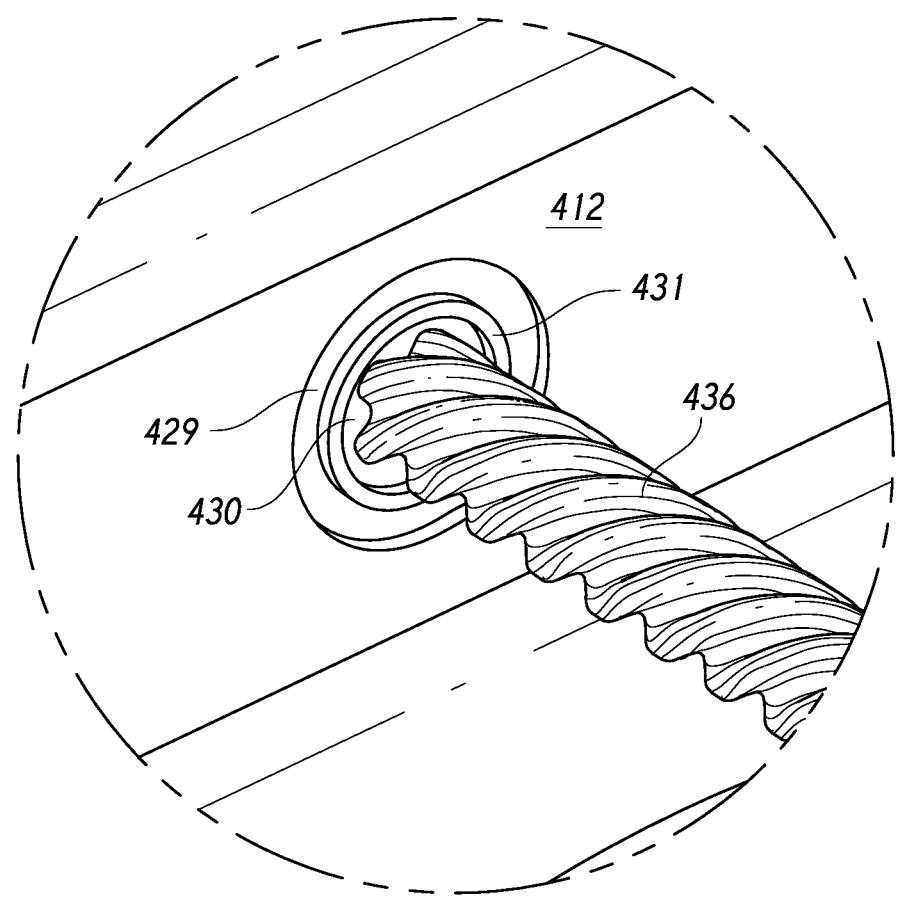
FIG. 4G illustrates a perspective view of an embodiment of a lead screw wiper for an embodiment of a plow lead screw.
Figure 5D:
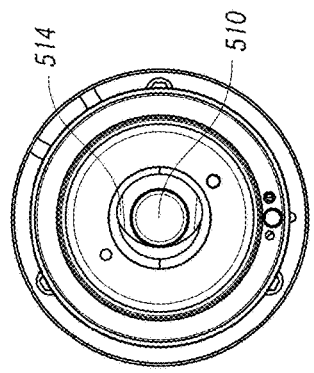
FIG. 5D illustrates a front view of the grinder assembly shown in FIG. 5A.
Figure 5B:
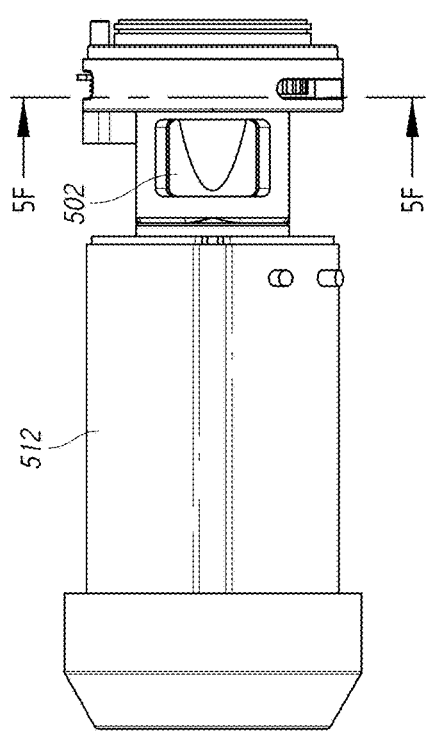
FIG. 5B illustrates a top view of the grinder assembly shown in FIG. 5A.
Figure 5C:
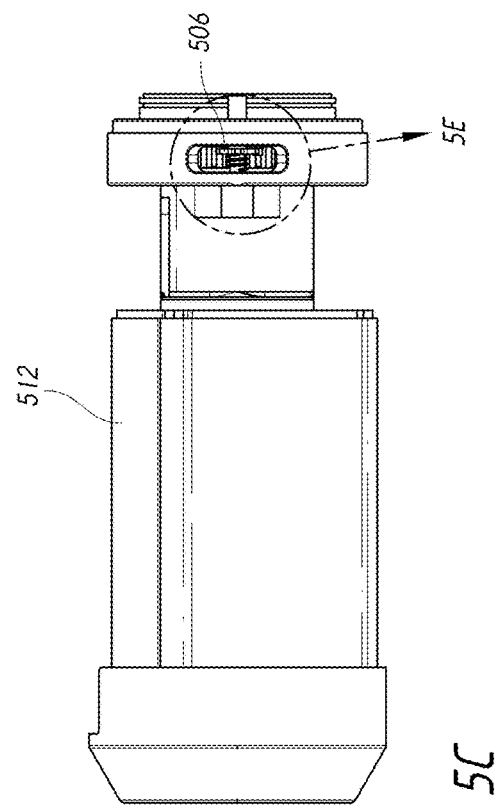
FIG. 5C illustrates a side view of the grinder assembly shown in FIG. 5A.
Figure 5E:
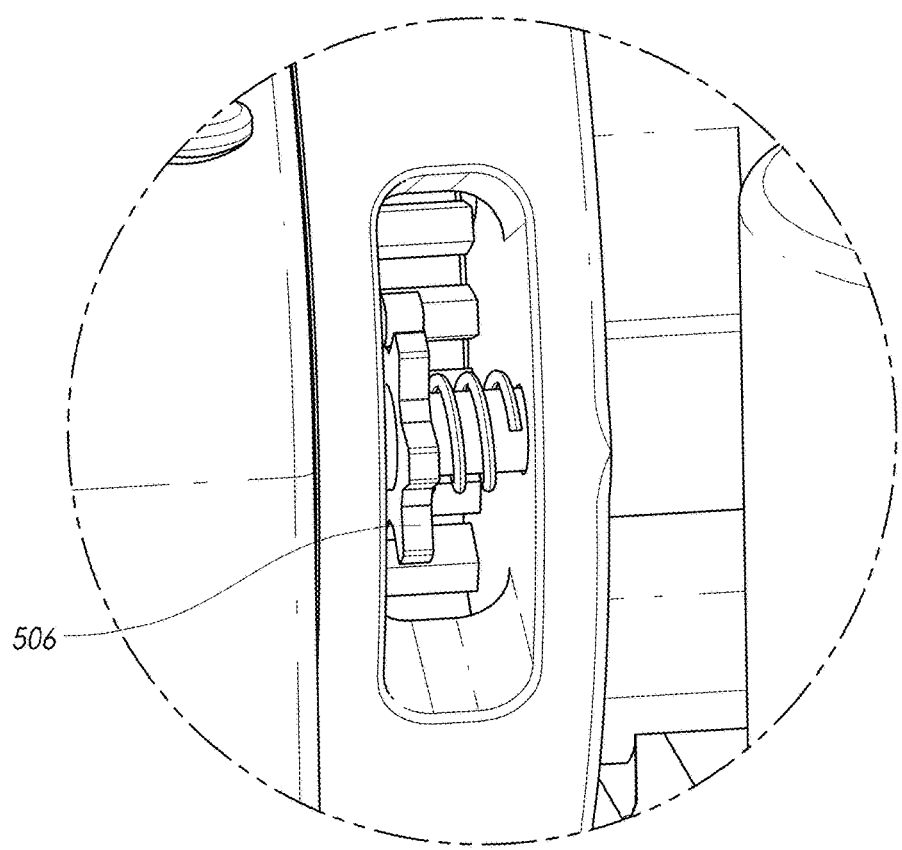
FIG. 5E illustrates an enlarged view of the section shown in FIG. 5C taken along line 5C.

As illustrated in FIG. 4G, the plow assembly 432 can include a lead screw wiper 429. The lead screw wiper 429 can wipe the lead screw 436 as the lead screw 436 in the moves in the distal direction. The lead screw wiper 429 can fit around the lead screw 436. In some embodiments, the lead screw wiper 429 can be translationally fixed (e.g., in the distal, proximal, left, right, and/or vertical directions) to the distal end 412 of the brew frame 408. For example, a wiper collar 431 or other structure can translationally fix the lead screw wiper 429 to the brew frame 408. In some embodiments, the wiper collar 431 permits rotation of the lead screw wiper 429 about the longitudinal axis of the lead screw 436.

In some embodiments, the lead screw wiper 429 includes a plurality of wiper portions 430 generally sized and shaped to fit within the screw threads of the lead screw 436. The wiper portions 430 can ride in the screw threads of the lead screw 436 as the lead screw 436 moves in the distal direction. In some embodiments, the wiper portions 430 inhibit or prevent at least some particulates (e.g., coffee grounds) from accessing the plow drive nut 438. Inhibiting or preventing particulates from accessing the plow drive nut 438 can reduce the risk of the drive nut 438 and lead screw 436 jamming as the drive nut 438 rotates. The lead screw wiper 429 can be constructed from a thin and/or flexible material. For example, the lead screw wiper 429 can be constructed from a polymer, a thin metal material, or some other suitable material.

As illustrated in FIGS. 9C-9F, the plow assembly 432 can include a lead screw 1436 which can be driven by a lead screw drive nut 1438. The a clip 1440 or other retention mechanism can be attached to the distal end of the lead screw 1436 to limit the proximal movement of the lead screw 1436 with respect to the lead screw drive nut 1438. In some embodiments, the clip 1440 can inhibit or prevent inadvertent detachment of the lead screw 1436 from the drive nut 1438 via over-extension of the lead screw 1436 from the drive nut 1438 in the proximal direction.

In some embodiments, a lead screw wiper 1429 is connected to the drive nut 1438. For example, the lead screw wiper 1429 can be positioned within a wiper cavity 1431 (e.g., an annular cavity at or near the proximal end of the drive nut 1438). The wiper 1429 can operate in the same or a similar manner to the lead screw wiper 429 described above. In some embodiments, interference between the lead screw wiper 1429 and the walls of the wiper cavity 1431 inhibit movement of the wiper 1429 in the proximal and distal directions with respect to the drive nut 1428.

Figure 9E:
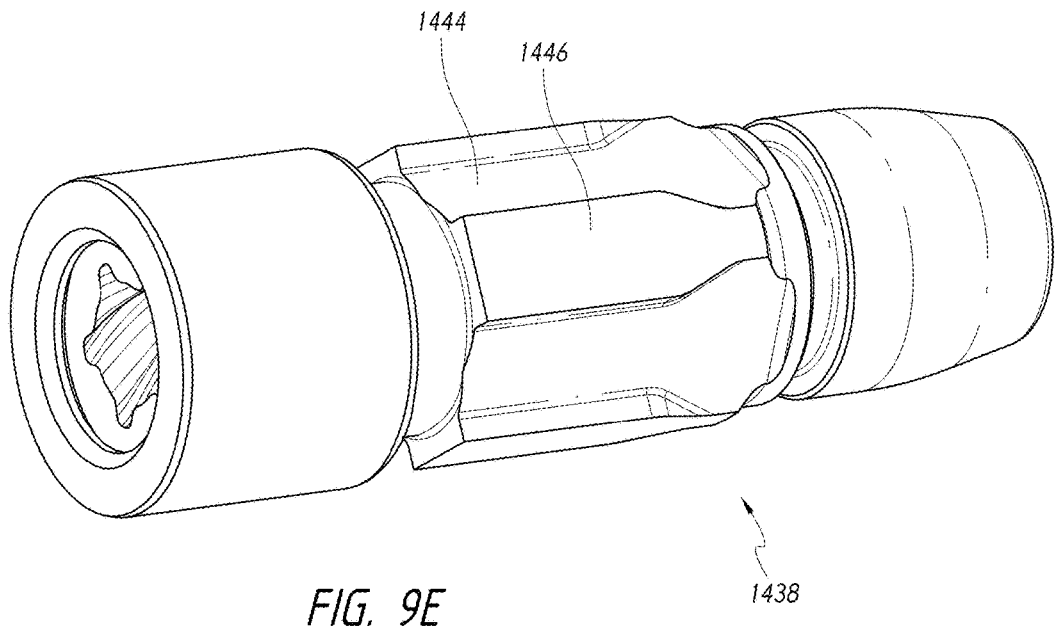
FIG. 9E illustrates a perspective view of a lead screw drive nut shown in FIG. 9C.
Figure 9F:
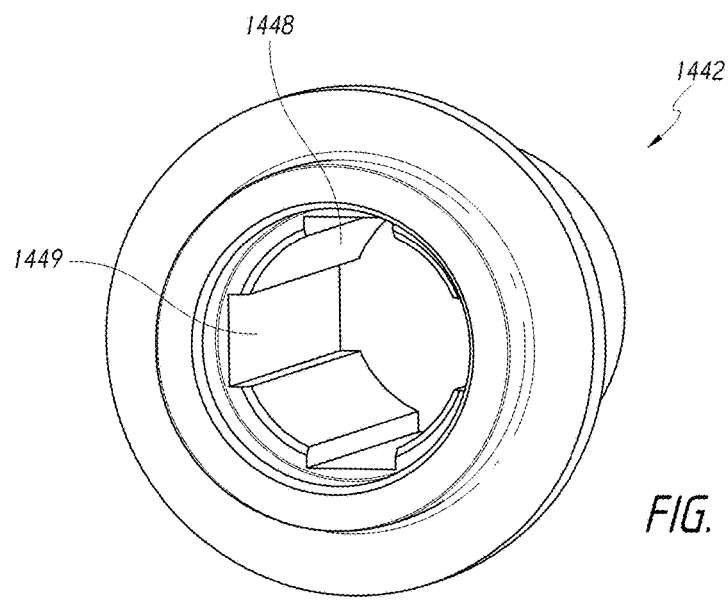
FIG. 9F illustrates a perspective view of a drive sleeve shown in FIG. 9C.

The drive nut 1438 can be rotationally connected to a drive sleeve 1442. For example, as illustrated in FIGS. 9E and 9F, the drive nut 1442 can include one or more axially-extending recessions 1444 and/or protrusions 1446. The recessions/protrusions 1446 of the drive nut 1442 can be configured to spline-fit with protrusions 1448 and/or recessions 1450 on an inner surface of the drive sleeve 1442. Interferences between the respective recessions and protrusions of the drive nut 1438 and drive sleeve 1442 can inhibit or prevent rotation of the drive nut 1438 with respect to the drive sleeve 1442. In some embodiments, rotational force applied to the drive sleeve 1442 via a pulley, gear, or other drive mechanism, is transferred via the spline-fitting to the drive nut 1438 to move the lead screw 1436 in the proximal and/or distal directions.

In some embodiments, as illustrated, the recessions and protrusions of the drive nut 1438 and drive sleeve 1442 permit proximal and/or distal movement of the drive nut 1438 with respect to the drive sleeve 1442. The drive nut 1438 and/or drive sleeve 1442 can include one or more retention structures (e.g., flanges, shoulders, protrusions, cavity-plate combinations, etc.) configured to inhibit or prevent proximal and/or distal movement of the drive nut 1438 with respect to the drive sleeve 1442 during operation of the beverage apparatus 2. For example, the drive nut 1438 can include a cavity 1452 configured to removably receive a plate 1454 or clip configured to inhibit movement of the drive nut 1438 with respect to the drive sleeve 1442. One or more of the retention structures can be configured to be removable (e.g., removable by a repair person, barista, or any other user of the apparatus 2). In some embodiments, removal of the plate 1454 permits proximal removal of the drive nut 1438 from the drive sleeve 1442.

The plow assembly 432 can include a plow blade 444 attached to the plow head 434. The plow blade 444 can be constructed (e.g., die cut, extruded, compression molded, injection molded, LSR) from a flexible and/or resilient material (e.g., silicone, EPDM, TPE, TPU). In some embodiments, the plow blade 444 is constructed from a flexible and abrasion resistant rubber having a Shore A durometer between 40 and 90. The plow blade 444 can have a width substantially equal to the width of the plow 434. In some embodiments, the plow blade 444 has a width less than the width of the plow head 434. In some embodiments, the plow blade 444 has a width greater than the width of the plow head 434. The plow blade 444 can contact a top surface of the upper brew frame 408 and/or of the brew frame plate 413. In some embodiments, the plow blade 444 can contact a top surface of the brew piston 426 when the brew piston 426 is in a raised position. The plow blade 444 can be removable from the plow head 434. For example, the plow blade 444 can be configured to slide into and out of the plow head 434 in a direction substantially parallel to the length of the plow head 434. In some embodiments, the plow blade 444 is configured to be flexed into and out of engagement with the plow head 434.

The brewing assembly 400 can include a plow wiper 446. The plow wiper 446 can include a wiper blade 448. The plow wiper 446 and/or wiper blade 448 can have a width greater than or equal to the width of the plow 434. For example, the plow wiper 446 can have a width greater than 100%, greater than 101%, greater than 103%, greater than 106%, and/or greater than 110% of the width of the plow 434.

The plow wiper 446 can be biased to an upward position, as illustrated in FIG. 4E. In some embodiments, the plow wiper 446 is biased to the upward position by a spring, a hydraulic piston, a pneumatic piston, or some other biasing structure.

The plow assembly can move the plow head 434 between a first position (e.g., as illustrated in FIG. 4C) wherein the plow head is positioned distal of the grinder opening, and a second position (e.g., as illustrated in FIG. 4F) wherein the plow head is positioned proximal to a disposal edge 424 of the disposal opening 420.

In some embodiments, an insulator ring 418 is positioned between the brew wall 404 and the upper brew frame 408. The insulator ring 428 can reduce heat dissipation (e.g., conduction) from the brew chamber 402 to the surrounding components of the apparatus 2. In some embodiments, the insulator ring 428 can help to lower power requirements for heating the water in the boiler 50. In some embodiments, the insulator ring 428 can reduce internal temperatures in the apparatus 2. In some applications, a chamber heater (not shown) can maintain the brew chamber 402 at a predetermined temperature. The insulator ring 428 can reduce heat loss from the brew chamber 402 when the chamber heater heats the brew chamber 402. Heating the brew chamber 402 can reduce heat loss in the beverage when the beverage is introduced to the brew chamber 402. For example, the cylinder heater can maintain a minimum temperature in the brew chamber 402 between brew cycles.

FIG. 4C illustrates an embodiment of the brewing assembly 400 in a default position. In the default position, the piston 426 is in a lowered position at or near the lower brew plate 406. In some embodiments, the plow 434 is retracted to a distal position (e.g., a position in which at least a portion of the plow is located distal of the brew chamber 402). The plow wiper 446 can be in its upward position when the brewing assembly 400 is in the default position.

In some embodiments, coffee and/or tea grounds can be dispensed from the mixing valve 800 to the brew chamber 402. The mixing valve 800 and/or fill nozzle inlet 802 can introduce hot water to the brew chamber 402. The grounds can steep in the brew chamber 402 for a predetermined brewing time.

Steam generated during the brewing time escape the apparatus 2 via one or more vents. For example, the brewing assembly 400 can include one or more internal steam vents 452. The internal steam vents 452 can be positioned, for example, above the plow wiper 446. In some embodiments, the internal steam vents 452 are in communication with one or more external steam vents 450 (see, e.g., FIG. 1D). The one or more external steam vents 450 can be positioned on a proximal, side, distal, and/or top surface of the apparatus 2. In some embodiments, release of steam during the brewing time can provide visual confirmation of the brewing process. In some embodiments, release of steam during the brewing time can provide olfactory confirmation of the brewing process. The external steam vents 450 can direct the steam away from selected components (e.g., the paddles 82a, 82b, 82c) of the apparatus 2.

FIGS. 4D and 4E illustrate a transition of the brew piston 426 from the lowered position to a raised position (see, e.g., FIG. 4E). The brew piston 426 can include one or more filter features 490 that permit passage of liquid (e.g., brewed coffee, brewed tea, water) through the brew piston 426 as the brew piston 426 transitions between the lowered and raised positions. In some embodiments, the filter features inhibit passage of grounds (e.g., coffee or tea grounds) through the brew piston 426. In some embodiments, transition of the brew piston 426 to the raised position lifts substantially all of the grounds to the top of the brew piston 402. As illustrated in FIG. 4E, the top surface of the brew piston 426 can be substantially coplanar with the top surface of the brew frame plate 413 when the brew piston 426 is in the raised position.

The plow 434 can be transitioned from distal position to the proximal position, as illustrated in FIGS. 4E-4F. The plow 434 and/or plow blade 444 can push (e.g., wipe) the grounds from the top surface of the brew piston 426 and/or from the top surface of the brew frame plate 413. In some embodiments, transition of the plow 434 from the distal position to the proximal position pushes the grounds over the disposal edge 424 into the waste container 422.

The plow 434 and/or the plow blade 444 can interact with the plow wiper 446 (e.g., with the wiper blade 448) as the plow 434 transitions to the proximal position. For example, the plow 434 can be shaped such that the plow 434 (e.g., the proximal surface of the plow 434 when the plow 434 is installed in the apparatus) tapers in the distal direction from the top of the plow 434 to the bottom of the plow 434. In some embodiments, the proximal surface of the plow 434 is substantially planar with a distal slope from the top of the plow 434 to the bottom of the plow 434. In some embodiments, as illustrated in FIG. 4C-4F, the proximal surface of the plow 434 is curved in the proximal direction from the bottom of the plow 434 to the top of the plow 434. In some embodiments, a slope of the proximal surface of the plow 434 and/or of the plow blade 444 can increase (e.g., increase slope in the downward vertical direction) from a proximal portion of the of proximal surface of the plow 434 and/or of the plow blade 444 to a distal portion of the proximal surface of the plow 434 and/or of the plow blade 444. The proximal end of the proximal surface of the plow 434 can have a small radius of curvature (e.g., less than 0.2 inches, less than 0.1 inches, less than 0.05 inches, less than 0.025 inches, and/or less than 0.01 inches). In some embodiments, proximal end of the proximal surface of the plow 434 can have a sharp edge.

As illustrated, the proximal surface of the plow 434 and/or of the plow blade 444 can have a substantially constant cross-section in a vertical plane parallel to the drive screw 436 along the width of the plow 434 and/or plow blade 444 (e.g., the plow 434 and/or plow blade 444 can be substantially straight in a direction substantially perpendicular to the axis of the drive screw 436). In some embodiments, the wiper blade 448 can have a substantially straight distal edge substantially perpendicular to the plow drive screw 436.

The proximal end (e.g., the top of the proximal surface) of the plow 434 can interfere with the wiper blade 448 as the plow 434 transitions to the proximal position. The wiper blade 448 can be pushed downward along the proximal surface of the plow 434 and/or of the plow blade 444 as the plow 434 transitions to the proximal position. In some embodiment, the upward bias of the wiper blade 448 can increase the contact force (e.g., pressure) between wiper blade 448 and the proximal surface of the plow 434 and/or of the plow blade 444. Increased contact force between wiper blade 448 and the proximal surface of the plow 434 and/or of the plow blade 444 can increase the likelihood that most or substantially all of the grounds accumulated on the proximal surface of the plow 434 and/or of the plow blade 444 as the plow 434 transitions to the proximal position are wiped from the proximal surface of the plow 434 and/or of the plow blade 444 and into the waste container 422. As discussed above, the slope of the proximal surface of the plow 434 and/or of the plow blade 444 can increase in the distal direction. The slope of the proximal surface can accelerate the wiper blade 448 downward as the plow 434 moves in the proximal direction. For example, in cases where the proximal movement of the plow 434 is performed at a constant or substantially constant speed, the vertical travel (e.g., downward travel) of the wiper blade 448 is accelerated as the wiper blade 448 approaches the distal end of the plow 434 due to the increased slope of the proximal surface of the plow 434 and/or of the plow blade 444. Vertical acceleration of the wiper blade 448 can be facilitated by the increased vertical movement per unit of time required as the wiper blade 448 follows the geometry of the proximal surface of the plow 434 and/or of the plow blade 444. In some embodiments, interference between a lateral side portion of the wiper blade 448 and the plow 434 can accelerate the wiper blade 448 off of the plow blade and/or off of the plow blade 444.

The wiper blade 448 can return to the upward position as the plow 434 transitions from the proximal position to the distal position. In some embodiments, the mixing valve 800 and/or fill nozzle inlet 802 can spray the top surface of the brew piston 426 and/or of the brew frame plate 413 before, during, and/or after transition of the plow 434 from the distal position to the proximal position. For example, the mixing valve 800 and/or fill nozzle inlet 802 can spray the top surface of the brew piston 426. The brew piston 426 (e.g., a periphery thereof) can be used to wipe the inner surface of the brew chamber 402 as the brew piston 426 moves vertically. Upward movement of the brew piston 426 when the rotary valve 460 is in the closed position can pull (e.g., via vacuum beneath the piston 426) the cleaning water through the filter 490 to the brew chamber outlet 492.

Dispenser Assembly

As illustrated in FIG. 2L, the apparatus 2 can include a dispenser assembly 110. The dispenser assembly 110 can include a dispenser frame 112. The dispenser frame 112 can be attached to or otherwise coupled with a dispenser bracket 114. The dispenser bracket 114 can be used to attach the dispenser assembly 110 to one or more components of the apparatus 2. For example, in the illustrated embodiment, the dispenser bracket 114 can be attached to (e.g., via mechanical fasteners, welding, adhesives, and/or otherwise) the lower brew plate 406 of the brewing assembly 400.

The dispenser assembly 110 can include one or more dispensers. A beverage dispenser 116 can be positioned beside or below the dispenser frame 112. The beverage dispenser 116 can be in fluid communication with one or more components (e.g., the dispenser outlet 476) of the brewing assembly 400. The beverage dispenser 116 can dispense a selected beverage including, but not limited to, brewed coffee or tea.

Figure 2Q:
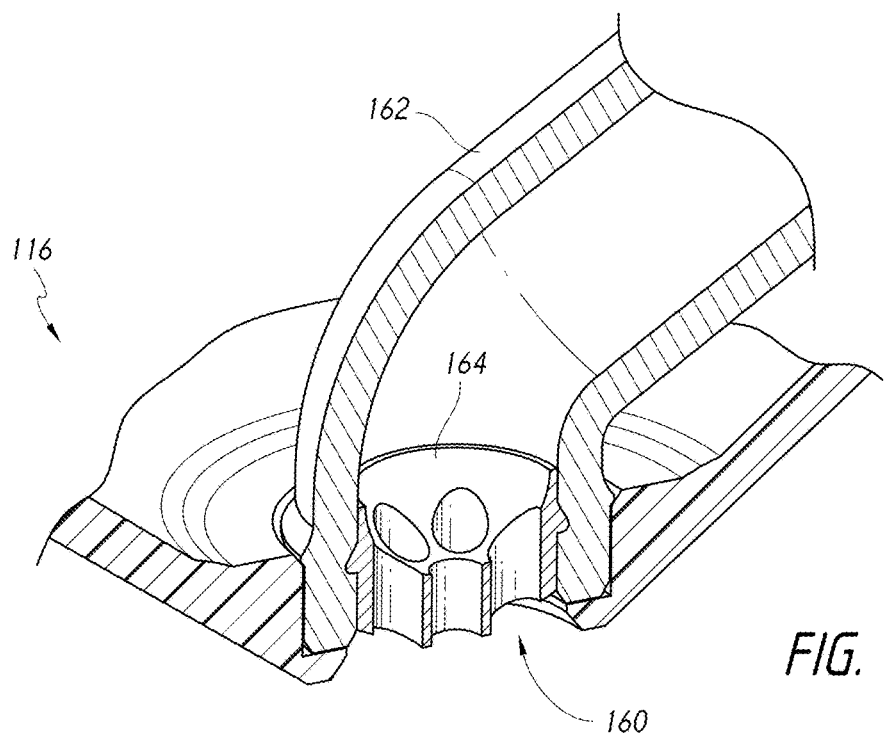
FIG. 2Q illustrates a cross-section of a beverage dispenser of the system shown in FIG. 2L taken along line 2Q-2Q.
Figure 2R:
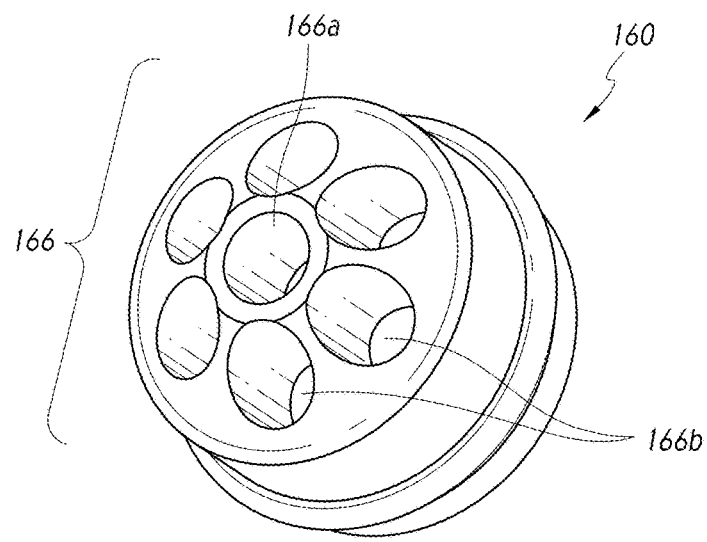
FIG. 2R illustrates an enlarged perspective view of the outlet tip shown in FIG. 2Q.

As shown in FIGS. 2Q and 2R, the beverage dispenser 116 can include an outlet tip 160. The outlet tip 160 can be integrally formed with a beverage passageway 162 or the outlet tip 160 can be a separate component that can be coupled to the beverage passageway 162, e.g., by a snap fit, screw fit, friction fit, or otherwise. The separate outlet tip 160 may be desirable to facilitate cleaning.

The outlet tip 160 can include a concave upper surface 164 and a plurality of openings 166 optimized to reduce splashing without restricting flow. The plurality of openings 166 can include two, three, four, five, six, seven, eight, or more openings. As shown in FIG. 2Q, the plurality of openings 166 can include a central opening 166a surrounded by peripheral openings 166b. The central opening 166a can include a generally circular cross-section, while the peripheral openings 166b can include a generally elliptical cross-section. In other configurations, the plurality of openings 166 can include at least two concentric rings of openings, each including a plurality of openings.

The dispenser assembly 110 can include a hot water dispenser 118. The hot water dispenser 118 can be in fluid communication with the boiler 50. In some embodiments, the hot water dispenser 118 is in direct fluid communication with the boiler 50 via a fluid line. The dispenser assembly 110 can include a hot water control member 119 (e.g., a lever, a button, a knob, a dial, or other apparatus). The hot water control member 119 can receive a user input to open and close a valve within the dispenser assembly 110. The hot water control member 119 can be biased to a closed position via a spring or other biasing structure. In some embodiments, the hot water control member 119 controls an analog valve (e.g., a ball valve or other valve) to open fluid communication between the boiler 50 and the dispenser 118.

The dispenser assembly 110 can include a hot water valve system 130 (see FIG. 2M). The hot water valve system 130 can be positioned above, below, and/or otherwise adjacent the dispenser frame 112. In some embodiments, the hot water valve system 130 comprises a valve chamber 132. The hot water valve system 130 (e.g., the valve chamber 132) can be in fluid communication with the hot water dispenser 118 via valve outlet 133 and/or a fluid conduit (e.g., a pipe, hose, or other conduit).

In some embodiments, the hot water system 130 has one or more fluid inlets. For example, the hot water system 130 may include a first fluid inlet (e.g., a cold water inlet 134). As illustrated in FIG. 2M, the hot water system 130 can include a second fluid inlet (e.g., a hot water inlet 136). In some embodiments, the hot water system 130 includes additional fluid inlets and/or outlets (e.g., third fluid inlet 138). The cold water inlet 134 can be fluidly coupled with a water source external to the apparatus 2 and/or to the inlet manifold 44 via one or more fluid conduits (e.g., pipes, tubes, and/or hoses). The hot water inlet 136 can be fluidly connected to the boiler 50 or other water source via one or more fluid conduits.

One or more of the fluid inlets and/or outlets can include a valve (e.g., a check valve). For example, the cold water inlet 134 can include a cold water valve 140. In some embodiments, the hot water inlet 136 may include a hot water valve 142. One or both of the check valves 140, 142 can be biased to a closed position.

In some embodiments, the hot water system 130 includes a valve-actuation assembly (e.g., an analog valve assembly). The valve-actuation assembly can include a user input (e.g., a lever 144). The lever 144 can be connected to a rotatable valve shaft 146. Activation of the lever 144 to rotate the valve shaft 146 can at least partially open one or more of the cold and hot water valves 140, 142. For example, one or more valve actuators (e.g., cams 148, 150) can be connected to the valve shaft 146. In some embodiments, a cold water cam 148 is connected to the valve shaft 146 in a rotationally-locked manner (e.g., the cold water cam 148 rotates with the valve shaft 146). In some embodiments, a hot water cam 150 is connected to the valve shaft 146 in a rotationally-locked manner (e.g., the hot water cam 150 rotates with the valve shaft 146). The cam 148 can engage a cold water valve piston 152. Rotation of the valve shaft 146 can bring the cam 148 into contact with the cold water valve piston 152 to drive the piston 152 to open the cold water valve 140. The cold water cam 148 can open the cold water valve 140 in an analogue manner. In some embodiments, rotation of the valve shaft 146 can bring the cam 150 into contact with the hot water valve piston 154 to drive the piston 154 to open the hot water valve 142. The hot water cam 150 can open the hot water valve 142 in an analogue manner. In some embodiments, the valves 140, 142 are needle valves or other valves suitable for providing a range of flow rates from the inlets 134, 136, 138 into the hot water system 130. In some case, the hot water system 130 includes one or more sleeves (not shown) in the system manifold to reduce water volume in the manifold. Reducing water volume in the manifold can increase the operating pressure range of the hot water system 130. In some embodiments, one or more aerators can be positioned within one or more of the fluid paths of the hot water system 130.

The hot water valve system 130 can dispense water (e.g., via the valve outlet 133) at a plurality of water temperatures. In some embodiments, rotation of the valve shaft 146 (e.g., via manipulation of the lever 144) can cause the cams 148, 150 to open one or both of the valves 140, 142 varying amounts. For example, rotation of the shaft 146 a first amount can open the cold water valve 140 a first percentage and can open the hot water valve 142 a second percentage. The first percentage and second percentage can be the same or different. In some embodiments, one or more the first percentage and second percentages is zero. The temperature of the water input into the valve chamber 132 will be proportional to the amount of hot and cold water input through the valves 140, 142. Rotation of the shaft 146 a second amount can open the cold water valve 140 a third percentage and can open the hot water valve 142 a fourth percentage. The third percentage can be greater than, less than, or equal to the fourth percentage. In some embodiments, the third percentage is different from the first and second percentages. One or both of the third and fourth percentages can be zero. In some embodiments, the lever 144 and/or valve shaft 146 is biased to a closed position via a biasing structure (e.g., a torque spring 156). In the closed position, both the cold and hot water valves 140, 142 can be maintained in a closed position.

Rotary Valve Assembly

As illustrated in FIG. 4F, the brewing assembly 400 can include a brew outlet assembly (e.g., rotary valve assembly 460) downstream from the brew chamber 402. The rotary valve assembly 460 can be positioned on a lower portion of the brew chamber 402. For example, as illustrated in FIGS. 8A-8E, the rotary valve assembly 460 can be coupled with, affixed to, or otherwise connected to the lower brew plate 406.

The rotary valve assembly 460 includes a brew outlet valve 462. The brew outlet valve 462 can transition between two or more valve positions. For example, the brew outlet valve 462 can transition between a first valve position wherein fluid communication is provided between the interior of the brew chamber 402 and the dispenser assembly 110, and a second valve position wherein fluid communication is provided between the interior of the brew chamber 402 and a drain of the beverage apparatus 2. In some embodiments, the brew outlet valve 462 can transition to a third, closed valve position. Transition of the valve plate brew outlet valve 462 between the two or more valve positions can be driven by a valve actuator (e.g., a valve motor 466).

As illustrated in FIG. 10C, the brew outlet valve 462 can include a valve outlet manifold 470. The outlet manifold 470 can include a dispenser outlet 476. The dispenser outlet 476 can be fluidly connected to the dispenser assembly 110 via one or more fluid lines (e.g., hoses, pipes, or other fluid channels). In some embodiments, the outlet manifold 470 includes a drain outlet 478. The drain outlet 478 can be fluidly connected to a drain of the apparatus 2 via one or more fluid lines.

The brew outlet valve 462 can include a valve plate 464. The valve plate 464 can be connected to the lower brew plate 406 at a valve hinge 468. The valve plate 464 can rotate about the hinge 468 between the first valve position (e.g., see FIG. 10D), the second valve position (e.g., see FIG. 10F), and the third valve position (e.g., see FIG. 10E). In some embodiments, the valve plate 464 is connected to the valve hinge 468 via a plate arm 472.

The valve outlet manifold 470 can be connected to the valve plate 464. For example, as illustrated in FIGS. 10B and 10C, the valve outlet manifold 470 can be affixed to the valve plate 464 via mechanical fasteners. In some embodiments, the valve outlet manifold 470 is connected to the valve plate 464 via adhesive, welding, or other connection methods/structures. According to some variants, the valve outlet manifold 470 and valve plate 464 are formed (e.g., molded or extruded) as a monolithic part.

The valve outlet manifold 470 can include a manifold sealing structure to inhibit fluid leakage between the valve manifold 470 and the lower brew plate 406 from within the brew chamber 402. The manifold sealing structure can be, for example, a manifold recess 475 in which a resilient seal can be positioned. In some embodiments, the lower brew plate 406 includes a brew plate sealing structure to inhibit leakage between the valve manifold 470 and the lower brew plate 406 when the valve assembly 462 is in the closed (e.g., third) position. The brew plate sealing structure can be, for example, a plate recess 477 in which a resilient seal (e.g., an O-ring) can be positioned. The plate recess 477 can be positioned surrounding a brew plate outlet 479. In some embodiments, the plate recess 477 is positioned at least partially within a periphery of the manifold recess 475 when the rotary valve assembly 462 is in the first or second positions. The seals and/or the valve outlet manifold 470, or some portions thereof, can be constructed from a low friction material (e.g., Teflon®). In some embodiments, the seals and/or the valve outlet manifold can withstand high vacuum forces (e.g., forces between 0 and 1 atm). In some cases, compression of the seal(s) provides a spring force that drives the brew plate outlet 479 into the outlet manifold 470 to create additional sealing.

Rotation of the valve plate 464 can be driven by a valve actuator (e.g., a valve motor 466). As illustrated, the valve motor 466 can be connected to the lower brew plate 406 (e.g., via a bracket and/or mechanical fasteners, via welding, via adhesive, or otherwise). The valve motor 466 can drive rotation of the valve plate 464 about the hinge 468 via a mechanical connection between the valve motor 466 and the valve plate 464. For example, the mechanical connection between the valve motor 466 and the valve plate 464 can be a valve drive arm 467. The valve drive arm 467 can be connected (e.g., rotatably connected) to a rotary component (not shown) rotated by the valve motor 466. In some embodiments, the valve drive arm 467 is connected (e.g., rotatably connected) to the valve plate 464 via a fastener or other connection structure. In some embodiments, rotation of the rotary component drives the drive arm 467. Driving of the drive arm 467 can drive the valve plate 464 (e.g., via the drive arm 467) between the first, second and third valve positions.

FIG. 10D illustrates an embodiment of the rotary valve 462 in the first position. In the first position, the brew plate outlet 479 is substantially aligned with the dispenser outlet 476 of the valve manifold 470. In the first position, fluid (e.g., coffee or tea) within the brew chamber 402 is permitted to pass through the brew plate outlet 479 and through the dispenser outlet 476 to the dispenser assembly 110 and/or with the beverage dispenser 116.

FIG. 10F illustrates an embodiment of the rotary valve 462 in the second position. In the second position, the brew plate outlet 479 is substantially aligned with the drain outlet 478 of the valve manifold 470. In the second position, fluid within the brew chamber 402 is permitted to pass through the brew plate outlet 479 and through the drain outlet 478 to a drain of the beverage apparatus 2.

FIG. 10E illustrates an embodiment of the rotary valve 462 in the third, closed position. In the closed position, the brew plate outlet 479 is misaligned with both the drain outlet 478 and the dispenser outlet 476 of the valve manifold 470. Interaction between the brew plate sealing structure and the valve manifold 470 can inhibit fluid passage past the brew plate outlet 479. In some embodiments, the brew plate outlet 479 is positioned between the dispenser outlet 476 and the drain outlet 478 and in fluid communication with neither outlet 476, 478 when the rotary valve 462 is in the closed position.

The rotary valve 462 can function as a high-flow valve. For example, as illustrated in FIG. 10A, one or both of the dispenser outlet 476 and the drain outlet 478 can extend downward from the lower brew plate 406. Fluid flow through the outlets 476, 478 can be driven by gravity when the rotary valve 462 is in the first or second positions, respectively. As illustrated in FIG. 10B, the lower surface of the brew chamber 402 (e.g., the upper surface of the lower brew plate 406) can slope downward toward the brew plate outlet 479. In some embodiments, substantially all of the fluid (e.g., coffee, tea, water, and/or cleaning solution) can be passed from the brew chamber 402, through the brew plate outlet 479, and through the valve manifold 470 and outlets 476, 478 when the rotary valve 462 is in the first or second position.

In some embodiments, the valve plate 464 includes one or more tracks 463. One or more fasteners 465 can be inserted through the one or more tracks 465 to reduce the likelihood that the valve plate 464 separates from the lower brew plate 406. The fasteners 465 can be configured (e.g., via springs or other structures) to bias the valve plate 464 toward the lower brew plate 406. In some embodiments, interaction between the fasteners 465 and the tracks 463 limits the extent to which the valve plate 464 can rotate about the valve hinge 468. For example, one or more of the tracks 463 can be sized (e.g., have lengths) such that one end of the track 463 abuts against a fastener 465 when the valve plate 464 and/or the valve outlet manifold 470 is in the first valve position to reduce the likelihood that the valve plate 464 and/or the valve outlet manifold 470 moves past the first valve position from the second valve position. In some embodiments, one or more of the tracks 463 are sized such that an end of a track 463 abuts against a fastener 465 when the valve plate 464 and/or the valve outlet manifold 470 is in the second valve position to reduce the likelihood that the valve plate 464 and/or the valve outlet manifold 470 moves past the second valve position from the first valve position.

As illustrated in FIGS. 10D-10F, the plate arm 472 can be connected to the valve plate 464 in an asymmetric (e.g., offset) manner such that the plate arm 472 does not interfere with the piston drive aperture 474 of the lower brew plate 406 when the rotary valve 462 transitions between the first, second, and third valve positions. In some embodiments, the valve plate 464 includes a piston channel (not shown) through which the brew piston drive 428 can pass to access the piston drive aperture 474.

The valve plate 464 can have a plate thickness 486. The plate thickness 486 can be less than 0.1 inches, less than 0.3 inches, less than 0.6 inches, less than one inch, or less than 5 inches. In some embodiments, the plate thickness 486 is approximately 0.24 inches. The plate thickness 486 can be less than a thickness 488 of the lower brew plate 406. In some embodiments, the valve plate thickness 486 can be less than 50%, less than 45%, less than 40%, less than 35%, less than 30%, less than 25%, or less than 20% of the brew plate thickness 488. In some embodiments, the valve plate thickness 486 is approximately 26% of the brew plate thickness 488. The valve manifold 470 can have a height (e.g., the vertical height of the valve manifold 470 in FIG. 10A) that is less than the brew plate thickness 488. In some embodiments, the manifold height is great than the brew plate thickness 488. For example, the brew plate thickness 488 can be less than 75%, less than 70%, less than 65%, less than 60%, less than 55%, or less than 50% of the height of the manifold 470. In some embodiments, the brew plate thickness 488 is approximately 58% of the height of the manifold 470. The rotary valve 462 can have a small overall height compared to the height of the brew chamber 402. For example, the rotary valve 462 can have a height (e.g., the vertical distance between the top of the valve manifold 470 to the bottom of the valve manifold 470 can be less than or equal to 50% of the height of the brew chamber 402 and/or greater than or equal to 5% of the height of the brew chamber 402. In some embodiments, the height of the rotary valve 462 is approximately 35% of the height of the brew chamber 402. A relatively short rotary valve 462 can reduce the overall height of the beverage apparatus 2. Reducing the overall height of the beverage apparatus 2 can allow the user to more easily access the hopper assemblies 300 and other upper components of the apparatus 2.

In some embodiments, the rotary valve 462 can operate at a low operating torque. For example, the use of a thin valve plate 464, low friction materials, and/or lightweight materials (e.g., lightweight polymers and/or metals) can permit the rotary valve 462 to operate at a torque less than 10 inch pounds, less than 9 inch pounds, less than 8 inch pounds, less than 7 inch pounds, less than 6 inch pounds, less than 5 inch pounds, less than 4 inch pounds, less than 3 inch pounds, less than 2 inch pounds, or less than 1 inch pound. In some embodiments, the rotary valve 462 operates at a torque of approximately 1 inch pound.

In some embodiments, the rotary valve 462 can include an alignment indicator. For example, the rotary valve 462 can include one or more sensors for measuring the rotational alignment of one or more components of the rotary valve 462 (e.g., the valve plate 464 and/or the valve manifold 470). As illustrated in FIGS. 10D-10F, the rotary valve 462 can include a position sensor assembly 480. The position sensor assembly 480 can include one more sensors 484a, 484b, 484c (e.g., optical sensors, magnetic sensors, and/or proximity sensors). The sensors 484a, 484b, 484c can detect the rotational position of the rotary valve 462 by, for example, detecting the position of a portion of the rotary valve 462. As illustrated, the rotary valve 462 includes a positioning portion 482. The positioning portion 482 can be, for example, a protrusion from the valve plate 464. The positioning portion 482 can move relative to the position sensor assembly 480 as the rotary valve 462 moves between valve positions. In some embodiments, the relative positions of the components of the rotary valve 462 are monitored via a Hall effect sensor mounted on the housing of the valve motor 466. The Halifax sensor can be configured to motor the rotation of a magnet within the valve motor housing.

As illustrated in FIGS. 10G-10J, a further embodiment of a rotary valve 1462 can include a rotary valve manifold 1463. The manifold 1463 can have a top surface 1464 configured to be positioned along or adjacent to the bottom surface of the lower brew plate 406. The manifold 1463 can include a valve inlet 1465. In some embodiments, the manifold 1463 includes a plurality of outlets. For example the manifold 1463 can include a first outlet 1476 and a second outlet 1477. In some embodiments, one of the first and second outlets 1476, 1477 is fluidly connected to the beverage dispenser 116 and the other outlet is fluidly connected to a drain.

In some embodiments (see, e.g., FIG. 10J), the rotary valve 1462 includes a flow director 1480. The flow director 1480 can include one or more ports with one or more channels fluidly connecting the ports. For example, the flow director 1480 can include a first port 1481 in fluid communication with a second port 1482.

The flow director 1480 can be rotatable between a plurality of positions. For example, a motor 1466 or other mechanical/electrical device can selectively rotate the flow director 1480 via one or more gears 1472 or other mechanical or electrical linkages. The motor 1466 can be controlled by a CPU or other control unit via a communications port 1467.

Figure 10I:
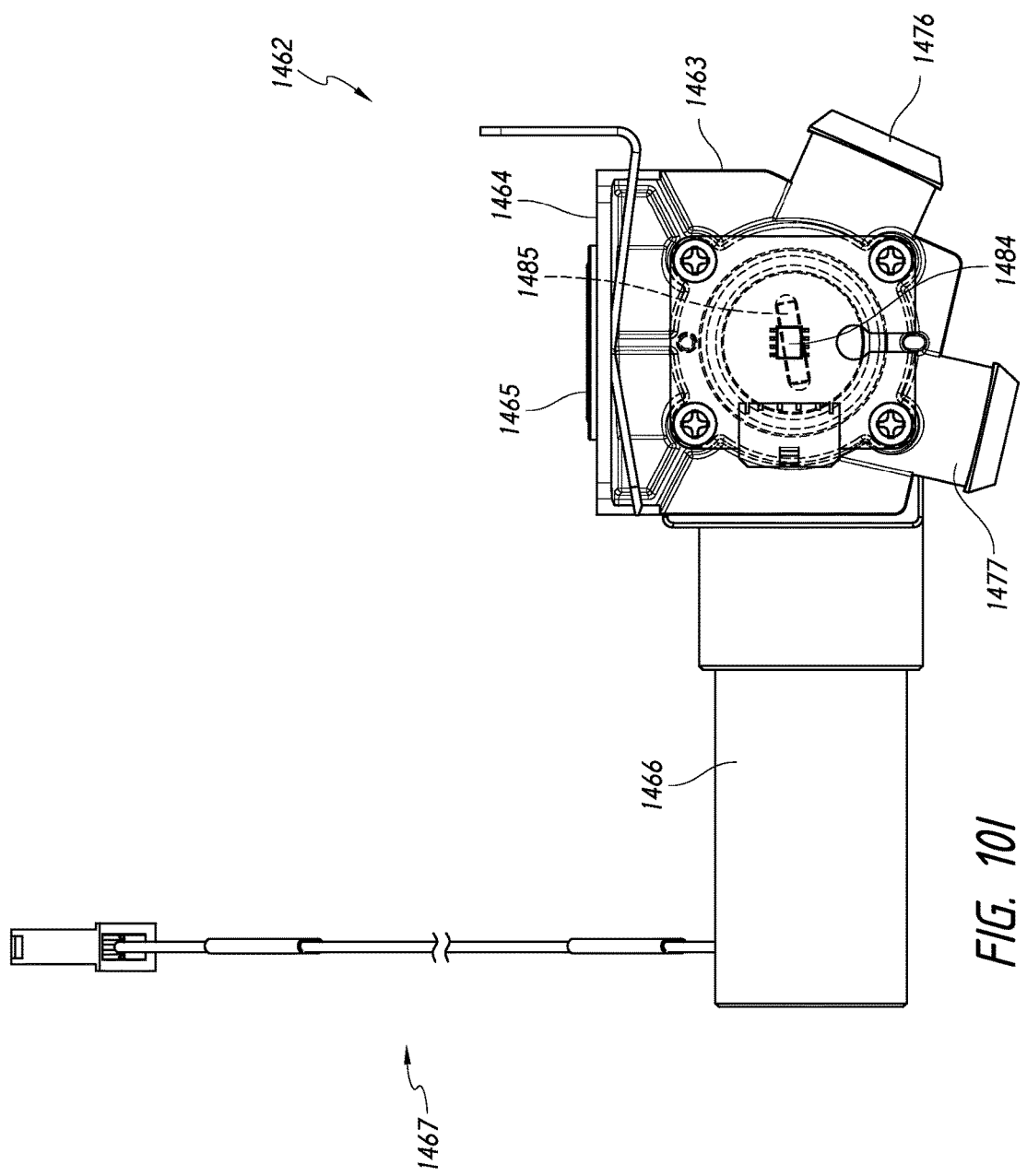
FIG. 10I illustrates a side plan view of the rotary valve assembly shown in FIG. 10G.
Figure 10J:
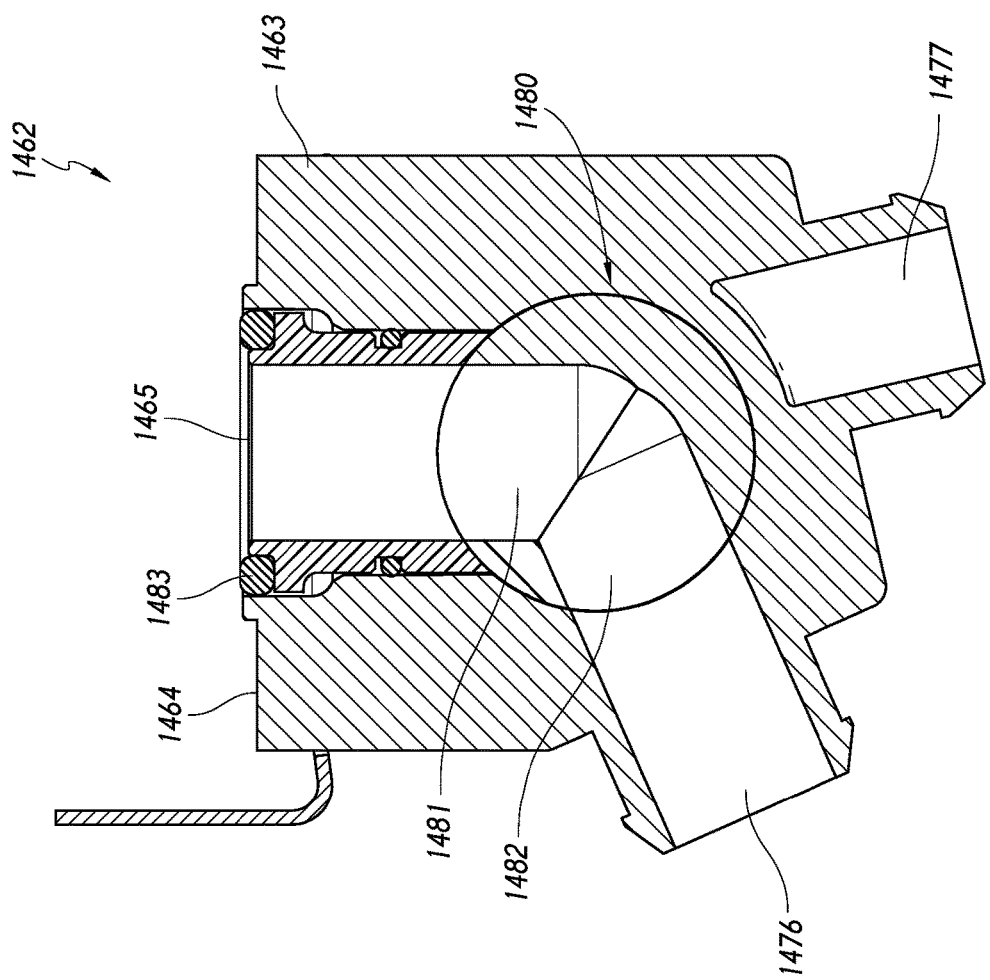
FIG. 10J illustrates a right side cross-sectional view of the rotary valve assembly shown in FIG. 10G.

FIG. 10J illustrates the flow director 1480 in a first position wherein the first port 1481 of the flow director 1480 is aligned and in fluid communication with the valve inlet 1465 and the second port 1482 is aligned with and in fluid communication with the first valve outlet 1476. The flow director 1480 can be rotated to a second position wherein the first port 1481 of the flow director 1480 is aligned and in fluid communication with the second valve outlet 1477 and the second port 1482 is aligned with and in fluid communication with the valve inlet 1465. In some embodiments, the flow director 1480 can be rotated to a third position wherein valve inlet 1465 is cut off from fluid communication with both the first valve outlet 1476 and the second valve outlet 1477.

The manifold 1463 can include a recess or channel 1483 configured to receive an O-ring or other sealing element. Interaction between the O-ring and the bottom surface of the lower brew plate 406 can reduce the risk of leakage between the rotary valve 1462 and the lower brew plate 406. In some embodiments, interaction between the O-ring and the bottom surface of the lower brew plate 406 creates a spring force to reduce the risk of leakage between the inlet 1465 and the flow director 1480.

In some embodiments, as best illustrated in FIG. 10I, the rotary valve 1462 can include a position sensor configured to monitor the rotational position of the flow director 1480. For example, a magnet 1485 can be connected to the flow director 1480. The position sensor can include a Hall effect sensor 1484 configured to monitor the rotational position of the magnet 1485.

Method of Use

In general, as described in greater detail above, the apparatus 2 can be activated by selecting one or more hopper assemblies 300 (using the hopper selector assembly 80) and/or selecting a beverage size (using the beverage size control assembly 60). After the apparatus 2 is activated, the hopper assembly 300 can dispense a controlled dose of beverage material based on the selected hopper and/or beverage size.

The controlled dose can enter the grinder assembly 500 via a chute 358. The grinder assembly 500 can be set to a specific grind size based on the hopper selection and/or beverage size selection. After the grinder assembly 500 grinds the beverage material, the beverage material can flow through the mixing valve 800 and into the brew chamber 402.

As the beverage material exits the mixing valve 800, the mixing valve 800 can direct multiple, angled jets of water toward the ground material to immediately wet and agitate the grinds. To prevent water from escaping into the grinder assembly 500, the beverage apparatus 2 can include a grinder outlet subassembly having a fan 702 alone or in combination with a baffle 712 positioned above the grinder subassembly outlet 510. The grinder outlet assembly can direct positive pressure downward and across the grinder assembly outlet 510 to displace any water vapor. During or after the ground material fills the brew chamber 402, additional water can be optionally delivered from the fill nozzle 806. In certain aspects, water delivered from the fill nozzle 806 can be at a higher temperature than water delivered from the mixing valve 800.

After the beverage material steeps, the brew piston 426 can move upward, such that the beverage exits the brew chamber 402. The brew outlet valve 462 can transition to the first valve position such that the brew chamber 402 is in fluid communication with the dispenser assembly 110 to dispense the beverage.

After the beverage exits the brew chamber 402, the plow assembly 432 can move the spent ground material to the waste bin 422. The plow assembly 432 can passively drive a wiper 446 to fully wipe the ground material from the plow head 434 to the waste bin 422. If necessary, water can be delivered to the brew chamber 402 and/or across the piston 426 to remove any residue. To remove the water, the brew outlet valve 462 can move to the second valve position such that the brew chamber 402 is in fluid communication with the waste bin 422 and/or drain.

During the cleaning process, various other components can be re-initialized. For example, the auger 308 can be reversed to return to the initial position. As another example, the grinder assembly 500 can be calibrated based on stored data regarding previously brewed beverages.

Method of Disassembly

Many of the components described herein facilitate servicing and cleaning. For example, to remove the hopper assembly 300 from the beverage apparatus 2, the hopper assembly 300 can be moved proximally to disengage the hopper 300 from the other hopper assemblies 300 and the hopper motor 34. After the hopper assembly 300 has been removed from the beverage apparatus 2, the lower body portion 304 can be moved distally relative to the upper body portion 302. Once the auger coupling 310 and retainer 316 have been removed, a user can grab a first end 320 of the auger 308 (e.g., by tab 322), to move the auger 308 proximally relative to the lower body portion 304. Further, if present, the visor 314 can be unscrewed or otherwise disengaged from the lower body portion 304. In other configurations, depending on the shape of the hopper assembly 300 and connection to the hopper motor 34, the hopper assembly 300 can be slid distally, twisted off, pulled upward, or otherwise. In general, the entire hopper assembly 300 can be easily disassembled without any tools.

Further, as described above, the upper brewing assembly 600 can be removed from the beverage apparatus 2 for cleaning. As shown in FIG. 1G, an upper portion 4 of the beverage apparatus 2 can move from a closed position to an opened position to provide access to the upper brewing assembly 600. The upper portion 4 can rotate about pivot points at a distal end of the upper portion 4. The latches 36 or other retaining mechanism can be released such that the upper brewing assembly 600 can be slid outward from the beverage apparatus 2 for cleaning.

Recipe Parameters

In some applications, it might be advantageous to modify the flavor profile of the brewed beverage. Varying water temperature, brew time, grind size, and/or dose ratio during a single brew cycle or between different brew cycles can modify the flavor of a brewed beverage. For example, water having a higher temperature tends to speed up extraction and produce a stronger, more aggressive flavor. Water having a lower temperature tends to slow down extraction and produce coffee having a mellower flavor. Water temperature may be varied during the brewing process through flow rate of the water, providing water at different temperatures, and/or providing water at different times during the brewing process.

The ability to adjust grind size can be used to modify the flavor profile of a brewed beverage. A coarser grind tends to slow down extraction from the coffee grounds and to produce a relatively mellow coffee. A finer grind tends to increase extraction speed and produce coffee having a stronger flavor. In some embodiments, grind adjustment mechanism can adjust the grind size during the steep process to mix the differently sized coffee grinds.

The beverage apparatus 2 can modify recipe parameters (e.g., water temperature, brew time, grind size, or dose ratio) based on different settings. For example, the beverage apparatus 2 can modify recipes based on economics. If the hopper assembly 300 is low on beverage material, then the user can change the settings to decrease the dose ratio. In some instances, the beverage apparatus 2 can include a sensor to detect when the beverage material in the hopper assembly 300 is low. The beverage apparatus 2 can automatically reduce the dose ratio when the sensor detects a low amount of beverage material.

As another example, the beverage apparatus 2 can modify recipes based on geographical environments. For higher elevations, the beverage apparatus can modify the recipe to compensate for the lower boiling point, for example, by lowering the water temperature for the recipe and increasing the steep time or increasing the dose ratio.

In some embodiments, the beverage apparatus 2 can modify recipes based on store traffic. During peak times, the beverage apparatus can increase the dose ratio, shorten the brew time, make a finer grind size, and/or skip at least some cleaning cycles. During low traffic times, the beverage apparatus can decrease the dose ratio, increase the brew time, and/or make a coarser grind size.

The beverage apparatus 2 may also include settings to modify a base beverage recipe depending on individual requests from a customer. For example, the recipe can be modified if a customer requests extra room for cream or requests the beverage to be at a higher temperature.

Terminology

For expository purposes, the term "horizontal" as used herein is defined as a plane parallel to the plane or surface on which the device being described is used or the method being described is performed, regardless of its orientation. The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the relative terms "proximal" and "distal" shall be defined from the user facing the controls. Thus, proximal refers to the side of the machine with the user-operable controls and distal refers to the opposite side of the machine.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, the terms "approximately", "about", and "substantially" may refer to an amount that is within less than 10% of the stated amount, as the context may dictate. As another example, in certain embodiments, the terms "generally parallel" and "substantially parallel" refer to a value, amount, or characteristic that departs from exactly parallel by less than or equal to 10 degrees, as the context may dictate.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The ranges disclosed herein also encompass any and all overlap, sub-ranges, and combinations thereof. Language such as "up to," "at least," "greater than," "less than," "between" and the like includes the number recited. Numbers preceded by a term such as "about" or "approximately" include the recited numbers. For example, "about 5 inches" includes "5 inches."

Although certain embodiments and examples have been described herein, it will be understood by those skilled in the art that many aspects of the beverage apparatus shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

What is claimed is:

1. A brewing assembly for brewing coffee, the brewing assembly comprising:
   a brew chamber configured to receive ground coffee;
   a first fluid channel in fluid communication with the brew chamber; and
   a mixing valve in fluid communication with the first fluid channel, the mixing valve comprising:
      an outlet configured to deliver the ground coffee to the brew chamber; and
      a number of passageways circumferentially disposed around the outlet, each of the number of passageways disposed at an angle greater than 0 degrees and less than 90 degrees relative to a longitudinal axis of the mixing valve such that the ground coffee mixes with water dispensed from the number of passageways as the ground coffee enters the brew chamber;
   a dispensing outlet for dispensing brewed coffee, the dispensing outlet positioned downstream of the brew chamber.

2. The brewing assembly of claim 1, wherein the angle is between 1 degree and 5 degrees.

3. The brewing assembly of claim 1, further comprising a second fluid channel in fluid communication with the brew chamber, a fill nozzle in fluid communication with the second fluid channel.

4. The brewing assembly of claim 3, wherein water delivered from the mixing valve has a first temperature and water delivered from the fill nozzle has a second temperature greater than the first temperature.

5. The brewing assembly of claim 1, wherein the mixing valve comprises a ground coffee channel for delivering ground coffee to the brew chamber.

6. The brewing assembly of claim 5, wherein the number of passageways are circumferentially disposed around the ground coffee channel.

7. The brewing assembly of claim 5, wherein the mixing valve comprises a recessed portion disposed between at least one of the number of passageways and the ground coffee channel.

8. The brewing assembly of claim 5, wherein the mixing valve includes a wall portion separating an outer recess and an inner recess, the inner recess comprising the number of passageways.

\* \* \* \* \*